United States Patent [19]
Hasegawa et al.

[11] Patent Number: 6,040,929
[45] Date of Patent: Mar. 21, 2000

[54] LIGHT BEAM SCANNING APPARATUS

[75] Inventors: Shinya Hasegawa; Shigeo Kayashima; Satoshi Maeda; Hirokazu Aritake, all of Kawasaki, Japan

[73] Assignee: Fujitsu Limited, Kawasaki, Japan

[21] Appl. No.: 08/844,994

[22] Filed: Apr. 23, 1997

Related U.S. Application Data

[62] Division of application No. 07/949,520, filed as application No. PCT/JP92/00371, Mar. 26, 1992, Pat. No. 5,680,253.

[30] Foreign Application Priority Data

| Mar. 27, 1991 | [JP] | Japan | 3-62961 |
| Jun. 12, 1991 | [JP] | Japan | 3-140205 |
| Oct. 23, 1991 | [JP] | Japan | 3-275271 |
| Oct. 24, 1991 | [JP] | Japan | 3-277497 |
| Oct. 24, 1991 | [JP] | Japan | 3-277498 |
| Oct. 24, 1991 | [JP] | Japan | 3-277499 |
| Oct. 24, 1991 | [JP] | Japan | 3-277500 |
| Dec. 4, 1991 | [JP] | Japan | 3-320162 |

[51] Int. Cl.[7] ............ G02B 5/32; G02B 26/10; G02B 27/44
[52] U.S. Cl. ............ 359/17; 359/18; 359/566
[58] Field of Search ............ 359/17, 18, 566

[56] References Cited

U.S. PATENT DOCUMENTS

| 4,118,124 | 10/1978 | Matsuda | 356/107 |
| 4,378,142 | 3/1983 | Ono . | |
| 4,428,643 | 1/1984 | Kay . | |
| 4,505,537 | 3/1985 | Funato . | |
| 4,712,852 | 12/1987 | Funato et al. . | |
| 4,733,253 | 3/1988 | Daniele | 346/108 |

(List continued on next page.)

FOREIGN PATENT DOCUMENTS

| 0 062 545 | 10/1982 | European Pat. Off. . |
| 0 111 333 | 6/1984 | European Pat. Off. . |
| 0 132 956 | 2/1985 | European Pat. Off. . |
| 0 214 018 | 3/1987 | European Pat. Off. . |
| 0 270 778 | 6/1988 | European Pat. Off. . |
| 0 435 662 | 7/1991 | European Pat. Off. . |
| 37 42 510 | 6/1988 | Germany . |

(List continued on next page.)

OTHER PUBLICATIONS

European Search Report by corresponding European Patent Application Serial No. 92 907344.3, dated Apr. 6, 1994.
Patent Abstracts of Japan, vol. 13, No. 197 (P–868) May 11, 1989 & JP–A–01 019 321 (NEC) Jan. 23, 1989.
International Search Report for corresponding PCT/JP92/00371, mailed Jun. 23, 1992.
European Search Report for corresponding European Patent Application No. 92 907344.3, dated Feb. 28, 1995.
Communication in Corresponding European Application No. 92907344.3–2205, Aug. 12, 1997, six total pages.

*Primary Examiner*—Cassandra Spyrou
*Assistant Examiner*—Audrey Chang
*Attorney, Agent, or Firm*—Staas & Halsey

[57] ABSTRACT

A high-resolution light-beam scanning apparatus utilizing only mass-producible holograms instead of utilizing auxiliary optical systems such as optical lenses or a mirror having curvature, and capable of compensating for disadvantages including scanning beam thickening and variation, failure of a rotatable hologram to rotate at a constant velocity, displacement of a scanning beam position in the scanning direction and the cross scanning direction due to a mode hop of a wavelength of a semiconductor laser, and deviation of a base of rotatable hologram from a parallel state. These disadvantages are detrimental to efforts for increasing the resolution of a hologram scanner and lowering the cost thereof. The light beam scanning apparatus includes at least two holograms, one rotatable and one fixed, wherein the fixed hologram plate has a phase distribution $\Phi_H$ represented as a difference obtained when subtracting a reference wave phase $\Phi_0$ from an object wave phase $\Phi_R$, where X is a scanning direction and Y is a cross scanning direction, $C_0$, $C_1$, $C_2$, $Y_0$, and $Z_0$ are constants, where $\lambda_2$ is a wavelength of said incident light; and $\lambda_1$ is a wavelength of a constructing wave used for forming said fixed hologram plate.

6 Claims, 74 Drawing Sheets

U.S. PATENT DOCUMENTS

| | | | |
|---|---|---|---|
| 4,737,798 | 4/1988 | Lonis et al. | 346/1.1 |
| 4,776,652 | 10/1988 | Ih | 350/3.72 |
| 4,810,046 | 3/1989 | Yamagishi et al. | |
| 4,925,262 | 5/1990 | Yamagishi et al. | 350/3.71 |
| 4,948,213 | 8/1990 | Hasegawa et al. | 359/18 |
| 5,039,183 | 8/1991 | Meyers | 359/17 |
| 5,061,025 | 10/1991 | Debesis. | |
| 5,157,522 | 10/1992 | Markis. | |
| 5,172,252 | 12/1992 | Toyoshima et al. | 359/16 |
| 5,182,659 | 1/1993 | Clay et al. | |
| 5,295,004 | 3/1994 | Hasegawa et al. | |
| 5,477,348 | 12/1995 | Yamagishi et al. | 359/19 |
| 5,680,232 | 10/1997 | Iwamatsu et al. | 359/18 |

FOREIGN PATENT DOCUMENTS

| | | | |
|---|---|---|---|
| 51-33651 | 3/1976 | Japan. | |
| 55-53311 | 4/1980 | Japan. | |
| 59-60417 | 4/1984 | Japan. | |
| 60-11817 | 1/1985 | Japan. | |
| 61-48813 | 3/1986 | Japan. | |
| 61-116319 | 6/1986 | Japan. | |
| 61-141418 | 6/1986 | Japan. | |
| 61-223704 | 10/1986 | Japan. | |
| 62-28708 | 2/1987 | Japan. | |
| 62-234117 | 10/1987 | Japan. | |
| 62-234118 | 10/1987 | Japan. | |
| 1-244420 | 9/1989 | Japan. | |
| 3-198020 | 8/1991 | Japan | 359/18 |
| 4-45413 | 2/1992 | Japan | 359/18 |

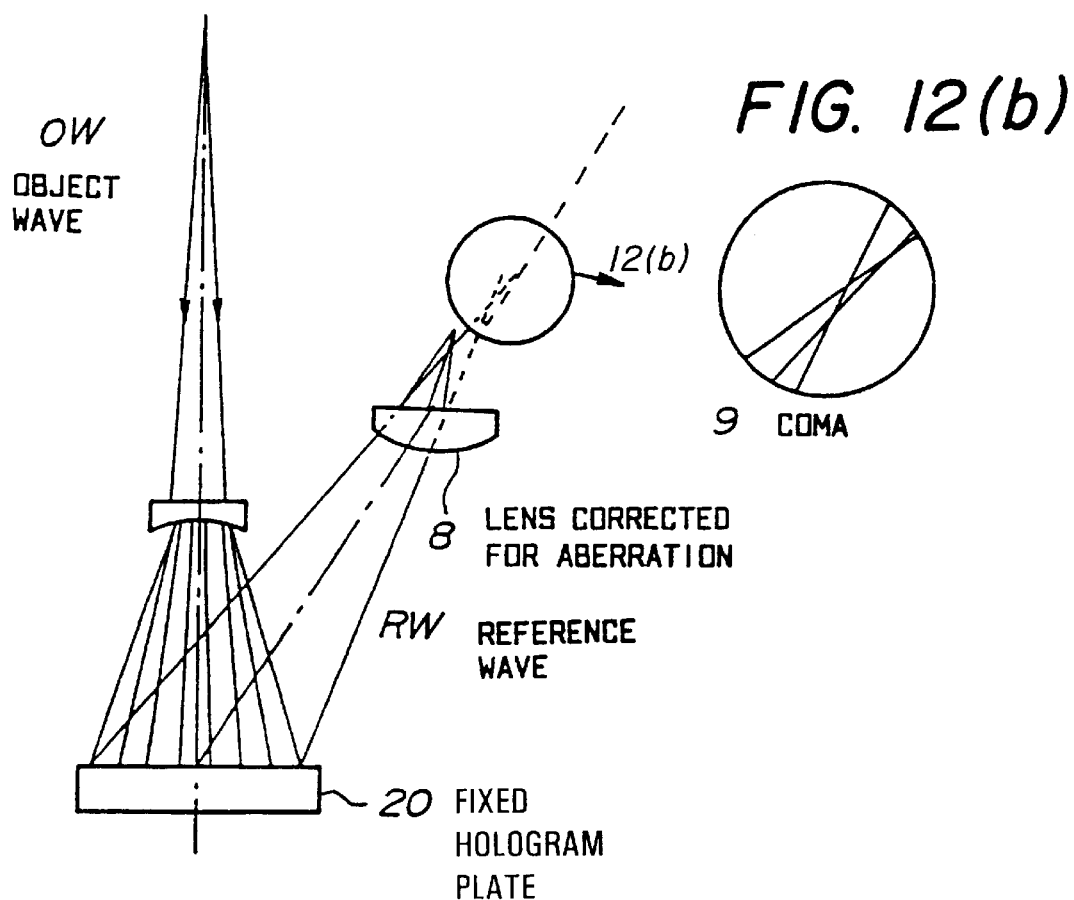

FIG. 22

RELATIONSHIP AMONG INCIDENT WAVE, OUTGOING WAVE AND k

| k | k' =k/(k-1) | n =1-k | n' =1/n | INCIDENT WAVE (*1) | OUTGOING WAVE (*2) | OUTGOING WAVE (*3) |
|---|---|---|---|---|---|---|
| 1 | ∞ | 0 | ∞ | — | — | — |
| 3/4 | -3 | 1/4 | 4 | CONVERGENCE | DIVERGENCE | DIVERGENCE |
| 1/2 | -1 | 1/2 | 2 | CONVERGENCE | DIVERGENCE | PARALLEL WAVE |
| 1/3 | -1/2 | 2/3 | 3/2 | CONVERGENCE | PARALLEL WAVE | CONVERGENCE |
| 0 | 0 | 1 | 1 | CONVERGENCE | CONVERGENCE | CONVERGENCE |
| -1/2 | 1/3 | 3/2 | 2/3 | CONVERGENCE | CONVERGENCE | CONVERGENCE |
| -1 | 1/2 | 2 | 1/2 | CONVERGENCE | CONVERGENCE | CONVERGENCE |
| -3 | 3/4 | 4 | 1/4 | — | — | — |
| -∞ | 1 | ∞ | 0 | — | — | — |

*1: WAVE INCIDENT ON FIRST HOLOGRAM
*2: WAVE OUTGOING FROM FIRST HOLOGRAM
*3: WAVE OUTGOING FROM SECOND HOLOGRAM

PRACTICAL USE (columns *2 and *3)

FIG.24

| $X_1/F_1$ | 0 | 0.1 | 0.2 | 0.3 | 0.4 | 0.5 |
|---|---|---|---|---|---|---|
| $\theta_1°$ | 0 | 5.7 | 11.3 | 16.7 | 21.8 | 26.5 |
| $\sin\theta_2$ | 0 | 0.0005 | 0.004 | 0.0145 | 0.0364 | 0.077 |
| $\theta_2°$ | 0 | 0.03 | 0.24 | 0.83 | 2.09 | 4.44 |

FIG.25(A)

| W(mm) | 1 | 1 | 1 | 2 | 2 | 2 | 4 | 4 | 4 |
|---|---|---|---|---|---|---|---|---|---|
| $\Delta\lambda$(nm) | 1 | 2 | 4 | 1 | 2 | 4 | 1 | 2 | 4 |
| $\xi$ | 0.15 | 0.076 | 0.038 | 0.076 | 0.038 | 0.019 | 0.038 | 0.019 | 0.010 |

FIG. 25(B)

| $k_0$ | $-1/2$ | $0.0$ | $1/4$ | $1/3$ | $2/5$ |
|---|---|---|---|---|---|
| $k_1$ | $-9/16$ | $-3/8$ | $-45/256$ | $-1/9$ | $-0.063$ |
| $b_0$ | $L/2$ | $L$ | $2L$ | $3L$ | $5L$ |
| $k(\delta)$ | $-(1/2)-(9/16)\delta^2$ | $-(3/8)\delta^2$ | $(1/4)-(45/256)\delta^2$ | $(1/3)-(1/9)\delta^2$ | $(2/5)-0.063\delta^2$ |
| SCANNING CHARACTERISTIC AT $\delta=35°$  —  $\beta$ | $-24.0°$ | $-4.60°$ | $6.07°$ | $9.64°$ | $12.5°$ |
| W | $0.478L$ | $0.619L$ | $0.913L$ | $1.210L$ | $1.806L$ |
| 291 mm DESIRED L | $305$ mm | $235$ mm | $159$ mm | $120$ mm | $80.6$ mm |
| DESIRED L + $b_0$ | $457$ mm | $470$ mm | $478$ mm | $481$ mm | $483$ mm |
| a AND a($\delta$) | $-2L \sim 1.41L$ |  | $4L \sim 5.84L$ | $3L \sim 3.42L$ | $2.5L \sim 2.66L$ |

RECONSTRUCTION BY PLANE WAVE

FIG.25(C)

| k0 | k1 | k(δ) | b(δ) | b(δ)/bo | ko/k(δ) |
|---|---|---|---|---|---|
| 1/4 (L=2) | -0.25 | 0.1567109 | 1.9960 | 0.998 | 1.595 |
| 1/3 (L=3) | -0.15 | 0.2773598 | 3.052 | 1.02 | 1.202 |
| 3/8 (L=4) | -0.11 | 0.3339528 | 4.03 | 1.01 | 1.123 |

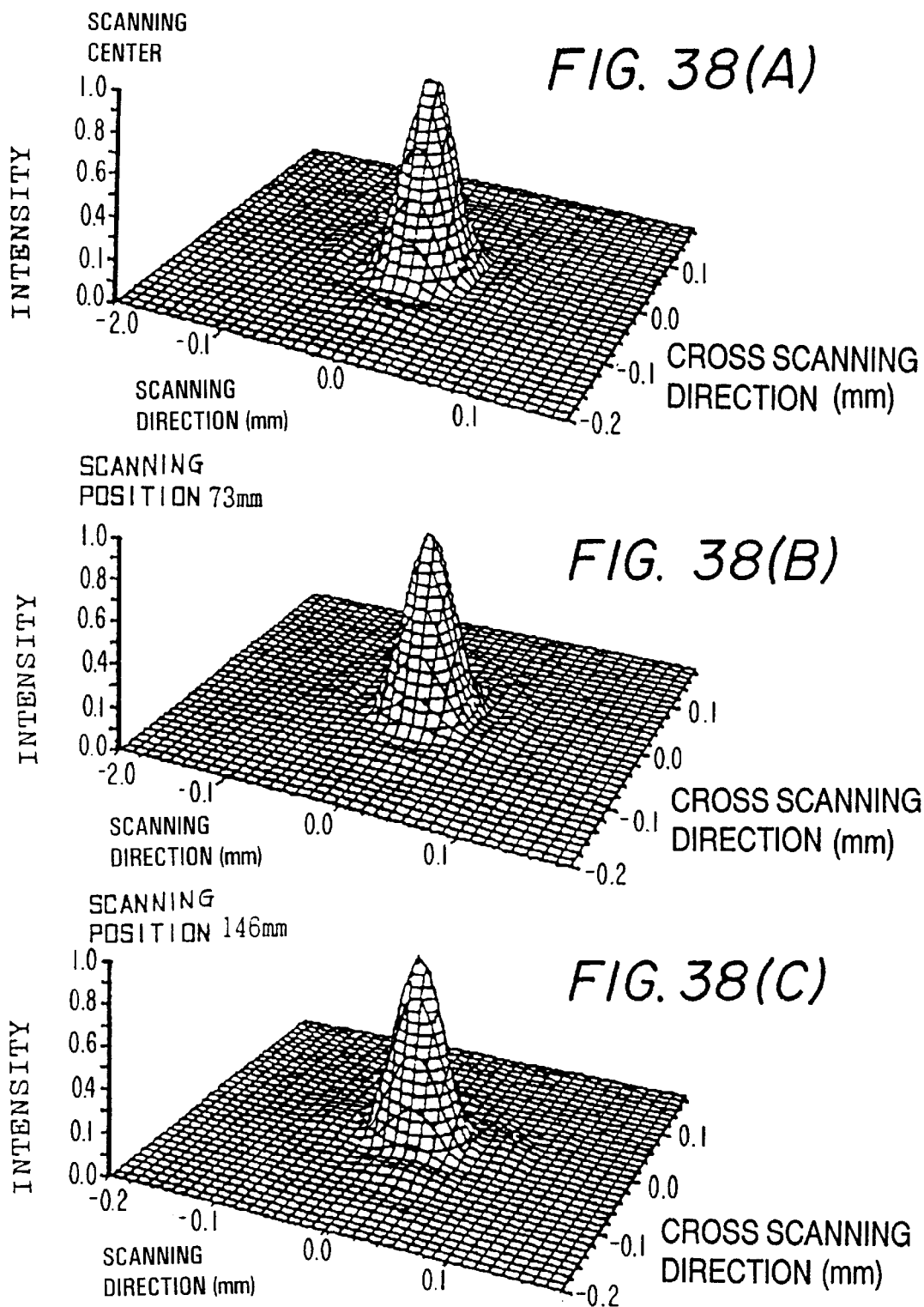

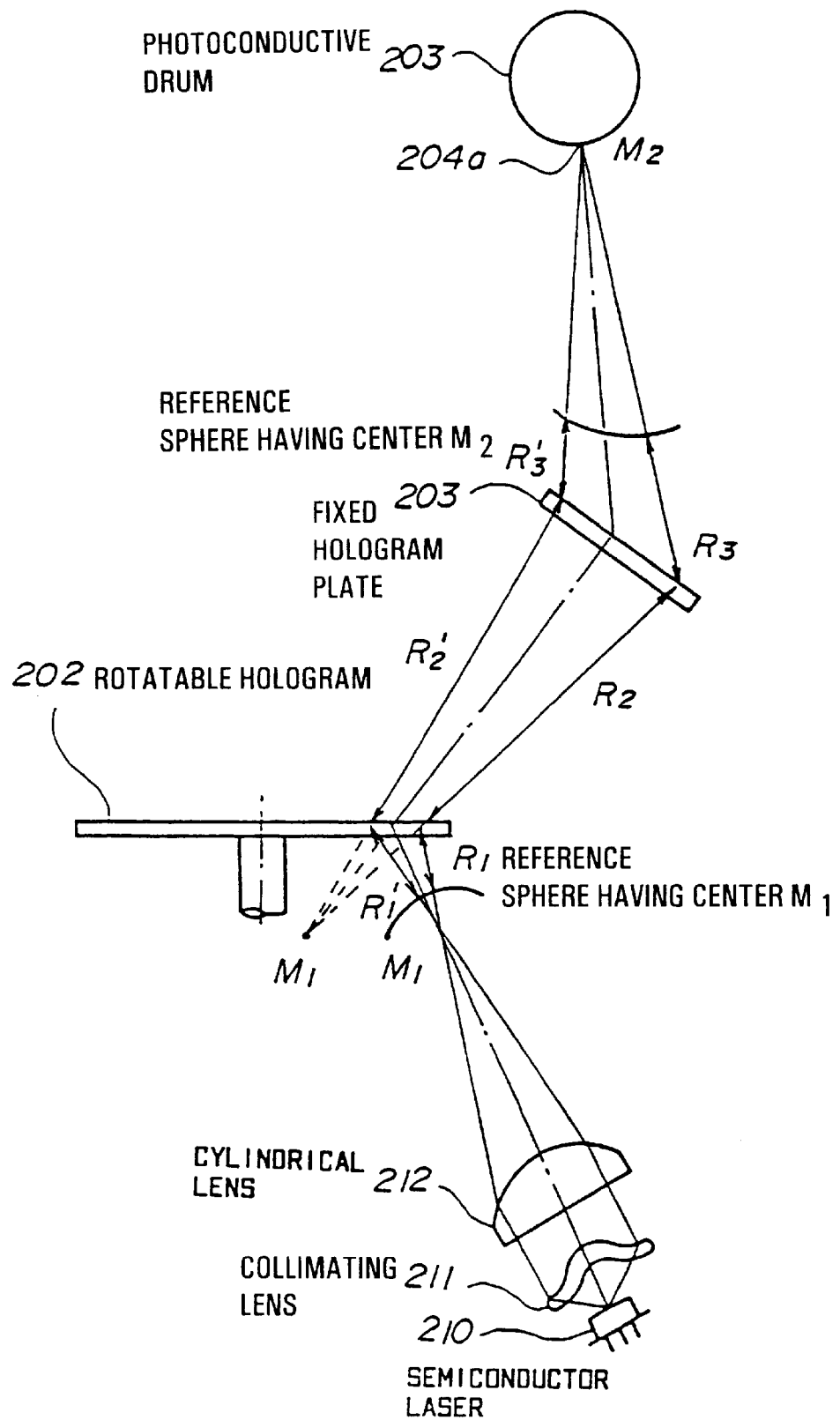

CROSS SCANNING DIRECTION    20 FIXED HOLOGRAM PLATE

SCANNING DIRECTION    20 FIXED HOLOGRAM PLATE

FIG. 47

| | |
|---|---|
| BEAM ABERRATION | 16 ~ 38 μm |
| DEVIATION FROM A STRAIGHT LINE | LESS THAN 2 μm |
| DISPLACEMENT (CROSS SCANNING DIRECTION) DUE TO WAVELENGTH VARIATION (2nm) | -20 ~ 8 μm |
| DISPLACEMENT (SCANNING DIRECTION) DUE TO WAVELENGTH VARIATION (2nm) | 0 μm |
| LINEARITY | -2.2 % |

FIG. 48

| | |
|---|---|
| BEAM ABERRATION | 12 ~ 14 μm |
| DEVIATION FROM A STRAIGHT LINE | LESS THAN 16 μm |
| DISPLACEMENT (SCANNING DIRECTION) DUE TO WAVELENGTH VARIATION (2nm) | -6 ~ 6 μm |
| DISPLACEMENT (CROSS SCANNING DIRECTION) DUE TO WAVELENGTH VARIATION (2nm) | 4 ~ 0 μm |
| LINEARITY | -0.43 % |

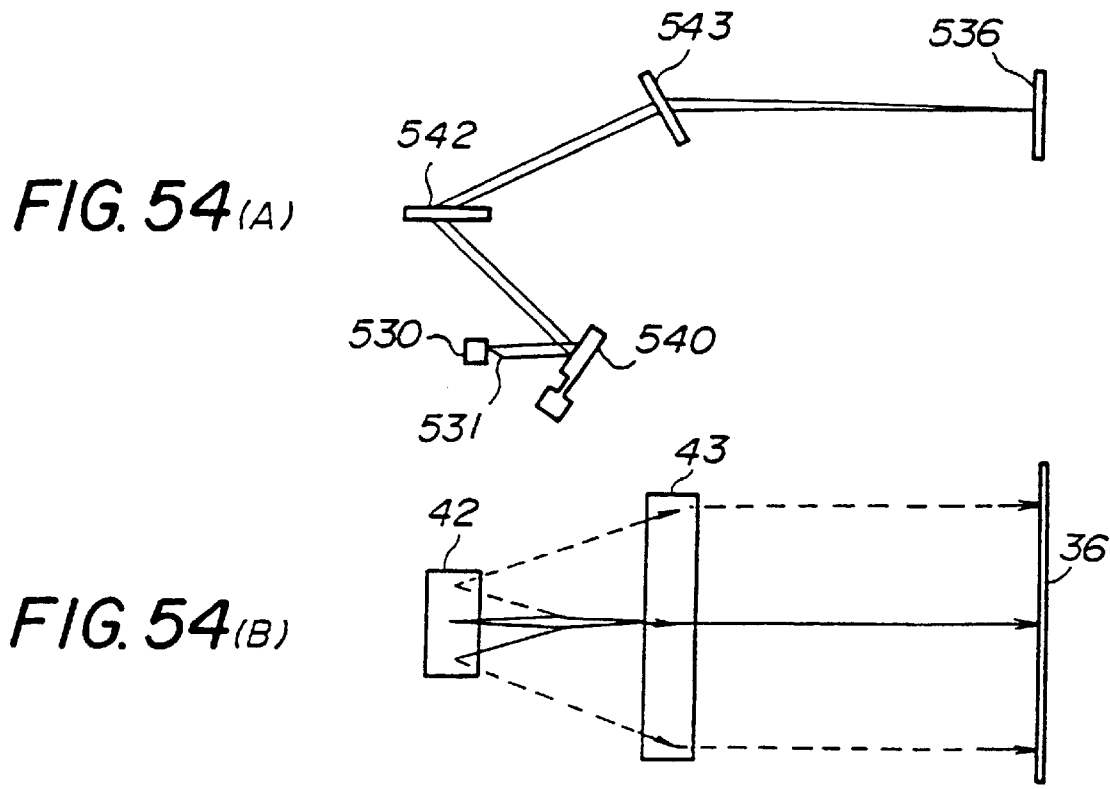
FIG. 54(A)
FIG. 54(B)
FIG. 55(A)
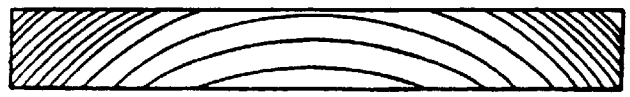
FIG. 55(B)

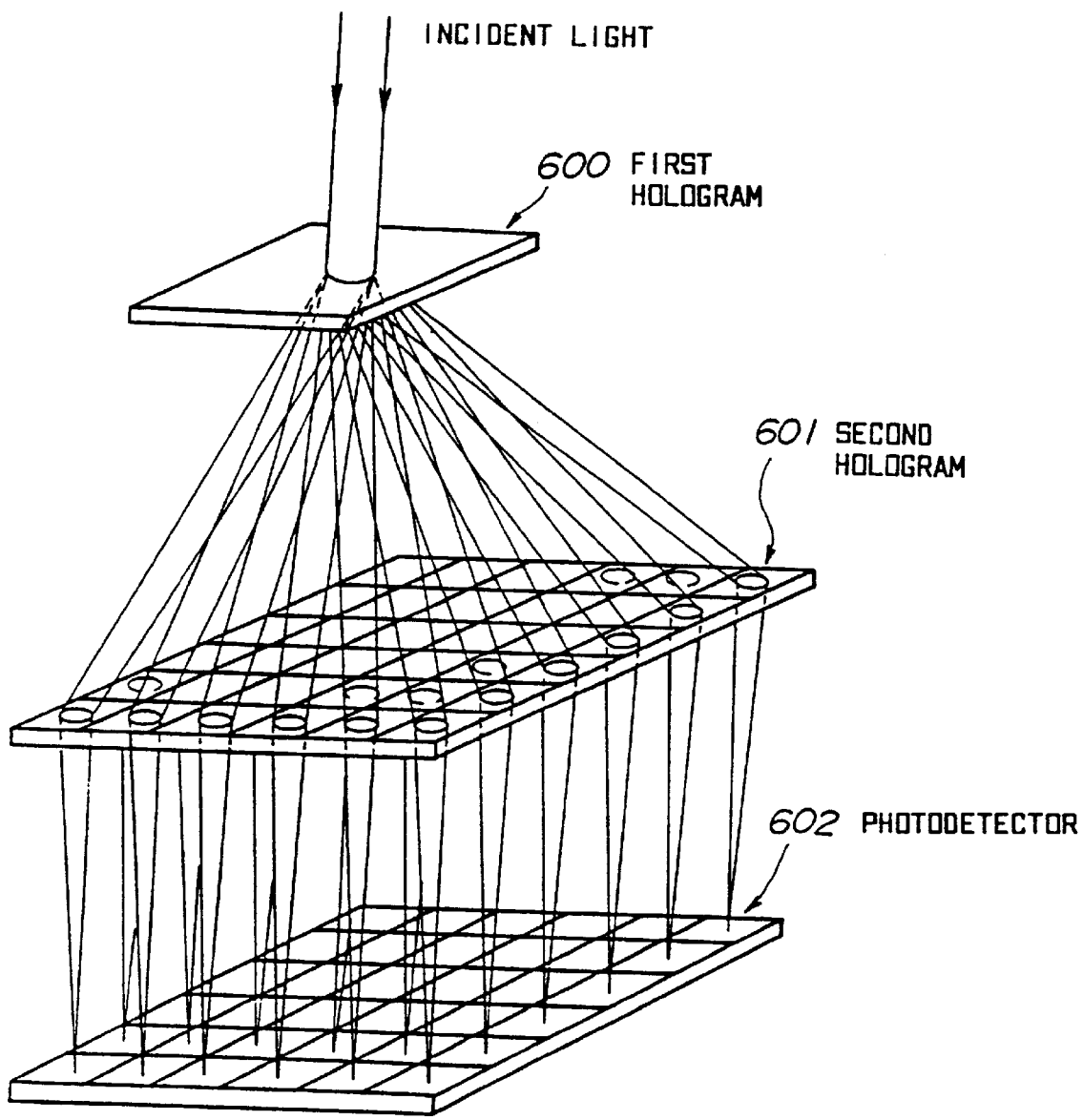

$$\phi_H = C_1 X^2 + C_2 Y^2 + a\sqrt{X^2 + Z_0^2} - b\sqrt{X^2 + (Y-Y_0)^2 + Z_0^2}$$

又は

$$\phi_H = C_1 X^2 + C_2 Y^2 + C_0 Y + a\sqrt{X^2 + Z_0^2} - b\sqrt{X^2 + (Y-Y_0)^2 + Z_0^2}$$

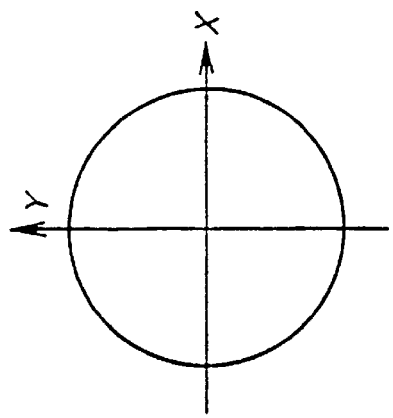
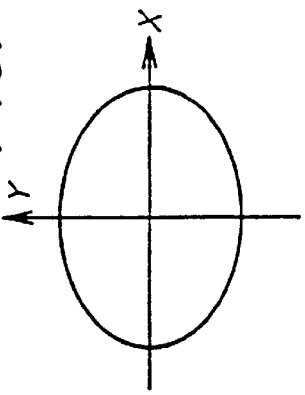
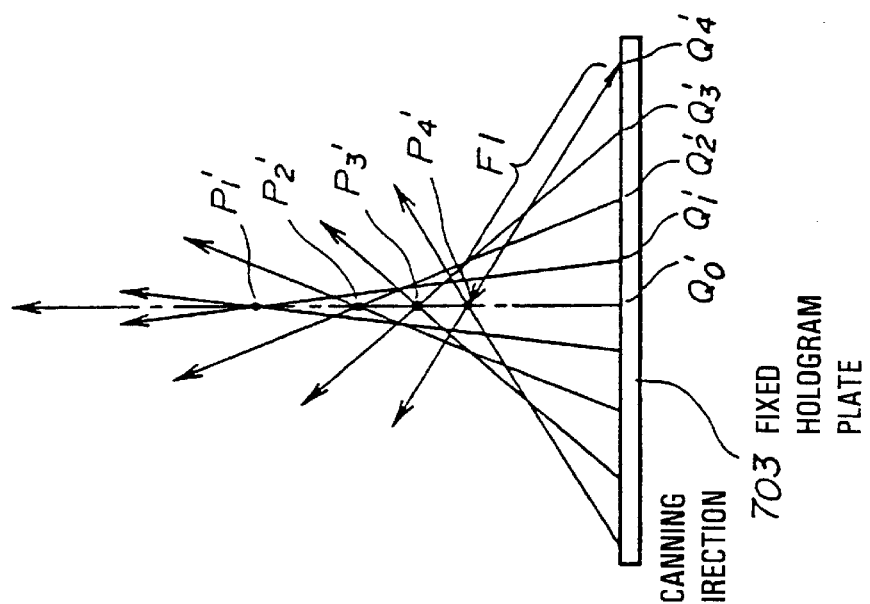
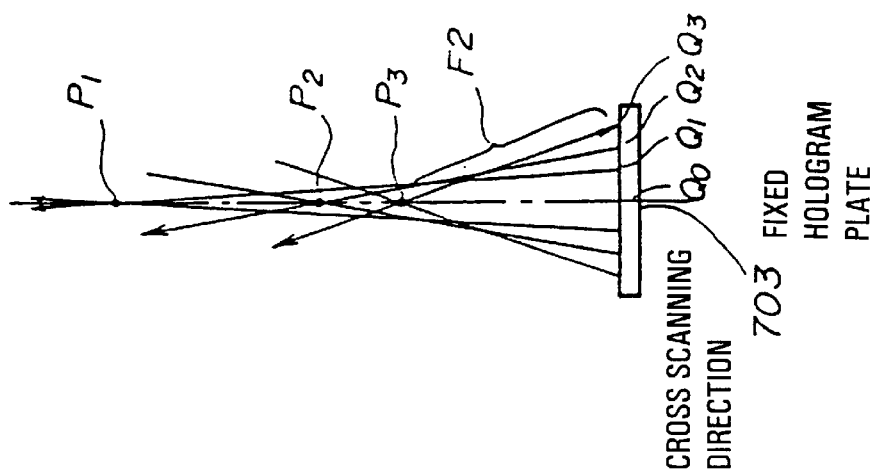

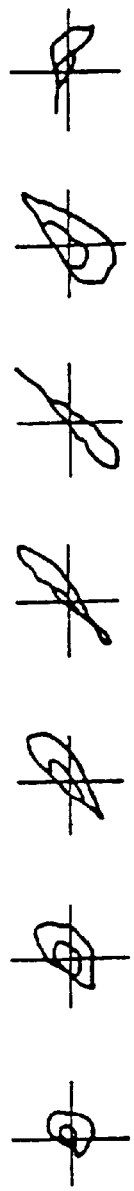
FIG.66 SPOT DIAGRAM

DIAGRAMS DESCRIBING FABRICATION OF
FIXED HOLOGRAM PLATE (PART 1)

DIAGRAMS DESCRIBING FABRICATION OF
FIXED HOLOGRAM PLATE (PART 2)

PLANO-CONVEX (PLANO-CONCAVE)
LENS

PLANO-CONCAVE (PLANO-CONVEX)
CYLINDRICAL LENS

PLANO-CONVEX (PLANO-CONCAVE)
CYLINDRICAL LENS

PLANO-CONVEX (PLANO-CONCAVE)
CYLINDRICAL LENS

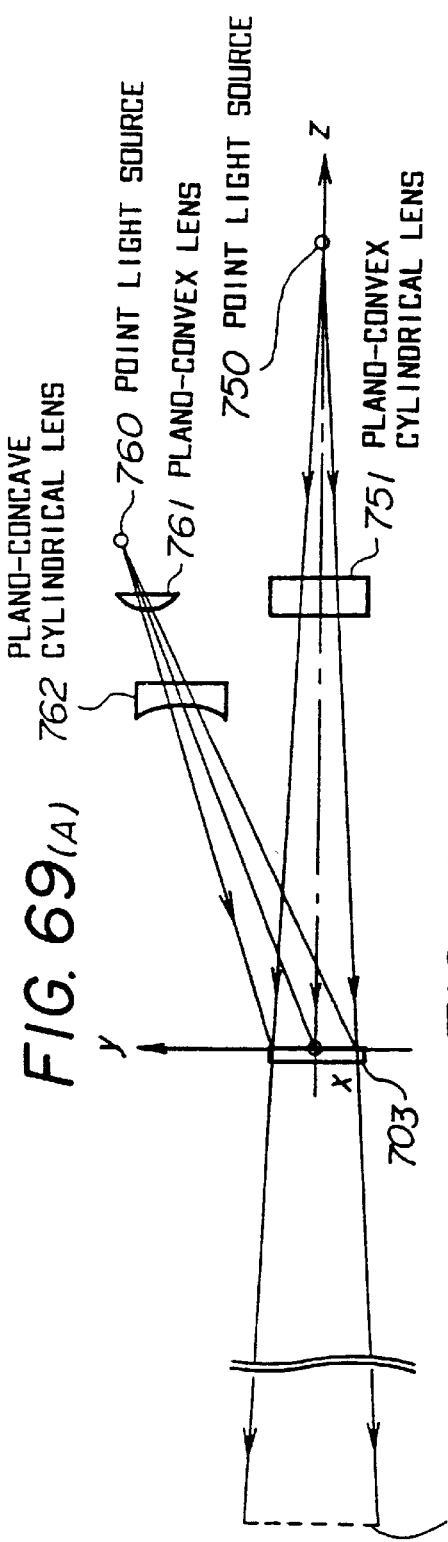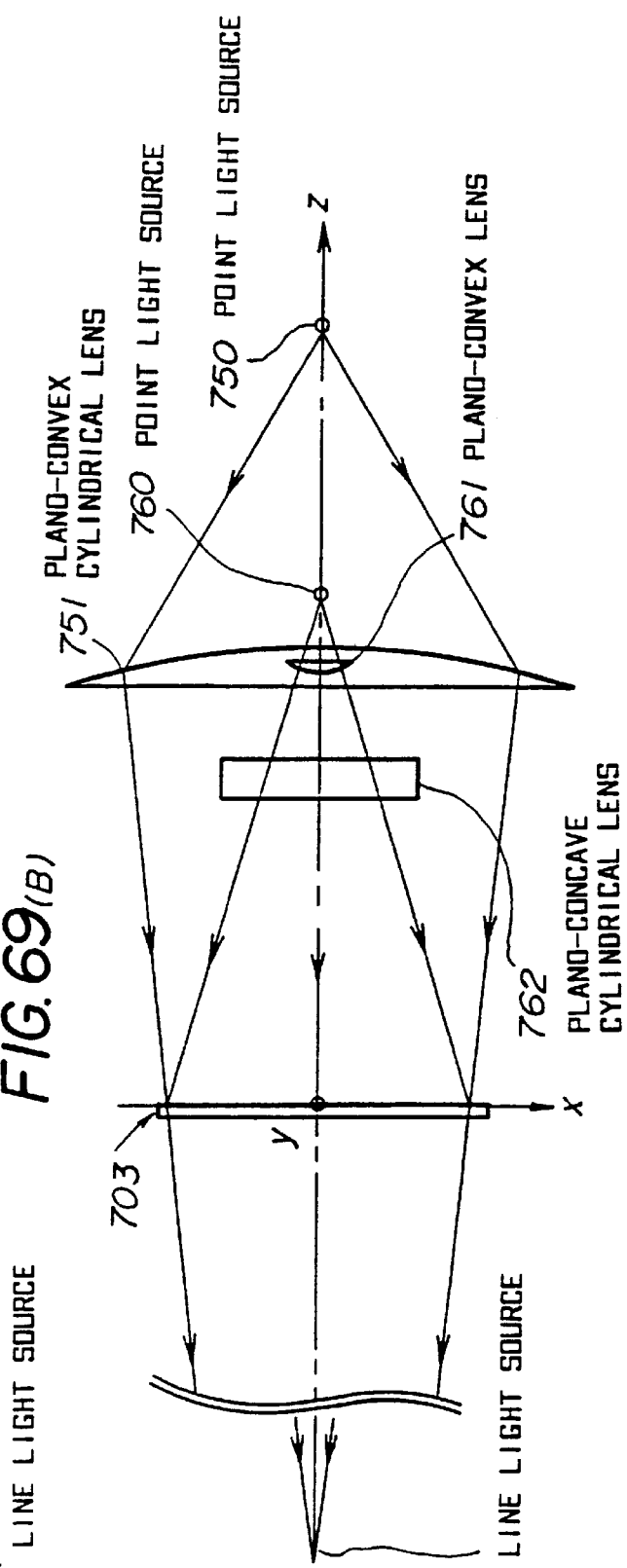
FIG. 69(A)
FIG. 69(B)

$$f = \frac{\sin \theta_1 + \sin \theta_2}{\lambda_0}$$

$$f = \frac{\sin \theta_1' + \sin \theta_2'}{\lambda_1}$$

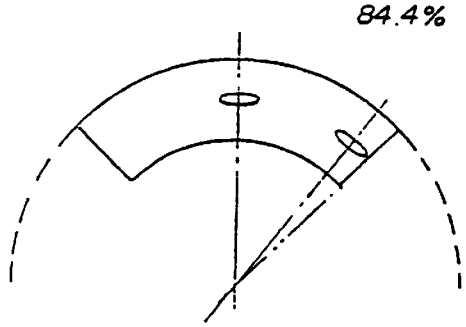
FIG. 80(A) 84.4%
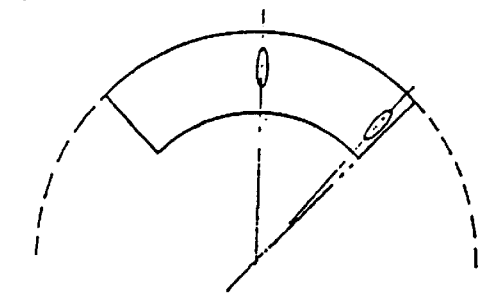
FIG. 80(B) 93.3%
FIG. 81
| i | C | i | C |
|---|---|---|---|
| 1 | $-1.300442 \times 10^{-17}$ | 6 | $3.970543 \times 10^{-12}$ |
| 2 | $2.568331 \times 10^{-5}$ | 7 | $5.238660 \times 10^{-23}$ |
| 3 | $6.512401 \times 10^{-19}$ | 8 | $2.638585 \times 10^{-15}$ |
| 4 | $7.134063 \times 10^{-8}$ | 9 | $-1.226102 \times 10^{-25}$ |
| 5 | $-9.220006 \times 10^{-21}$ | 10 | $2.919112 \times 10^{-18}$ |

LIGHT BEAM SCANNING APPARATUS

This application is a division of application Ser. No. 07/949,520, filed Nov. 25, 1992, now U.S. Pat. No. 5,680,253, which is a 371 filing of PCT/JP92/00371 filed Mar. 26, 1992.

FIELD OF THE INVENTION

The present inventions pertain to a method of manufacturing a light beam scanning apparatus and a fixed hologram plate and to a rotatable hologram and a light distributing apparatus. More particularly, the present invention refers to a method of manufacturing a light scanning apparatus employing a hologram disk, a method of manufacturing fixed hologram plate, and to a rotatable hologram and a light distributing apparatus.

BACKGROUND ART

A high-precision and high-resolution laser-scanning optical system is used in office automation equipment including a laser printer and a laser facsimile, and in such apparatuses as a laser drawing apparatus and a laser inspection apparatus. Conventionally, this optical system is embodied by a rotating polygonal mirror and a combination of a plurality of f-θ lenses.

In the above method employing a polygonal mirror, efforts to lower cost have met with difficulty because of the high precision required to fabricate a rotating polygonal mirror and because of a large number of lens groups required, including f-θ lenses that serve, at the same time, as inclination correction optical system.

On the other hand, a hologram scanning apparatus employing a hologram can be mass produced. As an example of such a hologram scanning apparatus, the present applicant has filed an application for a hologram scanning apparatus for performing a scanning with a straight beam having a high resolution and having sufficiently corrected aberration (the Japanese Laid-Open Patent Application 63-072633 and the Japanese Laid-Open Patent Application 61-060846). This light beam scanning apparatus achieves, as a scanning optical system for a laser printer, excellent specifications characterized by a high precision, ensuring a stable print quality. However, there is now a demand for a laser-scanning optical system having even higher resolution, on the order of 400–600 dpi or even 1000 dpi. Also, further cost reduction is desired.

In order to embody a hologram scanner having such an extremely high resolution at a low price, the following objectives need be resolved:

① scanning beam radius should be as thin as 60 μm (equivalent to 400 dpi), for example, and as uniform as possible; and ② a scanning should be carried out at the same velocity as that of the rotation of a rotatable hologram, which rotation is at constant angular acceleration.

Since a wavelength of a semiconductor laser used therein as a scanning light source can vary according to ambient temperature and since several longitudinal modes can be produced, ③ displacement in a scanning direction of a scanning beam should be compensated for; and ④ displacement in a cross scanning direction of a scanning beam should be compensated for.

Since a scanning beam displacement is attributable to a warping of a base used in a rotatable hologram and the warping takes place as a result of using a floating glass, which is of low cost and needs no polishing, or a plastic base (PMMA, for example) enabling injection molding, ⑤ a scanning beam displacement due to the plastic base being moved from its ideal position should be compensated for.

The present applicant had proposed a method of achieving the above tasks in the Japanese Laid-Open Patent Application 58-119098. The device used in the method comprises, as shown in FIG. 14, a rotatable hologram 10 and a fixed hologram plate 20 disposed between the rotatable hologram 10 and an image formation surface 4. The hologram 10 is a rapidly rotating rotatable hologram in which a plurality of hologram plates are disposed. Further, 5 is a reconstructing beam, 6 is a diffracted wave outgoing from the hologram plate 10, and 7 is a diffracted wave outgoing from the fixed hologram plate 20. The reconstructing beam from a semiconductor not shown in the figure is diagonally incident on the rotating rotatable hologram 10, whose rotation enables the scanning by the diffracted wave 6. The diffracted wave 6 is incident on the fixed hologram plate 20, and the diffracted wave 7, which is a wave diffracted therefrom, scans the image formation surface 4.

In the above configuration, displacement of a scanning beam position due to a wavelength variation of the semiconductor laser is compensated for, and a velocity of the scanning beam is maintained constant by a rotation of constant angular acceleration of the rotatable hologram 10, so that a straight-line scanning by a scanning beam is achieved. Further, displacement of a scanning beam position both in the scanning direction and the cross scanning direction, which displacement is due to a wavelength variation of the semiconductor laser, is corrected by having the fixed hologram plate 20 bend the scanning beam in a direction counter to a scanning direction of the rotatable hologram 10.

As an improved method of compensating for displacement of the scanning beam position in the cross direction due to a wavelength variation of the semiconductor laser, the present applicant filed an application for the Japanese Laid-Open Patent Application 60-168830, in which it is proposed that a fixed hologram plate be spatially placed before the rotatable hologram.

The present applicant also made a proposition in the Japanese Laid-Open Patent Application 2-179437 (the domestic declaration of priority on the Japanese Laid-Open Patent Application 1-240720), in which is proposed a construction capable, by employing at least two holograms, of maintaining uniform optical path lengths from an incident wave to an image formation surface, and of preventing degradation of wavefront characteristics on the image formation surface, which degradation is caused by a wavelength variation of the reconstructing light source. Since the Japanese Laid-Open Patent Application 2-179437 relates to an optical system where at least two holograms, as mentioned above, are fixed, and therefore only one image formation point is provided, an application of the same device to the scanning optical system now being discussed entails some difficulty in that moment-by-moment optical path length changes, which take place as the beam scanning proceeds, inevitably cause the optical path length to be longer at the scanning end than at the scanning center. Accordingly, the aforementioned conventional technology has not resolved all of the objectives from ① through ⑤ described earlier.

SUMMARY OF THE INVENTION

It is an object of the present invention to provide, as a solution to the objectives ① through ⑤ above a method of manufacturing a high-resolution light-beam scanning apparatus employing only mass-producible holograms without using any auxiliary optical system consisting of optical lenses or mirrors having curvature. It is another object of the present invention to provide a method of manufacturing a fixed hologram plate.

Another object of the present invention is to provide a method of manufacturing a light beam scanning apparatus employing at least two holograms, wherein a quality of a scanning beam or a scanning performance does not show deterioration even when a wavelength displacement owing to a wavelength variation or a wavelength dispersion of the light source takes place.

Yet a further object of the present invention is to provide a method of manufacturing a hologram plate.

A further object of the present invention is to provide a light-beam scanning apparatus employing at least two holograms, wherein color aberration due to a wavelength displacement caused by a wavelength variation or wavelength dispersion of the light source is corrected.

A still further object of the present invention is to obtain a hologram construction and configuration and a configuration of the front of a reconstructing wave by which construction and configurations a light beam scanning apparatus can be obtained wherein displacement of a scanning beam position, and a blooming on the scanning surface can be minimized even when the wavelength displacement caused by a wavelength variation or wavelength dispersion of the light source arises.

In order to achieve the above objects, a light beam scanning apparatus of the present invention is configured such that a fixed plate, on which a diffraction grating is recorded, is installed between a rotatable hologram equipped with a diffraction grating and an image formation surface scanned by this rotatable hologram, wherein:

diffraction gratings are provided in the rotatable hologram and the fixed plate for minimizing a sum total of values obtained by weighting;

a square of the difference between a light flux optical-path length an optical measured along a principal axis of a light beam incident and diffracted by the diffraction grating provided in the above-mentioned rotatable hologram, and incident on and diffracted by the diffraction grating provided in the above-mentioned fixed plate so as to conduct a scanning and converges at a scanning point on an image formation surface, and a light flux optical-path length measured along a marginal ray distanced from the principal axis;

or by weighting an absolute value of this optical path length difference, the weighting being conducted at every scanning position covering an entire range of an image formation surface.

Further, a light beam scanning apparatus of the present invention is configured such that a fixed plate, on which a diffraction grating is recorded, is installed between a rotatable hologram equipped with a diffraction grating and an image formation surface scanned by this rotatable hologram, wherein:

diffraction gratings are included in the rotatable hologram and the fixed plate for minimizing a sum total of values obtained by weighting;

a square of a sum is obtained by adding an amount of displacement of a light beam incident on and diffracted by the grating provided in the above-mentioned rotatable hologram, incident on and diffracted by the grating provided in the fixed plate so as to perform a scan, and convergent on a scanning point on an image formation surface, the phase displacement of the diffraction grating provided in the rotatable hologram being measured along the peripheral axis distanced from the principal axis of an incident reconstructing light flux, to an amount of displacement of the same light. The displacement being measured with respect to the principal axis of a phase recorded on the diffraction grating when the light flux is incident on the fixed plate;

or by weighting an absolute value of the above sum, the weighting being conducted at every scanning position covering an entire range of the image formation surface.

BRIEF DESCRIPTION OF THE DRAWINGS

FIG. 12 is a diagram describing a manufacture of the fixed hologram plate;

FIG. 22 is a table showing the relationship between an incident wave and k;

FIG. 24 is a table showing the relationship among $x_1/F_1$, $\theta_1$, $\theta_2$;

FIG. 25(A) is a table showing the relationship among W, $\Delta\lambda$, $\xi$;

FIG. 25(B) shows examples of specifications for designing a second hologram and a scanning distance thereof;

FIG. 25(C) is a diagram depicting an example of a configuration where approximately the same image formation distance is obtained with respect to different outgoing angles;

FIGS. 38(A)–38(C) a beam intensity distribution of the first embodiment of the present invention (part 1);

FIG. 40 is a diagram depicting a configuration of the second embodiment of the present invention;

FIG. 47 is a table showing various beam characteristics obtained when setting a length of the fixed hologram plate to be short with respect to a light beam scanning distance;

FIG. 48 is a table showing various beam characteristics obtained when setting a length of the fixed hologram plate to be long with respect to a light beam scanning distance;

FIGS. 54(A)–54(B) shows a side view and top view of the second embodiment of the present invention;

FIGS. 55(A)–55(B) are diagrams describing holograms of an apparatus of FIG. 53;

FIG. 56 is a diagram depicting a configuration of an optic element, which is an embodiment of the present invention;

FIGS. 63(A)–63(D) are diagrams describing the fixed hologram plate of an embodiment of the present invention (object wave);

FIG. 66 are spot diagrams of an embodiment of the present invention;

FIGS. 69(A)–69(B) show diagrams describing the first embodiment of a hologram constructing exposure system of the present invention;

FIGS. 80(A) and 86(B) are diagrams describing an effect of the present invention; and FIG. 81 is a table showing a changing coefficient determined at the first to tenth order.

DESCRIPTION OF THE PREFERRED EMBODIMENTS

A description of the principle of the present invention will be given below, followed by a description of concrete configurations and effects of the present invention. The first embodiment explained below conceptually presents a basis for each of the embodiments that will be described herein below.

Figure 1:
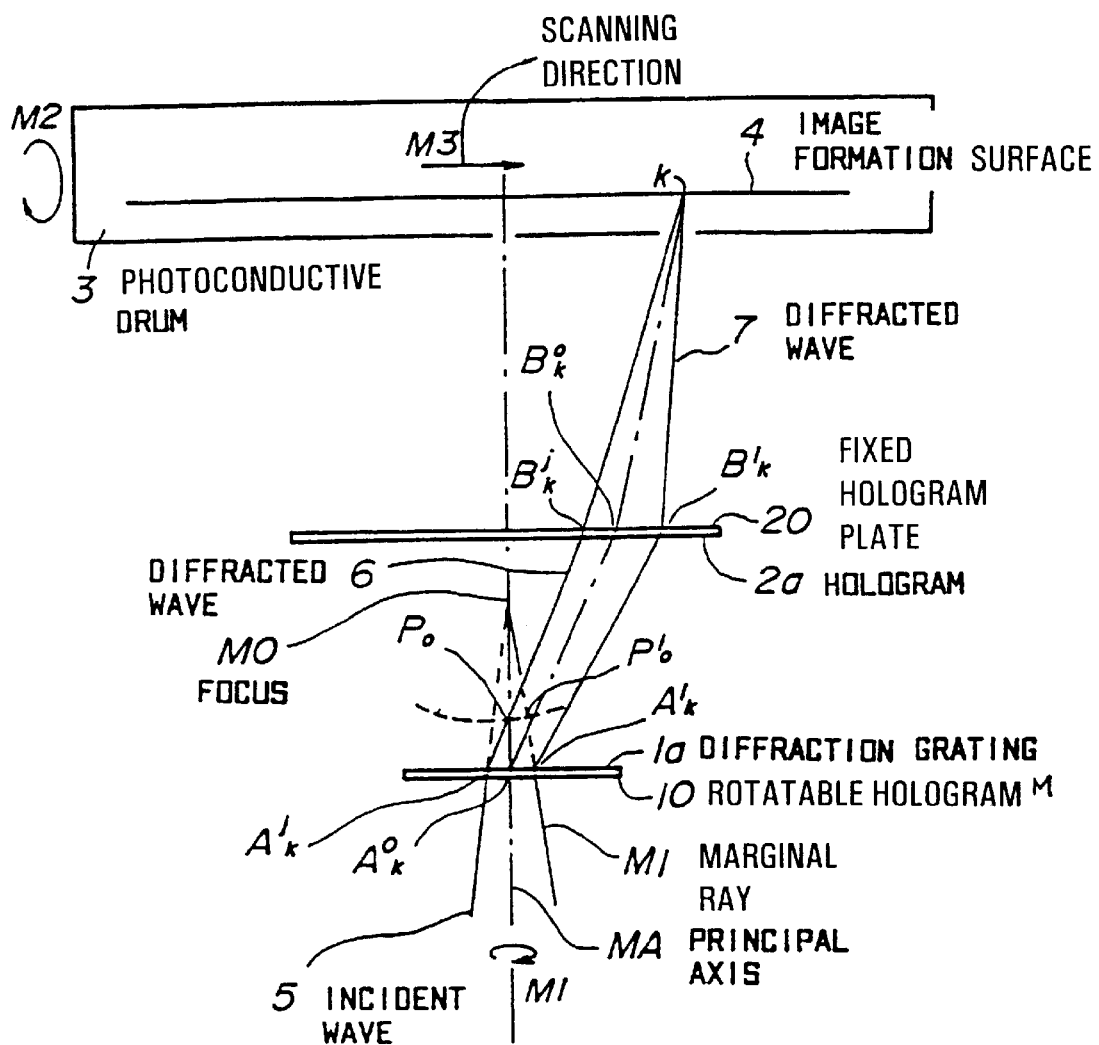
FIG. 1 is a diagram describing a first embodiment of the present invention.

FIG. 1 is a diagram describing how a correction is carried out for a displacement of a position of a diffracted light of a scanning optical system, which displacement is caused by a wavelength variation of a semiconductor laser not shown in the figure. A rotatable hologram 10 is equipped with a plurality of diffraction gratings 1a for carrying out a scanning. An image formation surface 4 is in the form of a photoconductive drum 3 in such apparatus as a laser printer, for example. A direction represented by M2, at right angles to a laser scanning direction M3, is called a cross scanning direction. An assumption here is that a spherical converging wave (hereinafter called an incident wave 5) having its focus position at MO enters, and that a scanning beam converges, owing to a rotation of the rotatable hologram 10, on a scanning point k on the image formation surface 4. Specifically, light flux of the incident wave 5, namely a reconstructing light, is incident on the rotatable hologram 10 to become a diffracted light 6, which is further diffracted by a fixed hologram plate 20 to become a diffracted light 7, which light 7 converges on the scanning point k. An optical path length $L_D$ of an optical path originating in each incident light flux and ending in the scanning point k, the path length being measured along a beam, within the incoming wave 5, whose principal axis is a principal axis MA of the rotatable hologram 10, is given by the equation (1). Here, the incident light flux is represented as an optical path from the rotatable hologram 10 to the reference sphere whose center is a convergent point $P_0$. In case of a converging wave, the sign of an optical path length becomes negative. In the equation shown below, parentheses ( ) indicate a distance between the points entered in the parentheses. For example, $(A^0_k P_0)$ represents a distance between a point $A^0_k$ and the point $P_0$. The parentheses have the same meaning throughout the equations that appear after equation (1).

$$L_0 = -(A^0_k P_0) + (A^0_k B^0_k) + (B^0_k k) \tag{1}$$

An optical path length $L_1$ of an optical path originating in the incoming light flux of the incoming wave 5, which light flux is incident along a marginal ray MI, and ending in the scanning point k is given as per the equation (2).

$$L_1 = -(A^i_k P^i_0) + (A^i_k B^i_k) + (B^i_k k) \tag{2}$$

A condition under which the scanning beam is not removed from the scanning point k, even when the incident wave 5 from the semiconductor laser incurs a wavelength variation at the scanning point k, is represented by the equation (3).

$$-(A^i_k P^i_0) + (A^i_k B^i_k) + (B^i_k k) = -(A^j_k P^j_0) + (A^j_k B^j_k) + (B^j_k k) \tag{3}$$

That is, the removal is prevented as long as the optical path lengths of the incident wave 5 within the light flux, which wave is incoming on courses other than along the principal axis MA, are uniform. The condition under which a focal distance on the scanning beam image formation surface 4 does not show a variation in response to a wavelength variation due to mode hops of the incident wave 5 from the semiconductor laser 5, is given by the equation (4).

$$-(A^0_k P_0) + (A^0_k B^0_k) + (B^0_k k) = -(A^i_k P^i_0) + (A^i_k B^i_k) + (B^i_k k) \tag{4}$$

That is, variation is prevented as long as the optical path lengths of the incident wave 5 remain the same when the wave is incident along the principal axis MA as when it is incident along the marginal ray MI. Accordingly, a configuration fulfilling the equations (3) and (4), at the same time, at the scanning point is required in order to prevent deterioration caused by a semiconductor laser wavelength variation in the scanning beam quality across the entire scanning range of the image formation surface 4 on the photoconductive drum 3.

The above condition of having uniform optical path lengths is met by minimizing and thus optimizing performance functions as per equations (5) or (5-1) below, where the optical path length difference is denoted by $\delta l^k$, and is measured at the scanning point k between the beam that is incident along the principal axis MA and the beam that is incident along the marginal ray MI.

$$E = \sum_k W_k \cdot (\delta l^k)^2 \tag{5}$$

$$E = \sum_k W_k \cdot |\delta l^k| \tag{5-1}$$

where $W_k$ represents a weight determined by the degree of minimization of the optical path length at each scanning point.

A description will be given below of a method utilizing a phase change by a hologram. In the following, $\Phi_{in}$ represents a phase of the wavefront of a wave incoming into the rotatable hologram 10; $\Phi_H^k$ represents a phase transfer function of the hologram along the principal axis MA, which hologram is created by the rotatable hologram 10 as the rotatable hologram 10 scans the scanning point k; $\Phi_{H2}^k$ represents a phase transfer function of the hologram of the principal axis corresponding to the scanning point k of the fixed hologram plate; $\delta\Phi_H$ represents displacement, along the phase of the principal axis wavefront, of the phase of the peripheral wavefront of the incident light flux; $\delta\Phi_H^k$ represents displacement, from the phase of the principal axis wavefront, of the phase transfer function of the hologram created by the rotatable hologram 10; $\delta\Phi_{H2}^k$ represents displacement, from the phase of the principal axis wavefront, of the phase transfer function of the fixed hologram plate 20.

Since the condition for having regularity in the phases of the incident beams on the image formation surface, which regularity is required to form satisfactory images created by an aberration-free scanning beam, in other words to eliminate wavefront aberration, is that the phase of the wave outgoing from the hologram is the sum of the phase of the incoming wave on the hologram and the phase transfer function of the hologram, we obtain the equation (6).

$$\Phi_{in} + \Phi_H{}^k + k_2(A_k^0 B_k^0) + \Phi_{H2}{}^k + k_2(B_k^0 k) = \Phi_{in} + \delta\Phi_{in} + \qquad (6)$$
$$\Phi_H{}^k + \delta\Phi_H{}^k + k_2(A_k^i B_k^i) + \Phi_{H2}{}^k + \delta\Phi_{H2}{}^k + k_2(B_k^i k)$$

where $k_2$ represents a wavelength ($2\pi/\lambda_2$).

This equation (6) is transformed into the equation (7) below when the equation (3), which relates to displacement of the scanning beam due to a wavelength variation, and the equation (4), which relates to a focal distance variation on the image formation surface 4, are both fulfilled.

$$\delta\Phi^k = \delta\Phi_H{}^k + \delta\Phi_{H2}{}^k = 0 \qquad (7)$$

This equation (7) is to be fulfilled at the scanning point k for regularity in the phases incident on the image formation surface to be obtained. The equation (7) shows that, in order to maintain a good image formation quality, the sum of displacements of the phase transfer functions recorded on the rotatable hologram 10 and the fixed hologram plate 20 should be made zero at each scanning point k. As will be later described in a detailed description of the equation (7), $\delta\Phi^k$ in the equation (7), which represents phase displacement at the scanning point k, is minimized in a scanning range by using a performance function E expressed by the equations (8) or (8-1) below.

$$E = \sum_k W_k \cdot (\delta l^k)^2 \qquad (8)$$

$$E = \sum_k W_k \cdot |\delta l^k| \qquad (8-1)$$

where $W_k$ is a weight factor introduced in order to reduce displacement of phases at each scanning point. optimization of a hologram is carried out by minimizing the equations (8) or (8-1).

Figure 2A:
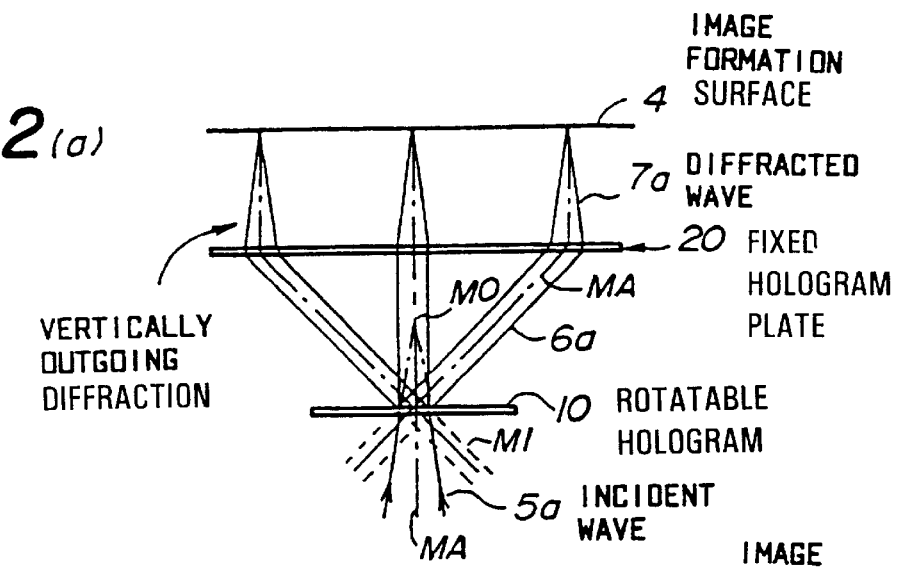
FIGS. 2(a)–2(c) are diagrams describing the scanning direction of a light beam scanning apparatus.
Figure 2B:
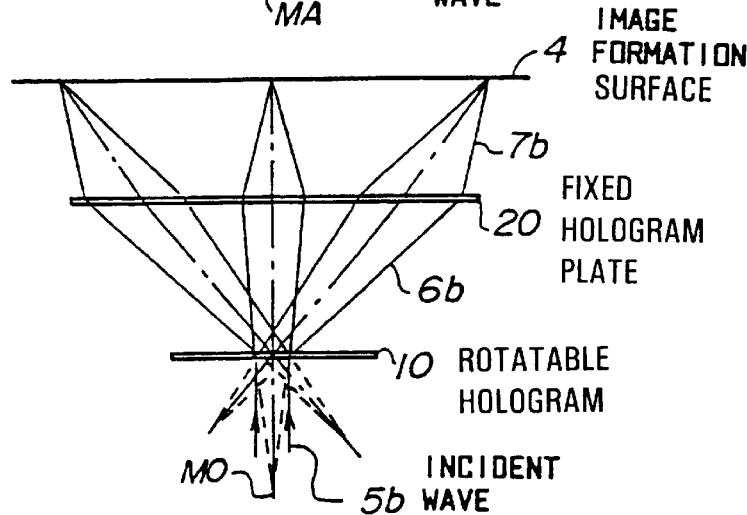
Figure 2C:
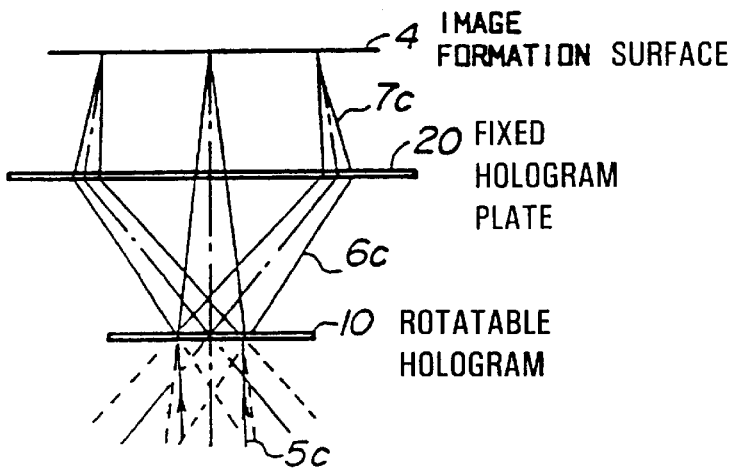

A description will be given next of a case where the optical path lengths are uniform. FIGS. 2(*a*)–2(*c*) describe describes an optical path length along the scanning direction. FIG. 2(*a*) depicts a parallel wave 6*a* outgoing from the rotatable hologram 10. Given that an incident wave 5*a* is a converging spherical wave having a focus MO, the optical path lengths of the light beams contained in the light flux, which paths end at each scanning point on the image formation surface 4, are controlled to be uniform, as can be seen from FIG. 2, by allowing diffracted waves 7*a* to go out approximately perpendicularly from the fixed hologram plate 20.

FIG. 2(*b*) depicts a divergent wave 6*b*, having a focus MO, outgoing from the rotatable hologram 10, where an incident wave 5*b* is a converging spherical wave as in FIG. 2(*a*). The optical path lengths of the light beams contained in the light flux, which paths end at each scanning point on the image formation surface 4, are controlled to be uniform by directing the incident wave 7*b* from the fixed hologram plate 20 to be incident closer to a scanning center than the trajectory of an outgoing wave 6*b* from the fixed hologram plate 20. The best configuration is the one in which the sign of the diffraction angle is not reversed.

FIG. 2(*c*) depicts a converging wave 6*c* outgoing from the rotatable hologram 10, where an incident wave 5*c* is a converging spherical wave as in FIG. 2(*a*). The optical path lengths of the light beams contained in the light flux, which paths end at each scanning point on the image formation surface 4, are controlled to be uniform by directing an outgoing wave 7*c*, outgoing from the fixed hologram plate 20, to be incident closer to the scanning center than the original trajectory of a converging wave 6*c* incident on the fixed hologram plate 20, and by reversing the sign of the diffraction angle.

Figure 3:
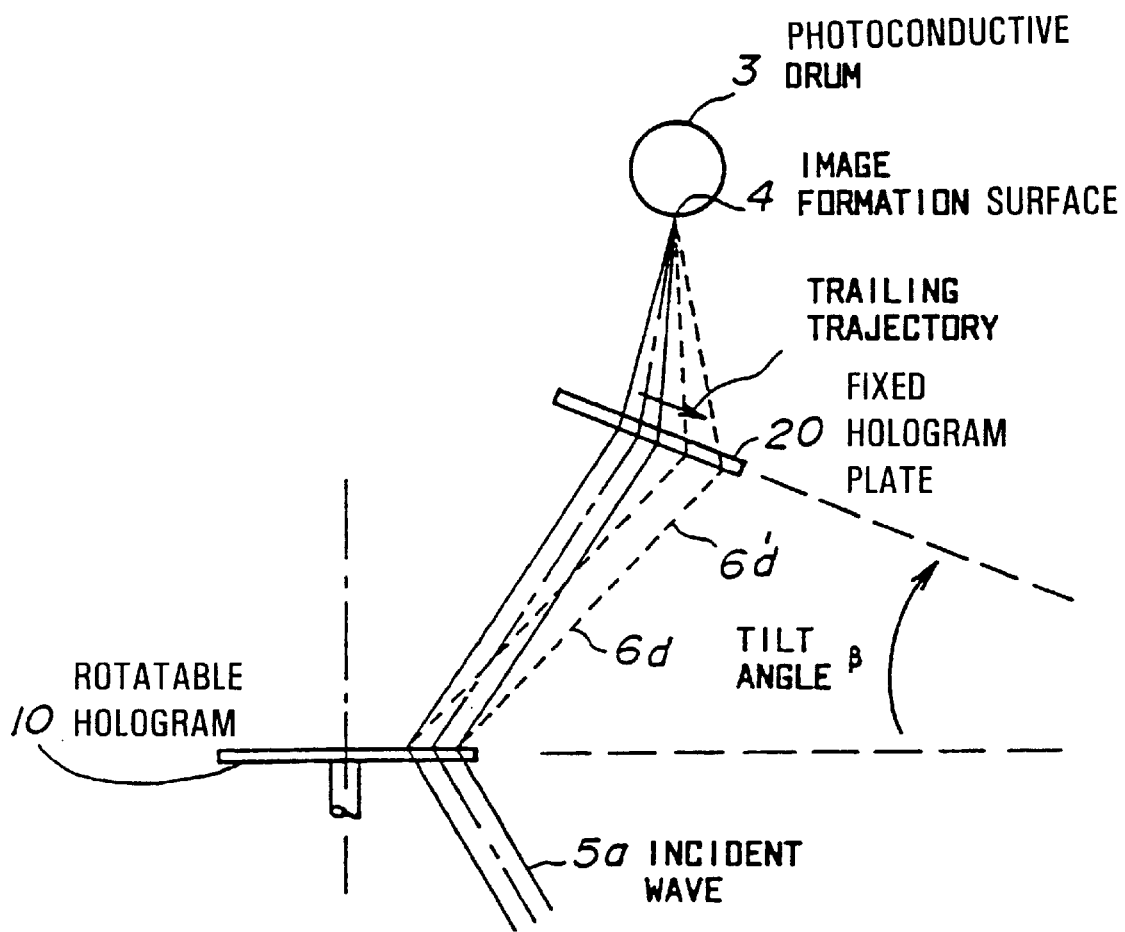
FIG. 3 is a diagram describing the cross scanning direction of a light beam scanning apparatus.

The configurations described above are designed for the scanning direction; the configurations for the cross scanning direction are described in the following. FIG. 3 is a diagram describing a scanning carried out in the cross scanning direction, and more particularly a side view showing a configuration by which the optical path lengths in the cross scanning direction are maintained uniform. A diffracted wave 6*d* is produced from the incident wave 5*a* incident on the rotatable hologram 10. After being diffracted, the wave outgoing from the fixed hologram plate 20 forms an image on the image formation surface 4 on the photoconductive drum 3. Parts that are the same as FIG. 3 are given the same reference notations from figure to figure. In this case, the fixed hologram plate 20 is tilted with respect to the rotatable hologram 10 so as to correct displacement of the scanning beam on the image formation surface 4 due to a wavelength variation of the reconstructing light source, and to obtain the equal optical path lengths. This tilt angle β is configured such that displacement of the scanning beam is minimized. Consequently, when the outgoing wave 6*d* from the rotatable hologram 10 is a parallel wave, the fixed hologram plate 20 allows the wave to follow, at the scanning end, a trailing trajectory indicated by a broken line 6'*d*, so that the optical path lengths of the light flux in each scanning range are uniform and so that a straight-line scanning on the image formation surface 4 is possible. The wave is returned to the original image formation point by means of the fixed hologram plate 20, making a straight-line scanning possible. The trajectory of the rotatable hologram 10 at the scanning center and the scanning end can be opposite to each other.

As shown in FIG. 2(*a*), better scanning beam focal-distance correction for variation due to a wavelength variation of the reconstructing light source, is achieved by making the wavefront of the incident wave 5*a*, incident on the rotatable hologram 10, be a converging spherical wave and making equal the optical path lengths of the light fluxes, namely the light flux incident along the principal axis MA and the light flux incident along the marginal ray MI. The best compensation effect is achieved by making the distance the converging spherical wave 5*a* travels between the surface of the rotatable hologram 10 and the focal point MO equal, or nearly equal, to the distance between the face of the rotatable hologram 10 and the surface of the fixed hologram plate 20.

While the scanning velocity of a normal rotatable hologram 10 becomes higher as the scanning beam travels to the scanning end when the rotatable hologram 10 rotates at a constant angular velocity, the present invention allows the scanning beam to be returned to the scanning center through the use of the fixed hologram plate 20, thus making it possible to provide both a quantitative matching and a compensation sufficient to make constant the scanning velocity on the scanning surface. Embodiments of a light-beam scanning apparatus employing a hologram having the above-mentioned attributes are described in the following.

Figure 4:
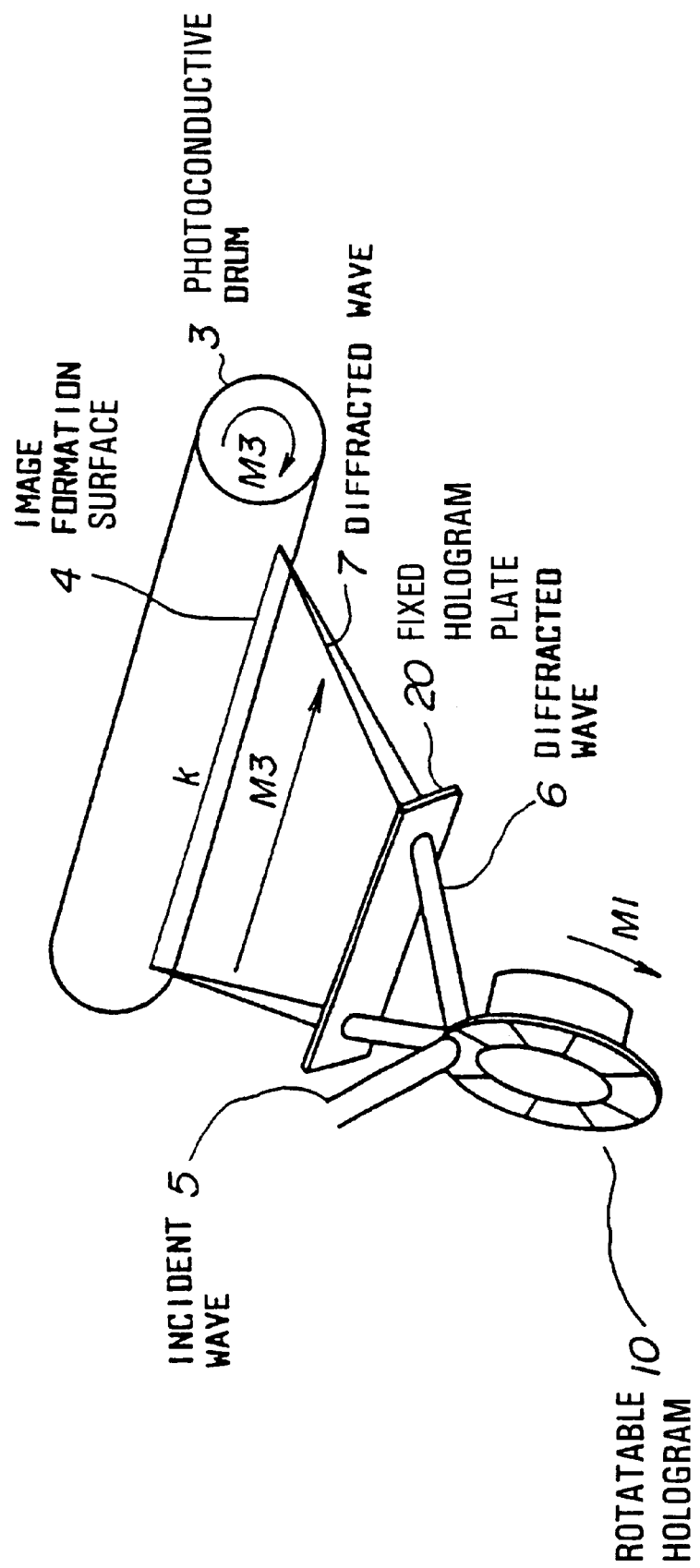
FIG. 4 is a diagram depicting a configuration of the scanning apparatus of the present invention.
Figure 5:
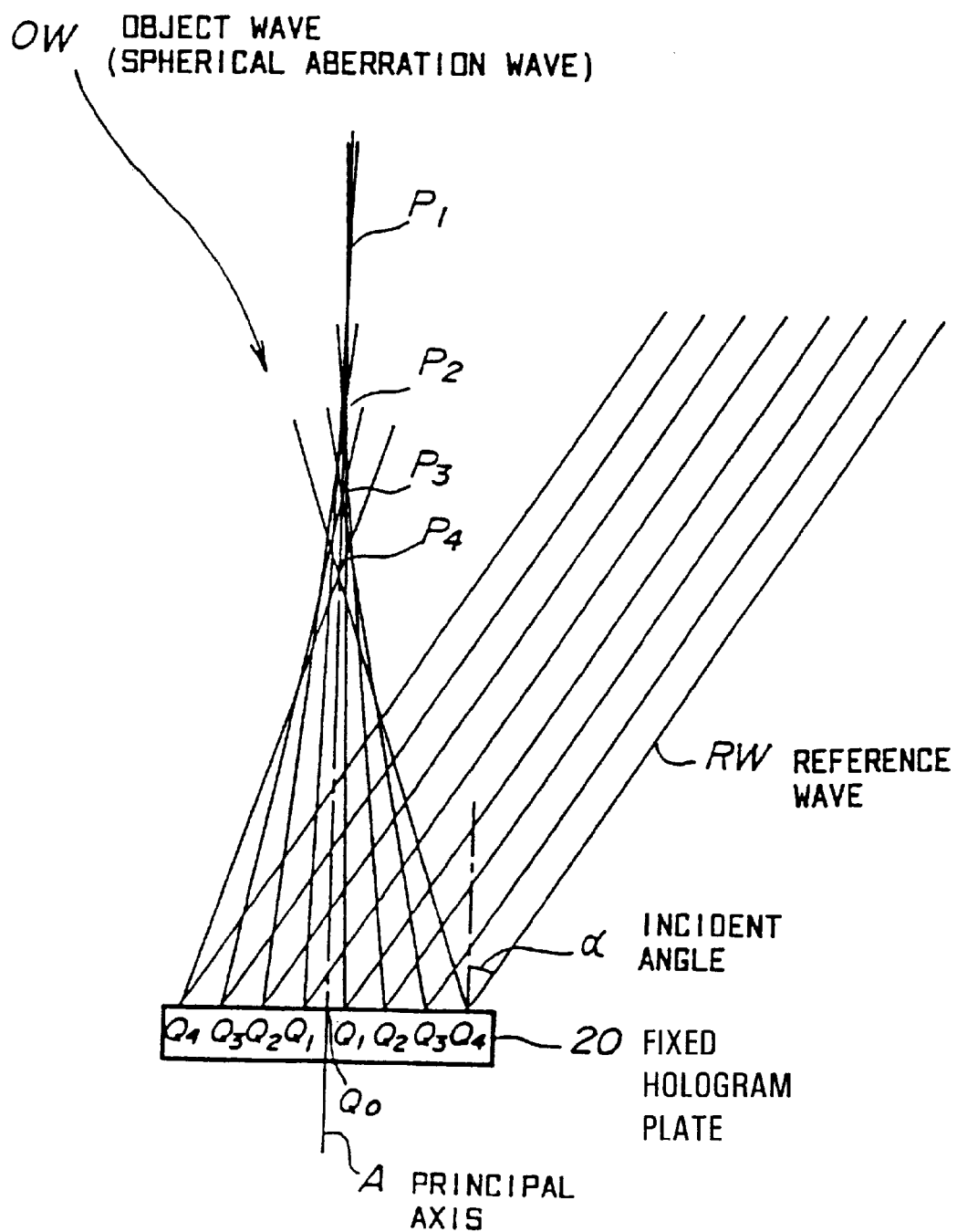
FIG. 5 is a diagram depicting a manufacture of a fixed hologram plate.

A description of the first embodiment will be given with reference to FIGS. 4, 5, and 2(a). Referring to FIG. 2(a), in this embodiment, the diffracted wave 6 of the rotatable hologram 10 is a parallel wave 6a, and the outgoing wave outgoing from the fixed hologram plate 20 emerges approximately perpendicularly from the fixed hologram plate 20. Referring to FIG. 5, a wavelength used in constructing the fixed hologram plate 20 is the same as a wavelength 2 used at the time of reconstructing. Of the waves used in the construction of the fixed hologram plate 20, an object wave OW is a wave having a spherical aberration and having a principal axis A of the fixed hologram plate 20 as an axial center, which axis is hit, at the scanning center, by the outgoing wave from the rotatable hologram 10. This object wave is a so-called "positive spherical aberration wave", where a sharper bend toward the inside is observed away from the axis A and toward the outer boundary. As shown in the equation (11) below, it is best to control the distance between a point P on the axis, at which point the spherical aberration wave is supposed to originate, and a point Q on the fixed hologram plate 20, which point Q is hit by the wave, namely the optical distance (PQ), to be of a predetermined distance (d) at any point.

$$d = P_0 Q_0 = P_1 Q_1 = P_2 Q_2 = \ldots = P_n Q_n \quad (9)$$

A reference wave RW is a parallel wave incoming diagonally and having an incidence angle $\alpha$ ($\neq 0$). The above-mentioned parameters d and $\alpha$ are determined as appropriate so that the aforementioned performance functions (5) or (8) are fulfilled, aberration is reduced, and a linear scanning can be performed.

Figure 6A:
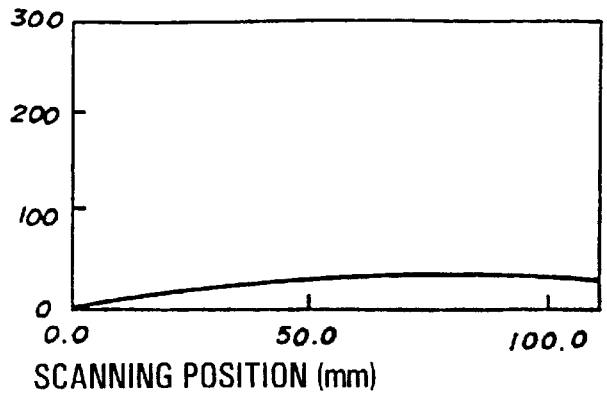
FIGS. 6(a)–6(c) show graphs describing difference between optical path lengths, a beam radius, and a scanning track of the scanning apparatus.
Figure 6B:
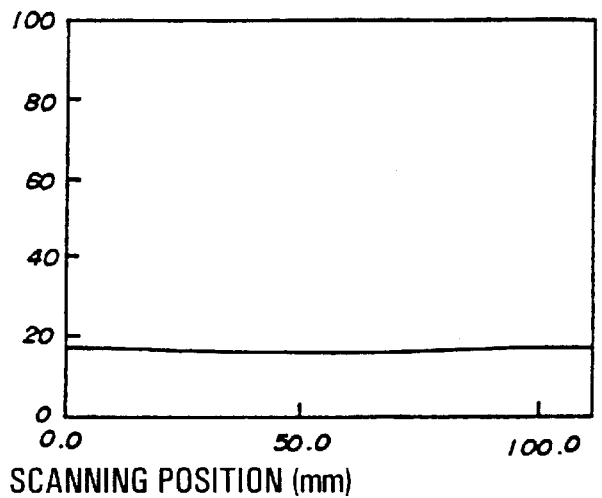
Figure 6C:
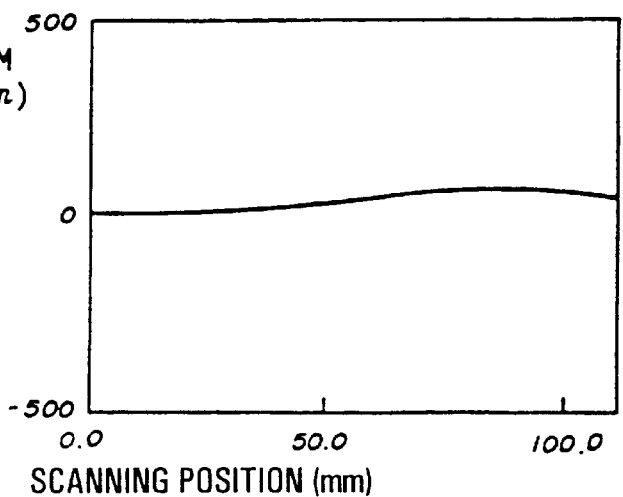

The values in FIGS. 6(a)–6(c) are obtained by realizing the above settings. FIG. 6(a) represents a result of optimization using the equation (5), where the horizontal axis indicates a scanning width occurring when the scanning center of the photosensitive drum is designated as 0.0, and the vertical axis indicates an optical path length difference. This graph tells that the optical path length difference between the outermost beams of the light flux, which difference is measured in the scanning direction when the scanning width is 108 mm (A4 size scan), has the maximum value of 30λ. This value translates into a distance of 0.03 mm. Since the total optical path in this case is 641 mm, these constitute practically regular optical paths, that is, no optical path length difference, results. In this case, the wavelength of the reconstructing wave generated by the semiconductor laser is λ2=780 nm, the rotatable hologram 10 has a regular pitch, and the spatial frequency thereof is 1765 (pcs/mm). The angle of the beam incident on the rotatable hologram 10 is 44.2°, and the radius of the rotatable hologram 10 is 40 mm. As for the parameters of the fixed hologram plate 20, d=364 mm, and α=6.50°. The distance between the rotatable hologram 10 and the fixed hologram plate 20 is 218 mm, and the distance between the fixed hologram plate 20 and the image formation surface 4 is 360 mm.

The tilt angle of the fixed hologram plate 20 with respect to the rotatable hologram 10 was 45.0° in order to fulfill the performance function (8). FIG. 6(b) shows the scanning beam characteristic obtained therefrom. That is, for the scanning width of 216 mm, the beam radius is within 18 μm. As shown in FIG. 6(c), a deviation from a straight line of below the ±78 μm level and a linearity of below the ±0.12% level resulted. Moreover, the variation of wavelength of the semiconductor laser was controlled to be less than 1 μm in the scanning direction even in the presence of a 0.3 nm wavelength variation due to a mode hop. As shown in FIG. 3, the scanning beam from the rotatable hologram 10 and incoming into the fixed hologram plate 20 was bent in a simple manner so as to obtain a straight-line scanning on the fixed hologram plate 20, with the result that a displacement of 1 mm was observed.

Once the interference pattern on the fixed hologram plate of this embodiment is determined, the pattern can be drawn with an electron beam or a laser plotter. This method of manufacturing a fixed hologram plate by holographic exposure will be described in the following.

It is generally known that wavelength sensitivity of a hologram material having a high diffraction efficiency is in a range shorter than that of the wavelength of a semiconductor laser. Thus, aberration owing to this wavelength ratio must generally be taken into consideration when manufacturing a hologram plate by holographic exposure. Here, the wavelength of the wave used in constructing the hologram plate is designated as λ1 and the wavelength ratio is designated as λ2/λ1. It is found that, after taking into consideration aberration owing to this wavelength ratio, the construction of a spherical aberration needed for the construction of a hologram wave can be such that d of the first embodiment is replaced by the product of d and s. As in the first embodiment, optimization was carried out by employing a diagonally incident, parallel reference wave. Once the relevant interference fringe distribution is known, a hologram, containing aberration of the above complexity, needs to be manufactured by holographic exposure.

Figure 7:
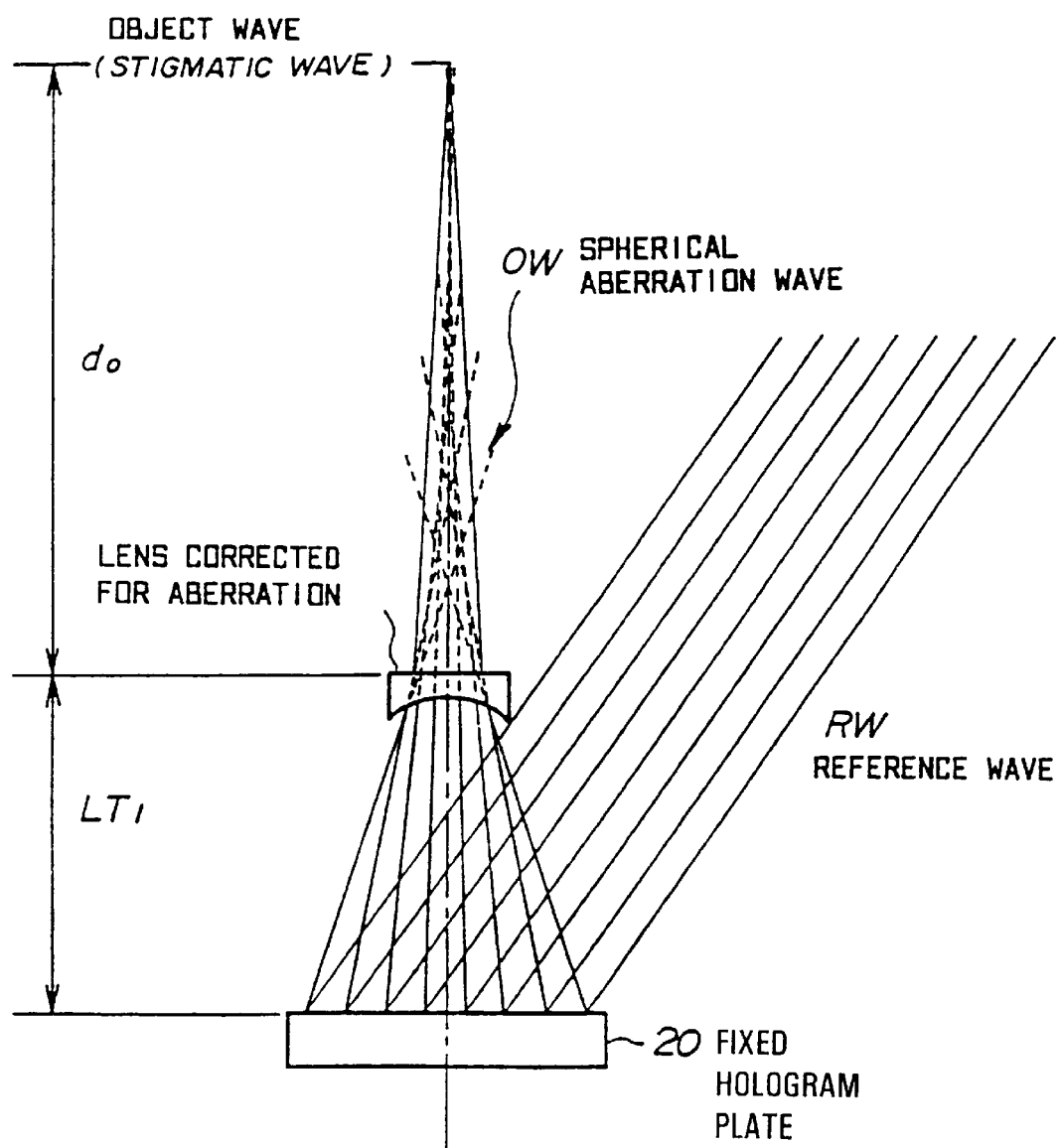
FIG. 7 is a diagram describing waves used for constructing a fixed hologram plate.

FIG. 7 shows a second embodiment of the fixed hologram plate 20 of the present invention, wherein a spherical aberration wave used therein is of a wavefront of a wave outgoing from a plano-concave lens, which is a spherical lens, on which plano-concave lens a stigmatic diverging spa plano wave is incident. Parameters, including a plano-concave lens, are optimized so that the above amount of aberration is obtained. That is, λ1=441.6 nm (HeCd laser), and the wavelength of the semiconductor laser is designed to be λ2=780 nm. The thickness of the BK7 plano-concave lens is 3.0 mm at the center, an index of refraction is 1.51, and a curvature thereof is 115.0 mm. The distance between the point light source $S_0$ of the diverging spherical wave and the plano-concave lens is $d_0$=439.0 mm, and the distance between the plano-concave lens and the fixed hologram plate 20 is LT1=469.0 mm.

Figure 8A:
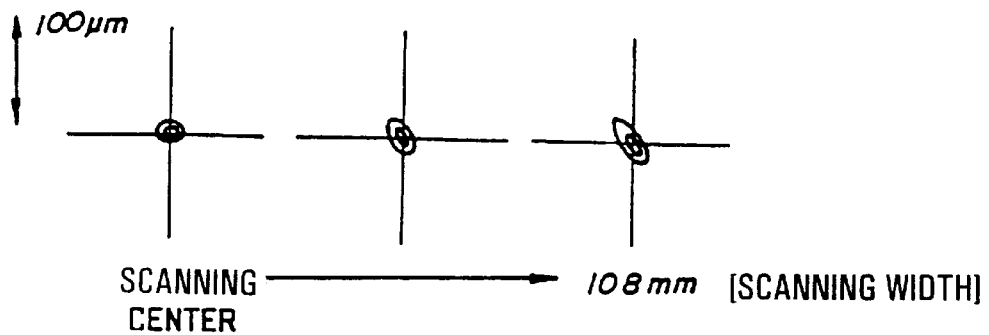
FIGS. 8(a)–8(b) show diagrams describing spot images of a scanning beam, which images are obtained by holographic exposure.
Figure 8B:
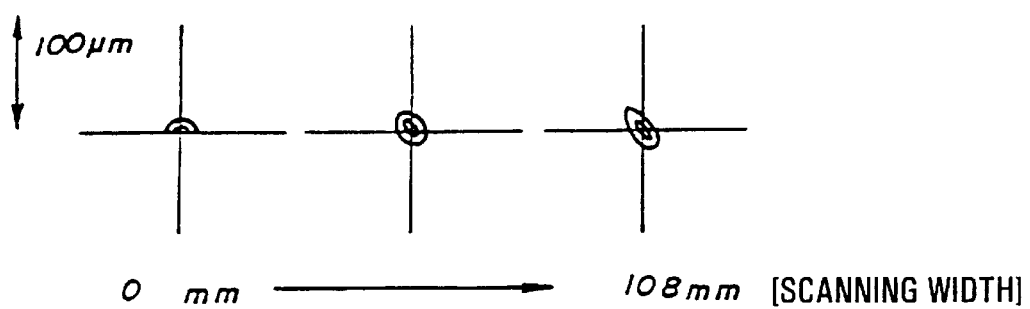

FIG. 8(a) shows aberration images of the scanning beam created by the fixed hologram 20 manufactured by holographic exposure designed in accordance with FIG. 7. In the figure, a very small aberration of below a 20 μm level is evident. FIG. 8(b) also shows spot aberration images of the scanning beam created by the hologram manufactured in accordance with FIG. 5. In FIG. 8(b), approximately the same images as in FIG. B(a) are seen. This embodiment has an advantage in that holographic exposure can be achieved by a simple spherical aberration wave and control of the exposure system is fairly easy.

In a third embodiment described below, the incident wave which is incident on the rotatable hologram 10 is a converging spherical wave. The phase transfer function in this case needs to fulfill the following equation (10).

$$\Psi = 2/\lambda_{1'} \sqrt{X^2 + Y^2 + F_1^2} - 2/\lambda_{1''} \sqrt{X^2 + (Y - Y_2)^2 + (F_2/S)^2} \quad (10)$$

It is evident here that a point light source of the reference wave is at the distance $F_1$ from the rotatable hologram. The distance $F_1$ is measured along an axis of rotation of the rotatable hologram and the wavelength of the wave used in constructing a hologram is $\lambda_{1''}$. $\lambda_{1'}$ here is a virtual wavelength of the wave used in constructing a hologram. The object wave is a spherical wave produced by a point light source positioned at a distance $Y_2$ and a height $F_2/S$ from the rotatable hologram, which distance is measured along an axis of rotation aligned with the principal scanning axis. The wavelength of the wave used in constructing a hologram is a virtual wavelength $\lambda_{1''}$. Thus the virtual difference is provided, in terms of the wavelength, between the reference wave and the object wave, which are both used in construction of a hologram. S is the ratio $\lambda_2/\lambda_{1''}$ obtained from $\lambda_2$ and $\lambda_{1''}$ of the reconstructing wave. Optimization in accordance with the equation (5) was conducted in a scanning apparatus equipped with the rotatable hologram 10 manufactured on the basis of the equation (10), on an assumption that a converging spherical wave is incident on the rotatable hologram.

Figure 9A:
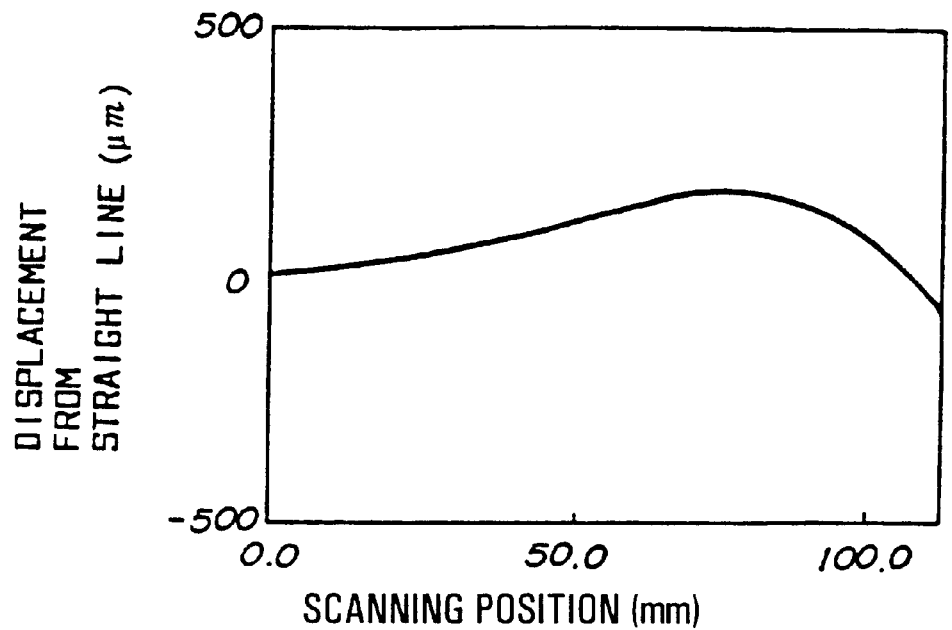
FIGS. 9(a)–9(b) show graphs describing a scanning track and a beam radius when a spherical converging wave is incident.
Figure 9B:
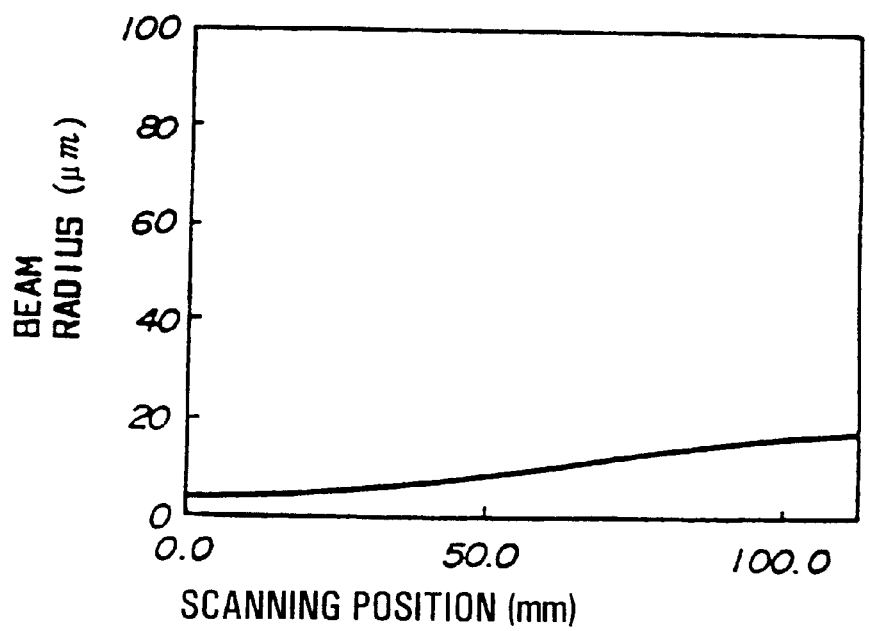

The result of this arrangement is that a deviation from a straight line of below the ±0.1 mm level was obtained, as shown in FIG. 9(a). FIG. 9(b) shows that a beam radius of less than 18 µm was obtained. A linearity of below ±0.22% level resulted. As for displacement in the scanning direction due to a wavelength variation of the semiconductor laser, a displacement of less than 1 µm in correspondence with a 0.3 nm wavelength variation was observed, which is a satisfactory result. In this arrangement, the radius of the beam incident on the rotatable hologram 10 is 45 mm, the distance between the rotatable hologram 10 and the fixed hologram plate 20 is 182 mm, the distance between the fixed hologram plate 20 and the image formation surface is 277 mm, and the tilt angle of the fixed hologram plate 20 with respect to the rotatable hologram 10 is 64.2°. As far as the reference wave is concerned, $\lambda_1$=330 nm and F1=200 mm. With the object wave, $\lambda_{1''}$=78 nm, and therefore S=10, F2=1060, and Y2=95 mm.

This embodiment is configured such that the incident wave is a converging-spherical wave and that the distance between the surface of the rotatable hologram and the convergent point is 200 mm, which is approximately the distance between the surface of the fixed hologram plate and the image formation surface. Even when a variation of 100 nm is caused for environmental reasons in the wavelength of the semiconductor laser, the beam radius incurred only a minor change from 18 µm to 18.5 µm, meaning that no serious deterioration in the beam radius takes place. While the configuration of a hologram represented by the equation (10) assumes that the wavelength of the wave used in the manufacture of a hologram is a virtual wavelength, the manufacture of a hologram by an electron beam or a laser plotter drawing is possible. When the manufacture is conducted using holographic exposure, an auxiliary optical system proposed in the Japanese Laid-Open Patent Application 63-72633 filed by the present applicant can be utilized.

Figure 10A:
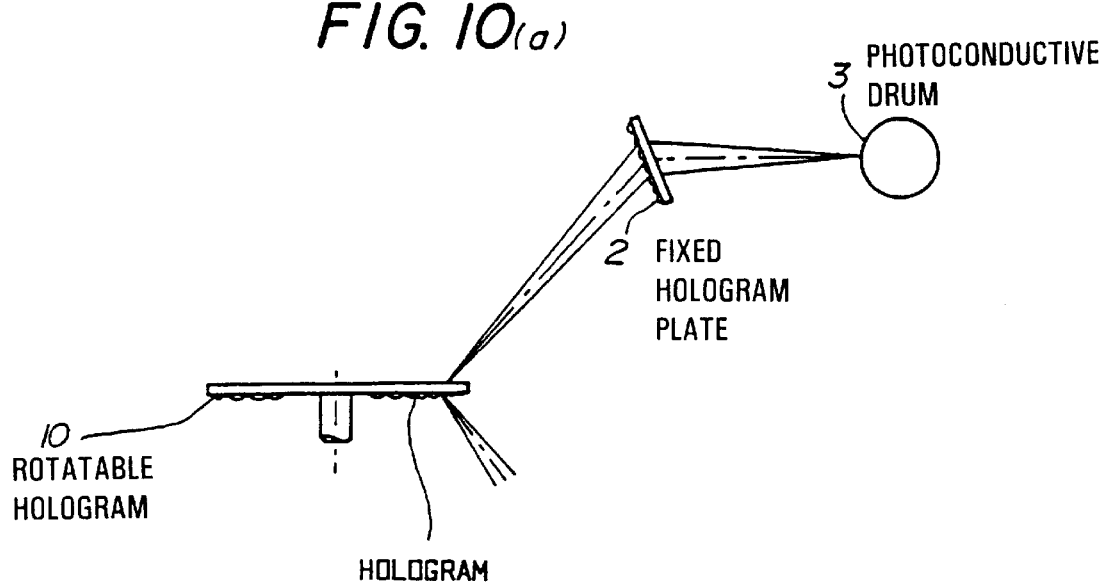
FIGS. 10(a)–10(b) show diagrams describing the scanning direction and the cross scanning direction of the scanning apparatus.
Figure 10B:
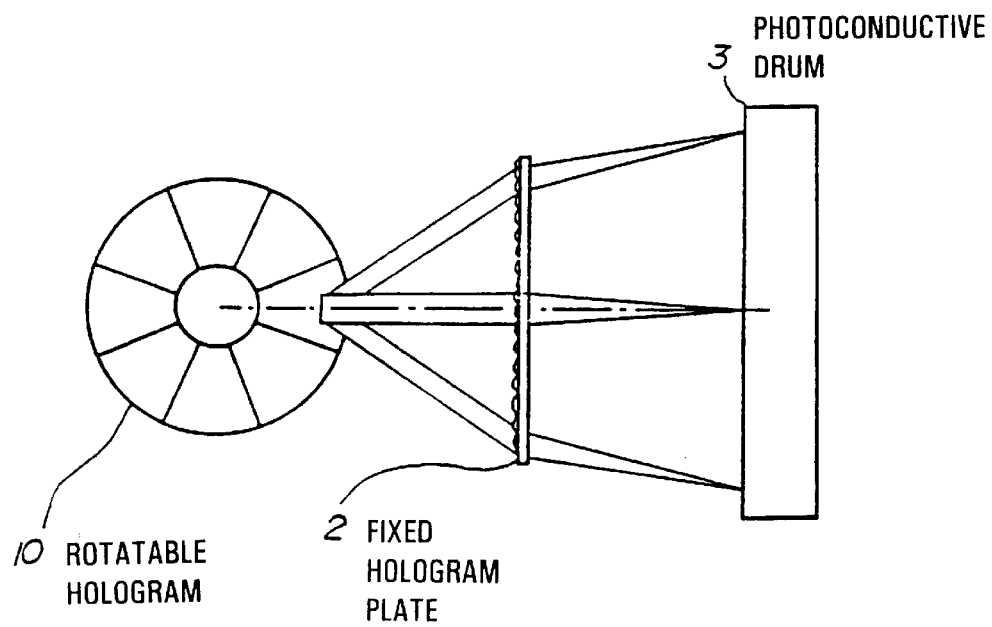

A fourth embodiment will be described below. FIGS. 10(a) and 10(B) illustrate a compensation for displacement of the scanning beam, which displacement occurs when a removal of the base of the rotatable hologram 10 from a parallel state occurs. In this fourth embodiment, a beam, whose convergence takes place in the cross scanning direction at right angles to the scanning direction (a direction of rotation of the rotatable hologram 10), is employed as the beam incident on the rotatable hologram 10, as shown in FIGS. 10(a) and (B). Since the wave incident on the fixed hologram plate 20 is a cylindrical wave, a reference wave that matches this cylindrical wave is considered to be necessary. This means that a spherical aberration wave as the one in FIG. 5 is to be used as the object wave for the manufacture of the fixed hologram plate 20. For the reference wave, one example is a wave having direction cosines as per the equation (11) below.

$$l = X\sqrt{Z_0^2 + X^2} - X\sqrt{Z_0^2 + X^2 + (Y - Y_0)^2} \qquad (11)$$

$$m = C_0 - (Y - Y_0) / \sqrt{Z_0^2 + X^2 + (Y - Y_0)^2}$$

where $C_0$, $Y_o$, and $Z_0$ are constants.

Figure 11A:
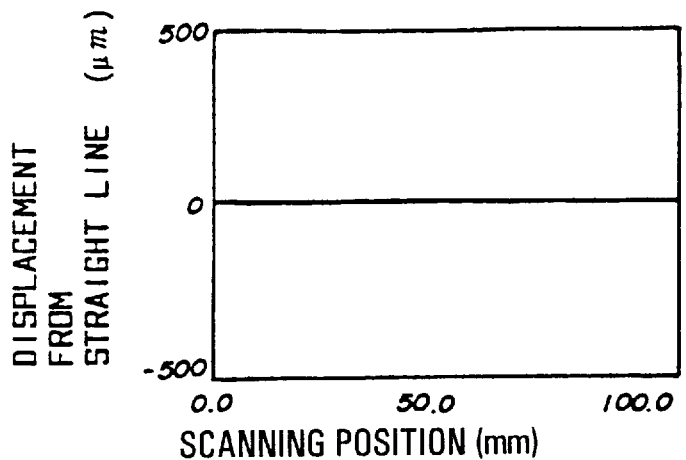
FIGS. 11(a)–11(c) show graphs describing a scanning track, a beam radius, and displacement due to wavelength variation of the scanning apparatus of FIG. 10.
Figure 11B:
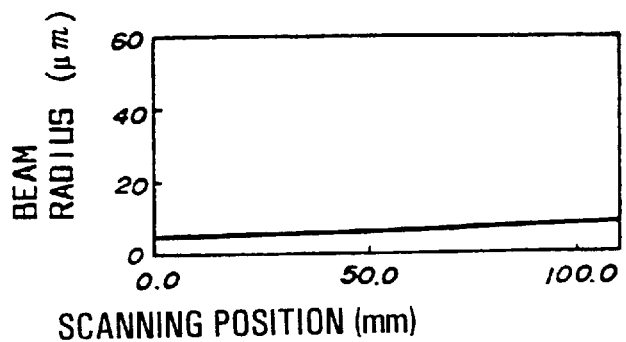
Figure 11C:
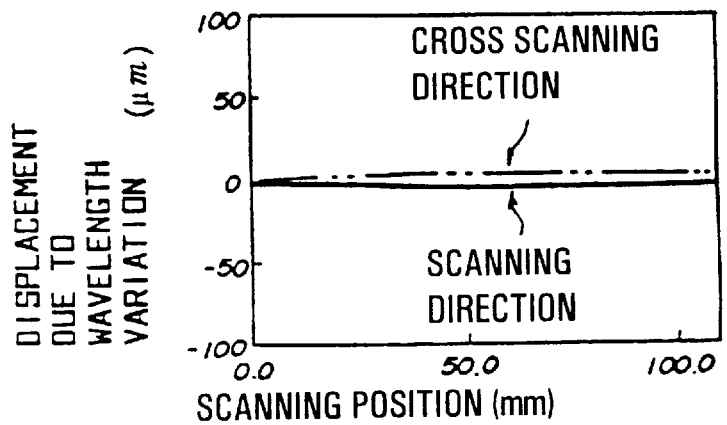

While the reference wave is a coma wave as shown by the equation (11) above, the object wave is a spherical aberration wave. This aberration can be controlled to be at an appropriate level so that a desired performance can be obtained. FIGS. 11(a)–11(c) show the result thereof. FIG. 11(a) illustrates the deviation from a straight line, while FIG. 11(b) illustrates the beam radius.

The present invention realizes an extremely satisfactory deviation from a straight line of below the ±0.4 m level. The beam radius thereof is 8 µm at a maximum, which is sufficient to allow a successful aberration correction. Linearity is below ±0.13% level, which is also satisfactory. As shown in FIG. 11(c), even under a wavelength variation of the semiconductor laser of 1 nm, for example, the displacement could be controlled to be less than 3 µm in the scanning direction, and less than 3 µm in the cross scanning direction. The relationships among the object wave, the reconstructing wave, the parameters of the rotatable hologram 10, and the fixed hologram plate are of the same parameters as those in the first embodiment. Also, $Y_o$=−5 mm, and $Z_0$=321 mm.

The base of the rotatable hologram in this embodiment can be moved from its ideal position and still function well in the following way. That is, even the rotatable hologram 10 exhibiting a displacement as large as one minute (P—P) from its ideal position allows a sufficient correction in which the displacement in the cross scanning direction is controlled to be less than 5 µm. This means a greater tolerance compared to the conventional rotatable hologram 10, where only several seconds of displacement was allowed from the ideal position of the base, and goes a long way toward reducing the cost of a hologram base.

As shown in FIGS. 12 and 12(A), when manufacturing a fixed hologram plate, a spherical aberration wave for the object wave is generated by a spherical lens, and the reference wave is generated by a similar spherical lens 8 that creates direction cosines of a coma wave 9 as represented by the equation (11).

Figure 13:
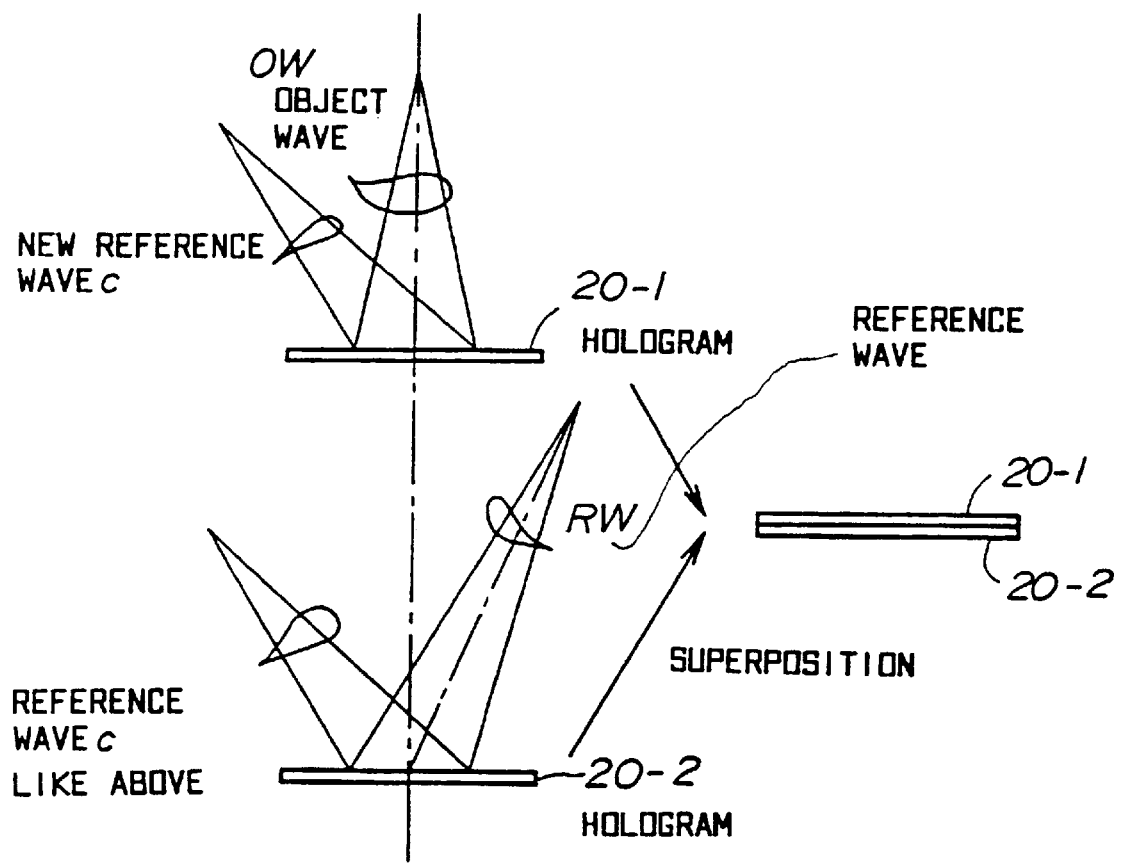
FIG. 13 is a diagram describing an embodiment of the fixed hologram plate.
Figure 14:
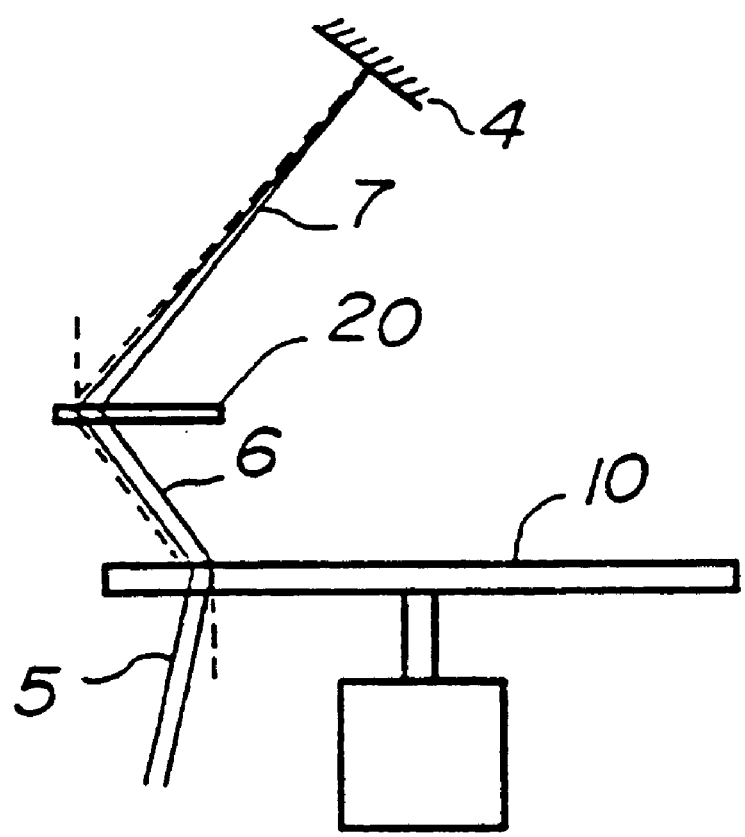
FIG. 14 is a diagram describing the conventional technology.

FIG. 13 depicts the fifth embodiment. Two holograms are formed on one fixed hologram plate. The above-described object wave for manufacturing the fixed hologram, and the wavefront C are recorded on the fixed hologram plate so that one hologram 20-1 is manufactured. The other hologram 20-2 is manufactured with the above-described reference wave for manufacturing the fixed hologram plate and with the wavefront C. By superposing, as shown in the figure, characteristics similar to those of the above embodiments are obtained. This embodiment is most suitable for the case where the fixed hologram plate is almost of an in-line type and holographic exposure is difficult.

Since each of the holograms thus manufactured is of an off-axis type, a high diffraction efficiency results. Further, these two hologram plates achieve regular optical paths and precise compensation for degradation of characteristics of the scanning light; which degradation is due to variation of the wavelength of the semiconductor laser. The fixed hologram plates here are mass producible by means of injection, making this embodiment favorable in terms of manufacturing and pricing. The shape of the rotatable hologram is not limited to a disk, and the present invention is applicable to other shapes including a cylinder, a cone, and a pyramid.

As has been described, the first invention is capable of providing a simple and inexpensive optical system with two holograms. A high-reliability optical system without displacement of the scanning beam, which displacement is due to variation of the wavelength of the semiconductor laser, is realized in the above invention.

Figure 15:
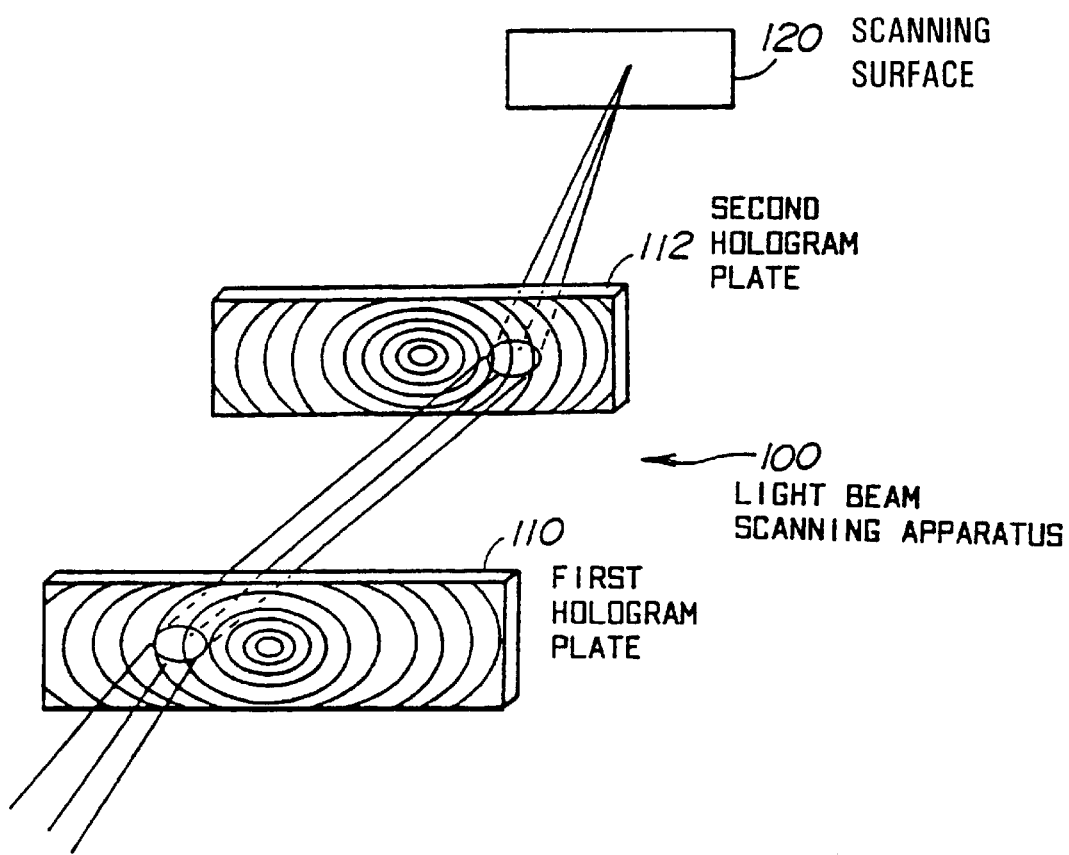
FIG. 15 is a diagram describing the principle of the second embodiment.
Figure 16:
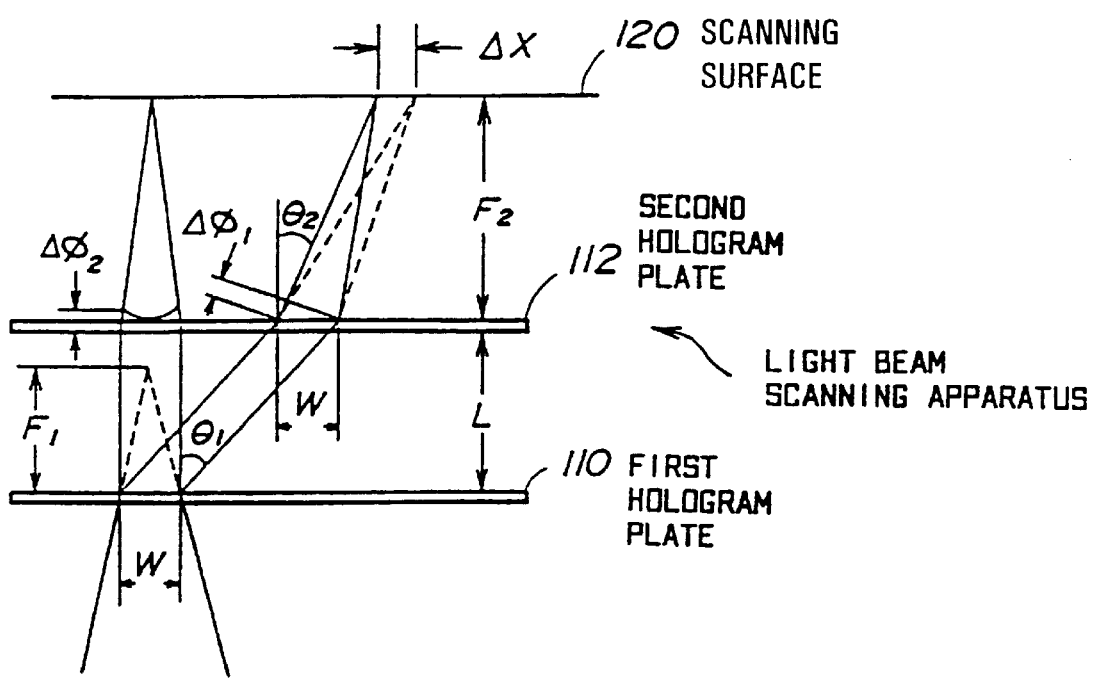
FIG. 16 is a diagram showing the first mode of the second embodiment.

The second invention included in the present application will be described now with reference to FIGS. 15 and 16. FIG. 15 is an oblique view illustrating a light beam scanning apparatus according to the first mode of the present invention. FIG. 16 is a top view thereof. The light beam scanning apparatus 100 comprises at least two holograms, namely a first hologram plate 110 and a second hologram plate 112. 120 represents a scanning surface.

The first hologram plate 100 is a movable hologram for converting a converging spherical wave into a parallel wave, for example. The second hologram plate 112 is a fixed hologram for converting a parallel wave into a converging spherical wave, for example. The distance between the first hologram plate 110 and the convergent point is denoted by $F_1$, the distance between the second hologram plate 112 and the convergent point is denoted by $F_2$, and the distance between the first hologram plate 110 and the second hologram plate 112 is denoted by L. A central wavelength of the light source is indicated by $\lambda$.

It is ensured in this configuration that an incident beam having a beam radius of W is perpendicularly incident on the first hologram plate 110 and is diffracted at an angle $\theta_1$, after which the beam is incident on the second hologram plate 112 disposed to be parallel to the first hologram plate 110, wherefrom it is diffracted at an angle $\theta_2$, allowing an image to be formed on the scanning surface 120 disposed at the distance $F_2$ from the second hologram plate 112.

Designating spatial frequencies of the first hologram 110 and the second hologram 112 as $f_1$ and $f_2$ respectively, the following equation is derived.

$$\sin \theta_1 = f_1 \lambda$$

$$\sin \theta_1 + \sin \theta_2 = f_2 \lambda$$

Therefore, $$\sin \theta_2 = (f_2 - f_1) \lambda$$

Providing that a displacement of $\Delta\lambda$ is created in the central wavelength of the light source, the following equations are derived.

$$\cos \theta_1 \cdot \Delta\theta_1 = f_1 \Delta\lambda$$

$$\cos \theta_1 \cdot \Delta\theta_1 + \cos \theta_2 \cdot \Delta\theta_2 = f_2 \Delta\lambda$$

Therefore, $$\cos \theta_1 \cdot \Delta\theta_2 = (f_2 - f_1)\Delta\lambda = \sin \theta_2 \, (\Delta\lambda/\lambda)$$

A displacement $\Delta X$ of the scanning beam, created by a wavelength variation, is as follows.

$$\Delta X = \Delta\theta_2 \, (F_2/\cos \theta_2)/\cos \theta_2 = F_2 \sin \theta_2 \, (\Delta\lambda/\lambda)/\cos^3 \theta_2 \quad (21)$$

The scanning beam diameter D is determined by an F number and an aperture W as follows.

$$D = k \cdot F \cdot \lambda$$
$$= k \cdot \lambda (F_2/\cos \theta_2)/W \cos \theta_2)/\cos \theta_2$$
$$= k(F_2/W)(\lambda/\cos^3 \theta_2),$$

where k is a constant.

A displacement $\Delta X$ of the scanning beam position is required to be less than ¼ of the scanning beam diameter in a light-scanning apparatus such as used in a printer, in order to maintain a satisfactory resolution. Accordingly, $\Delta X/D$ is obtained from the equations (21) and (22) as follows.

$$\Delta X/D = \sin \theta_2 \cdot (W/k) \, (\Delta\lambda/\lambda^2) < \frac{1}{4} \quad (23)$$

An optical path length difference $\Delta\phi_1$ is obtained as $W \cdot \sin \theta_2$. Therefore, it is derived using the equation (23) that $$\Delta\phi_1 = W \sin \theta_2 < (\frac{1}{4}) k(\lambda^2/\Delta\lambda) \quad (24)$$

Since generally k~2, $$\Delta\phi_1 < C \, (\lambda^2/\Delta\lambda) \quad (25)$$

where C is a constant smaller than 0.5.

As is evident from the above, it is required that the optical path length of the scanning beam be smaller than C $(\lambda^2/\Delta\lambda)$ in order to obtain sufficient resolution with a light scanning apparatus under variations of the wavelength.

A similar condition is derived with regard to a blooming of the beam, which blooming is caused by the variation of the wavelength. According to Rayleigh's resolution, a wavefront aberration small enough not to cause a blooming is $\lambda/4$. When a variation of the wavelength is $\Delta\lambda$ and the optical path length difference of the scanning beam is denoted by $\Delta\phi_2$, the wavefront aberration is expressed by $$\Delta\phi_2 \, (\Delta\lambda/\lambda) < (\lambda/4)$$

Therefore, $$\Delta\phi_2 < (\frac{1}{4}) \, (\lambda^2/\Delta\lambda) \quad (26)$$

It results from the equations (25) and (26) above that the optical path length difference $\Delta\phi$ of the scanning beam should fulfill the relationship shown below in order to maintain a regular resolution under a wavelength variation or wavelength dispersion.

$$\Delta\phi = \Delta\phi_1 + \Delta\phi_2 < C \, (\lambda^2/\Delta\lambda) \quad (27)$$

where C is a constant. Accordingly, a light beam scanning apparatus fulfilling the equation (27) does not allow a displacement of the scanning beam, a blooming, or a displacement of a focus even in the presence of a wavelength variation of the light source.

Figure 17:
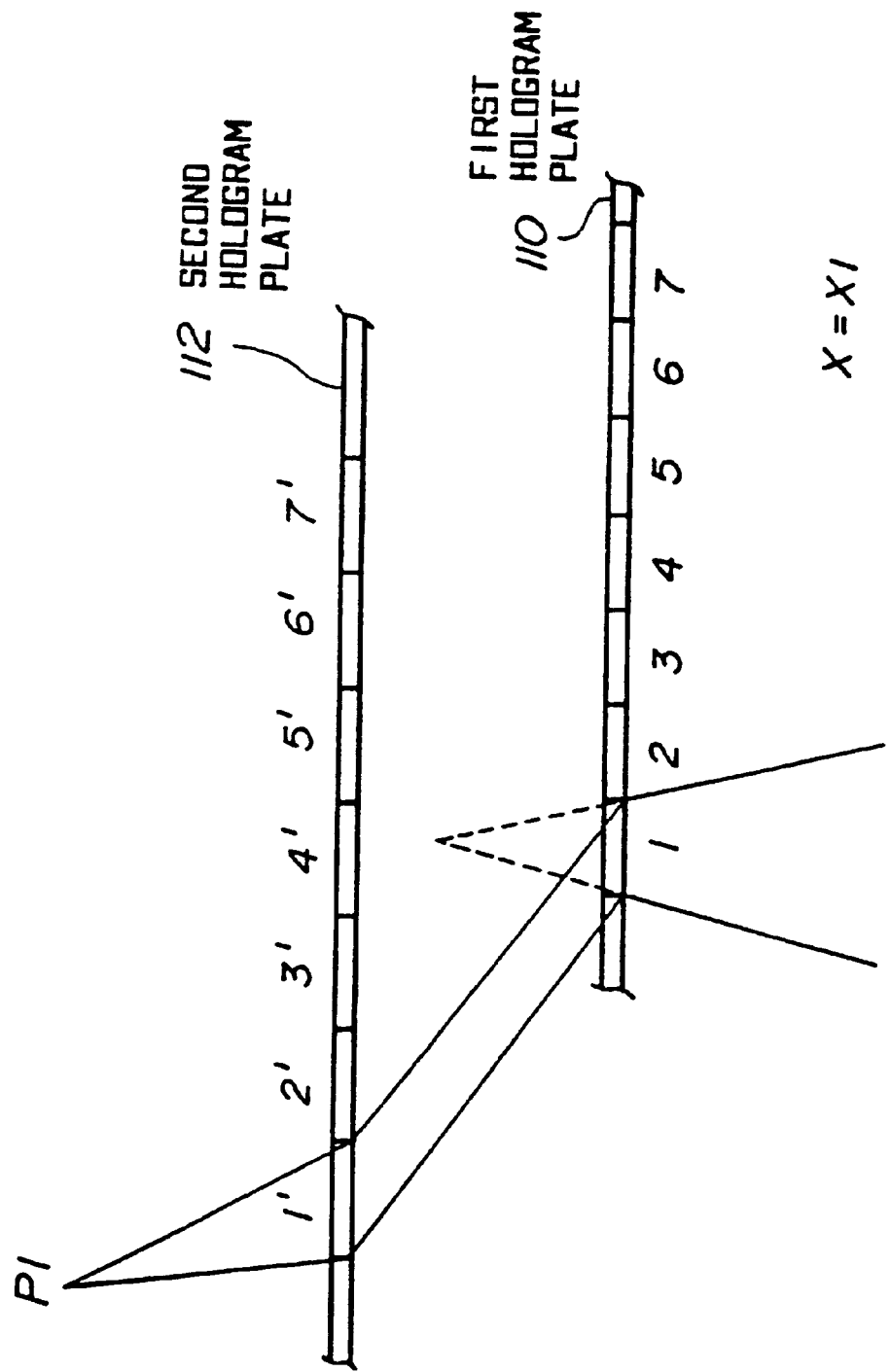
FIG. 17 is a diagram showing an example of configuration of a light beam scanning apparatus employing the first mode of the second embodiment (a case where the first hologram is placed to the right of the second hologram)
Figure 18:
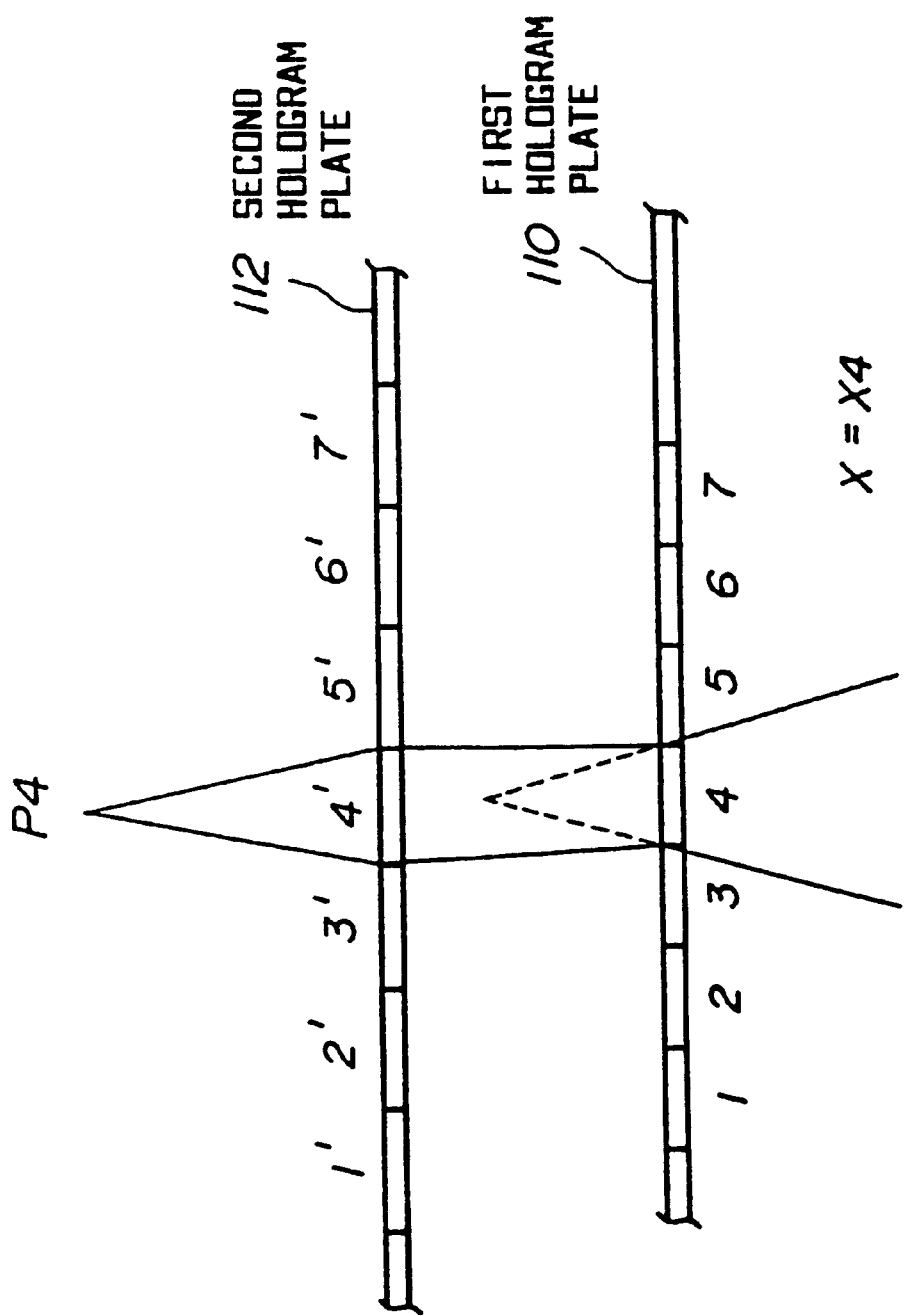
FIG. 18 is a diagram showing an example of configuration of a light beam scanning apparatus employing the first mode of the second embodiment (a case where the first hologram is placed so as to be aligned with the second hologram)
Figure 19:
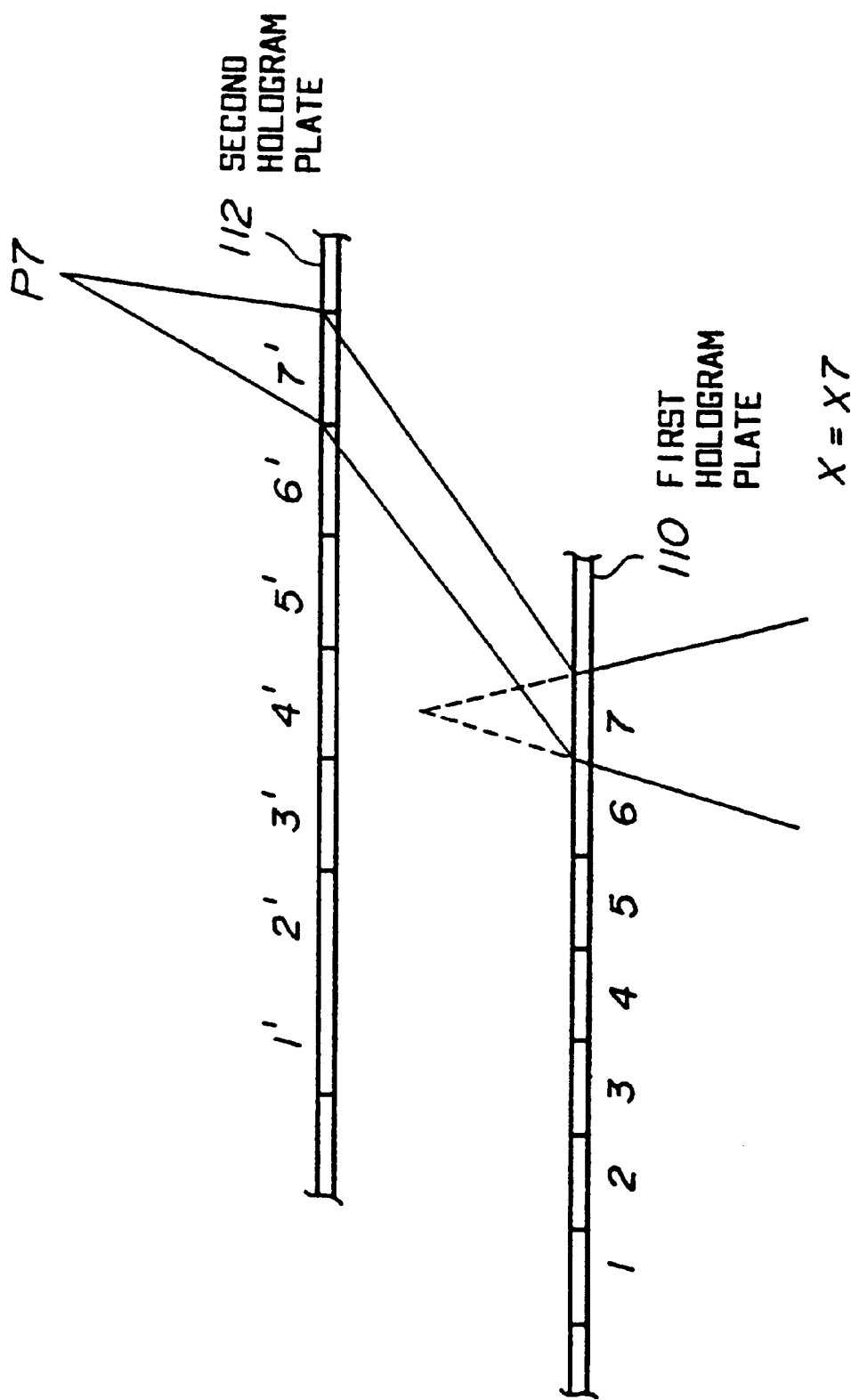
FIG. 19 is a diagram showing an example of configuration of a light beam scanning apparatus employing the first mode of the second embodiment (a case where the first hologram is placed to the left of the second hologram)

FIGS. 17 through 19 illustrate examples of configurations of a light scanning apparatus fulfilling the equation (27). Referring to FIGS. 17 through 19, a movable first hologram plate 110 and a fixed second hologram plate 112 are each separated into seven segments.

Referring to FIG. 18, when the first hologram plate 110 is positioned at $x_4$, the incident beam is diffracted by the segment 4 of the first hologram plate 110, and is diffracted by the segment 4' of the second hologram plate 112 before reaching a point $P_4$. These two hologram plates 110 and 112 are disposed such that the optical path length difference of the beams is smaller than (½) $(\lambda^2/\Delta\lambda)$.

When the first hologram plate 10 is moved to the right, as shown in FIG. 17, the incident beam is diffracted by the segment 1, and diffracted by the segment 1' of the second hologram plate 112 before reaching a point $P_1$.

Similarly, referring to FIG. 19, the incident light is diffracted by the segment 7 and the segment 7' before reaching a point $P_7$.

The first hologram plate 110 and the second hologram plate 112-are disposed such that, in every case of diffraction taking place at an Mth segment and at an M'th segment, the optical path length difference of the beam is smaller than (½) ($\lambda^2/\Delta\lambda$).

By moving the hologram plate 110 back and forth in the above light-scanning apparatus, a digital light scanning apparatus can be obtained which is free from a displacement of the scanning beam position, a blooming of the scanning beam, and displacement of a focus, even under a wavelength variation $\Delta\lambda$.

Figure 20:
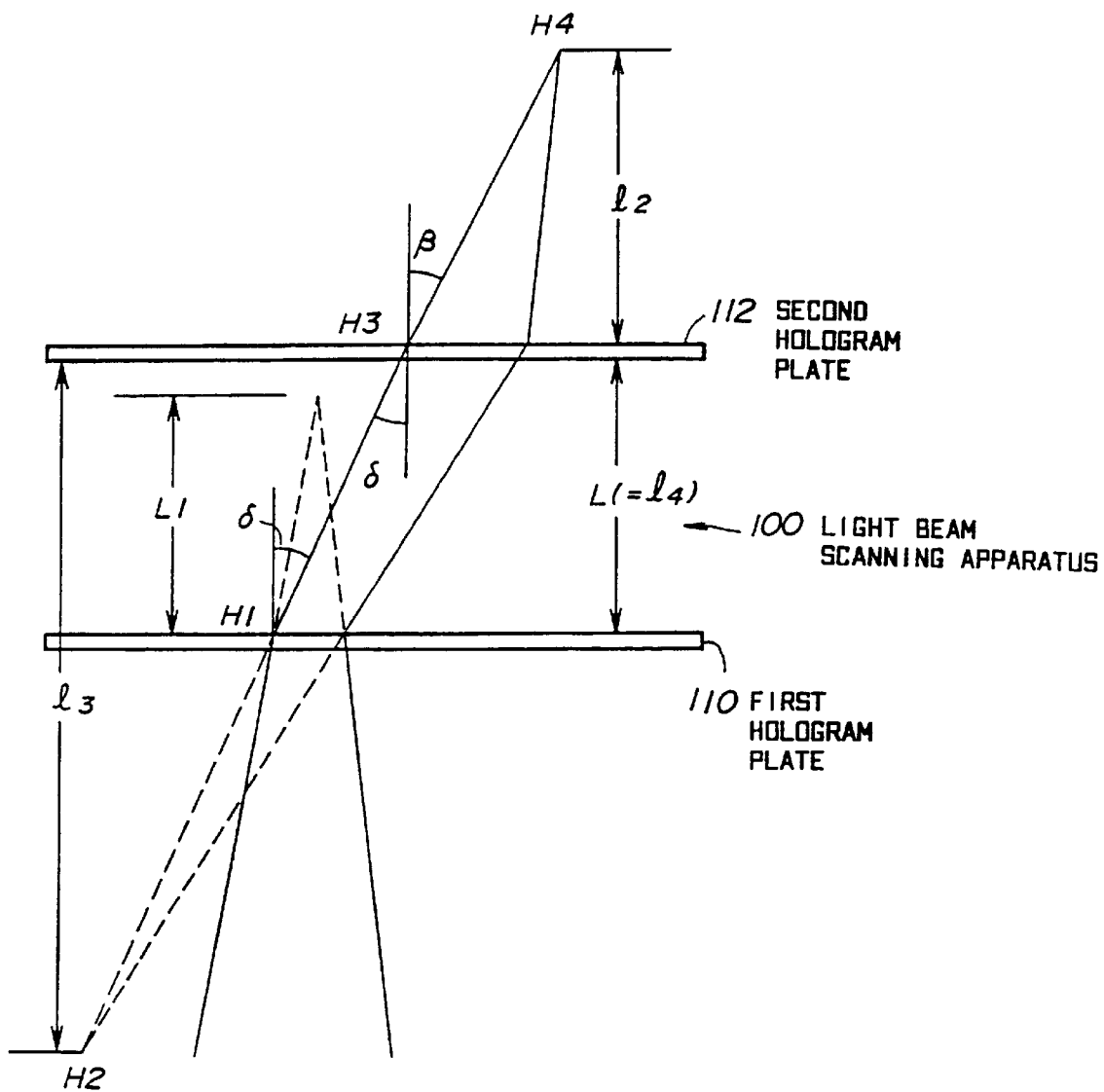
FIG. 20 is a diagram showing the second mode of the second embodiment.

Next, the principle of a light-scanning apparatus according to the second mode of the second invention will be described with reference to a top view of a typical hologram scanning system as shown in FIG. 20. In FIG. 20, configurations that correspond to those in FIGS. 15 and 16 are given the same reference notations. The light beam scanning apparatus 100 of FIG. 20 consists of at least two hologram plates, namely a first hologram plate 110 and a second hologram plate 112.

A converging spherical wave is incident, with an incidence angle $\alpha$, on the first hologram plate 110 (having a focal distance $l_1$) of the light beam scanning apparatus 100 shown in FIG. 20. This converging spherical wave is converted into a diverging spherical wave by the first hologram plate 110 and goes out from the first hologram plate 110 at an outgoing angle of $\delta$. The second hologram plate 112 is disposed to be parallel to the first hologram plate 110 and is separated therefrom by an optical axis distance $l_4$ (the distance between $H_1$ and $H_2$ in FIG. 20).

The diverging spherical wave having a focal distance $l_3$ (the distance between $H_2$ and $H_3$ in the figure) and outgoing from the first hologram plate 110 is incident, at an incidence angle $\delta$, on the second hologram plate 112, where the wave is converted into a converging spherical wave. This converging spherical wave, having a focal distance $l_2$ (the distance between $H_3$ and $H_4$ in the figure), exits the second hologram plate 112 at an outgoing angle $\beta$.

In order to control the optical path length difference to be 0, in other words to obtain an achromatic condition with regard to an optical axis and an image formation, the following equations must hold.

$$\sin \alpha = \{l_3/(l_3-l_4)\} \sin \beta - \{l_4/(l_3-l_4)\} \sin \delta \quad (28)$$

$$\cos^2 \alpha/2/l_1 = \{l_4/_3 - 1_4)^2/2\} \cos^2 \delta + \{l_3{}^2/(l_3-l_4)^2/l_2/2\} \cos^2 \beta \quad (29)$$

Assuming that the optical axis of the spherical wave incident on the first hologram plate 110 is perpendicular, that is $\alpha=0$, and calling $$k(\delta)=l_4/l_3 \quad (30)$$

the equation (28) becomes $$\sin \beta = k(\delta) \sin \delta \quad (31)$$

$k(\delta)$ can be regarded as a parameter representing a degree to which the scanning beam outgoing from the first hologram plate 110 is dispersed.

Accordingly, in a light beam scanning apparatus fulfilling the equation (31), the optical path length difference $\Delta\phi$ of the scanning beam can be controlled to be 0, which difference is required in order to fulfill the equation (27) explained in the description of the first mode of this invention.

Therefore, in accordance with the second mode of the present invention, a light scanning apparatus of even better performance than the light scanning apparatus of the first mode of this invention can be obtained, wherein the light scanning apparatus is free from any displacement of the scanning beam position, blooming of the scanning beam, or displacement of a focus even under a wavelength variation of the reconstructing-beam light source.

If we approximate $k(\delta)$ by expanding it with respect to $\delta$, $$k(\delta)=k_0+k_1 \delta^2 \quad (32)$$

Since the spatial frequency $f(x)$ of the second hologram plate 112 is $(\sin \delta - \sin \beta)/\lambda$, the following equation holds.

$$\lambda f(x)=\{1-k(\delta)\} \sin \delta = (1-k_0-k_1 \delta^2) \sin \delta \quad (33)$$

Since the first-order differential $f'(x)$ of the spatial frequency $f(x)$ is $\tan \delta = x/L$ when the first hologram plate 110 and the second hologram plate 112 are separated by the distance L ($L=l_4$), it is found from the equation (31) that $$\lambda f'(x)=\{-2k_1\delta \sin \delta + (1-k_0-k_1 \delta^2) \cos \delta\} \times \cos^2 \delta/L \quad (34)$$

Designating, in the second hologram plate 112, the distance between the object point of the incident wave and the second hologram plate 112, and the distance between the image point and the second hologram plate 112 as, respectively, $a(\delta)$ and $b(\delta)$, the following relationship regarding the image formation is derived.

$$\cos^3 \delta/a(\delta)+\cos^3 \beta/b(\delta)=\lambda f'(x) \quad (35)$$

At the scanning center ($\delta \to 0$), it is found from the equations (34) and (35), that $$1/a(0)+1/b(0)=(1-k_0)/L \quad (36)$$

Referring to the above equation, a plane image formation is obtained when $b(\delta)=b(0)=b_0$. Further, the following relationship is obtained.

$$k(\delta)=l_4/l_3=L/a(\delta) \quad (37)$$

Expanding $a(\delta)$ in the power series of $$1/a(\delta) = \lambda f'(x)/\cos^3 \delta - \cos^3 \beta/\cos^3 \delta/b_0 \quad (38)$$
$$= \{-2k_1\delta(\delta + \delta^3/3 + \cdots) + $$
$$\{(1-k_0)-k_1\delta^2\}/L - $$
$$\{1+(3/2)(1-k_0^2)\delta^2\}/b_0.$$

It is found from the equation (37) that $$1/a(\delta)=k(\delta)/L=(k_0+k_1\delta^2)/L \quad (39)$$

Comparing the equations (38) and (39), we obtain:

$$1/b_0=(1-2k_0)/L \quad (40)$$

$$k_1=-(\tfrac{3}{8})(1-k_0^2)(1-2k_0). \quad (41)$$

By determining $k(\delta)$ and $a(\delta)$ according to the equations $$k(\delta)=k_0-(\tfrac{3}{8})(1-k_0^2)(1-2k_0)\delta^2 \quad (42)$$

$$a(\delta)=L/k(\delta) \quad (43)$$

a light scanning apparatus having no optical axis displacement due to a wavelength variation of the light source may be obtained, where $k_0$ is a parameter specifying the characteristic of an optical system. Since it is assumed in the equation (40) that $b_0$ is positive and $k(\delta)$ is more than 0, $$0 < k_0 < 0.5. \tag{44}$$

The converging spherical wave incident on the first hologram plate 110 is defined by the equation (29) by assuming $\alpha = 0$ and by using the equations (30) and (32). $l_1$ concerns the scanning beam incident on the hologram plate 110 and is generally a constant. Therefore, it is sufficient to consider the case of $\delta = 0$ only. As a result of these considerations, $l_1$ is determined from $$1/l_1 = (k_0^2/L + 1/b_0)/(1-k_0)^2.$$

It is known from the equation (40) that $$l_1 = L \tag{45}$$

From these results, the following conditions for an achromatic light scanning apparatus are derived.

① It is required that the wave incident on the first hologram plate 110 be a converging spherical wave in order to fulfill conditions for achromatic image formation.

② It is required that either the spatial frequency $f(x)$ of the second hologram plate 112 be $$f(x) = \{1-k(\delta)\} \sin \delta,$$

where $\delta$ is the incidence angle of the beam incident on the second hologram plate 112, or that $$k(\delta) = k_0 - (3/8) (1-k_0^2) (1-2k_0)\delta^2;$$

③ $k(\delta)$ of the above equation serves to determine the position of the diverging incident-wave light source with respect to the second hologram plate 112. In order to fulfill the conditions for achromaticity relative to the optical axis, it is required that $$a(\delta) = L/k(\delta).$$

④ The scanning beam outgoing from the second hologram plate 112 forms a plane image in accordance with the following equation.

$$1/b_0 = (1-2k_0)/L$$

Figure 21:
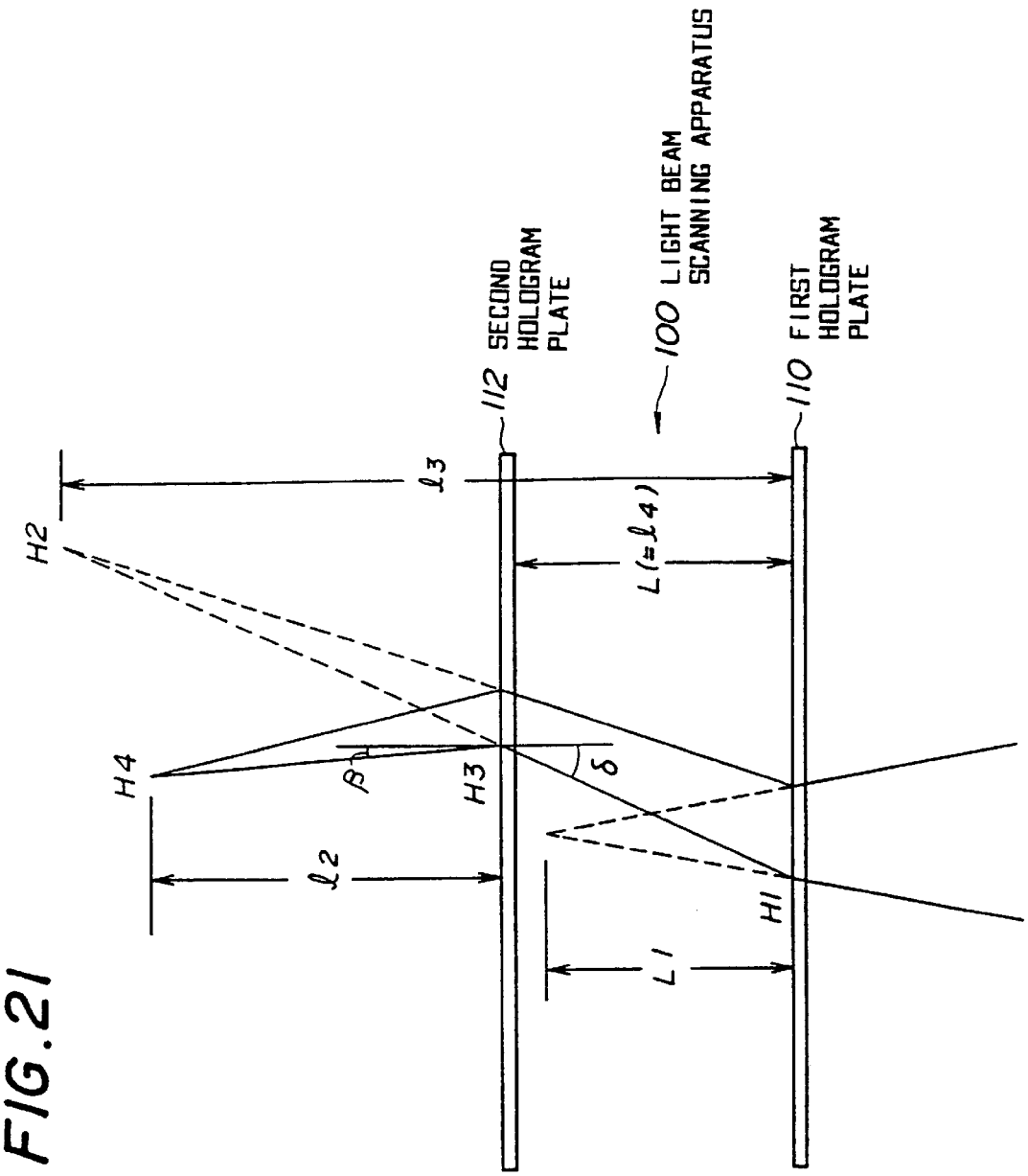
FIG. 21 is a diagram showing the third mode of the second embodiment.

A description will be given next of the principle of a light beam scanning apparatus according to the third mode of the second invention with reference to a top view of a typical hologram scanning system as shown in FIG. 21. The light beam scanning apparatus 100 of FIG. 21 consists of at least two holograms, namely a first hologram plate 110 and a second hologram plate 112.

A scanning beam in the form of a converging spherical wave is incident on the first hologram plate 110 (having a focal distance of $l_1$) of the light beam scanning apparatus shown in FIG. 21 at an incidence angle of $\alpha$. This converging spherical wave is converted into a converging spherical wave by the first hologram plate 110 and exits therefrom at an outgoing angle of $\delta$.

The second hologram plate 112 is disposed to be parallel to the first hologram plate 110 and at an optical axis distance of $l_4$ (the distance between $H_1$ and $H_3$ in FIG. 21) therefrom. The converging spherical wave outgoing from the first hologram plate 110 having a focal distance $(l_3 - l_4)$ ($l_3$ minus $l_4$) (the distance between $H_2$ and $H_3$ in the figure) is incident, on the second hologram plate 112, with an incidence angle $\delta$. It is then converted into a converging spherical wave by the second hologram plate 112. This converging spherical wave having a focal distance of $l_2$ (the distance between $H_3$ and $H_4$ in the figure), exits from the second hologram plate 112 with an outgoing angle of $\beta$. A distance between $H_1$ and $H_2$ in FIG. 7 is $l_3$.

The following equations must stand in order for the optical path length difference of the scanning beams to be 0, in other words in order for an achromaticity to be obtained with respect to an optical axis and to an image formation.

$$\sin \alpha = (1-l_4/l_3) \sin \beta + (l_4/l_3) \sin \delta \tag{46}$$

$$\cos^2 \alpha/2/l_1 = \{l_4/l_3^2/2\} \cos^2 \delta + \{(l_3-l_4)^2/l_2/l_3^2/2\} \cos^2 \beta \tag{47}$$

By calling $k'(\delta) = l_4/l_3$, the following conditions for obtaining an achromatic light beam scanning apparatus can be derived, as in the case of the second mode of the light beam scanning apparatus of the present invention discussed earlier.

① It is required that the incident wave incident on the first hologram plate 110 be a converging spherical wave in order to fulfill the conditions for achromatic image formation.

② It is required that either the spatial frequency $f(x)$ of the second hologram plate 112 be $$f(x) = \{1-k(\delta)\} \sin \delta,$$

where $\delta$ is the incidence angle of the beam incident on the second hologram plate 112, or that $$\begin{aligned} k(\delta) &= k'(\delta)/\{1-k'(\delta)\} \\ &= k_0 - (3/8)(1-k_0^2)\delta^2 \\ k_0 &= k'_0/(1-k'_0) \\ k'_0 &= L/(L-a_0) \end{aligned}$$

③ where $k'(\delta)$ of the above equation serves to determine the position of the diverging incident-wave light source with respect to the second hologram plate 112. In order to fulfill the conditions for achromaticity relative to the optical axis, it is required that $$a(\delta) = L/k(\delta) = \{k'(\delta)-1\}L/k'(\delta) < 0$$

The negative value of $a_0$ indicates that the beam incident on the second hologram plate 112 is a converging spherical wave.

④ The scanning beam outgoing from the second hologram plate 112 forms a plane image in accordance with the following equation.

$$1/b_0 = (1+k'_0)/(1-k'_0)/L$$

⑤ Since $b_0$ in the above equation is positive, it is required that $0 < k'_0 < 1$.

As is evident from the above, the requirement for $k'$ relevant to the third mode of this invention, where the light outgoing from the second hologram plate 112 is a converging spherical wave, is $$k'(\delta) = k(\delta)/\{k(\delta)-1\}$$

where k can be expanded from the range 03–0.5 to the range $-\infty$–0.5. Generalization is possible by calling $\eta = 1-k$, $\eta' = 1-k'$, $\eta = 1/\eta'$.

FIG. 22 shows modes of the incident and outgoing waves of the first hologram plate and modes of the outgoing waves of the second hologram plate with respect to variation of the factor k in the configurations shown in FIGS. 17–20.

Figure 23:
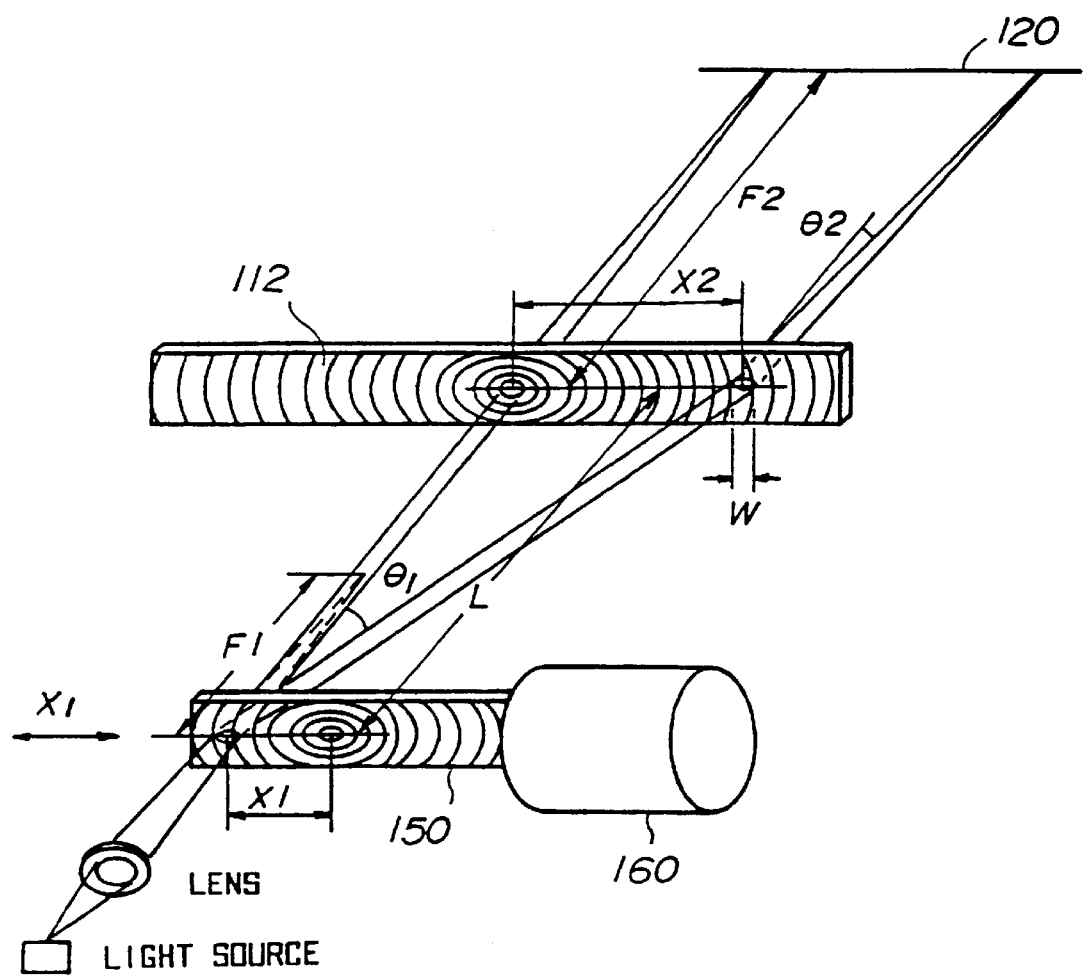
FIG. 23 is a diagram showing an example of an embodiment of a light beam scanning apparatus employing the first through third modes of the second embodiment.

FIG. 23 shows the first embodiment of a translation light beam scanning apparatus according to the above-described first mode. A movable first hologram 150 is linearly driven in the direction X in the figure by means of a translation mechanism 160 such as a voice coil motor. The direction on a hologram surface perpendicular to the direction X is designated as the direction Y.

The first hologram 150 and the second hologram 112 disposed and fixed at a distance L therefrom are configured such that the spatial frequency distributions $f_x$ (the direction X) and $f_y$ (the direction Y) are given by the following equations.

The first hologram 50

$$f_x \lambda = x_1/F_1$$

$$f_x \lambda = y_1/F_1 \qquad (48)$$

The second hologram 12

$$f_x \lambda = x_2/F_2$$

$$f_x \lambda = y_2/F_2 \qquad (49)$$

The suffixes here represent coordinates on the first hologram plate 150 and on the second hologram plate 112.

When a converging spherical wave having a focal distance of $F_1$ is incident perpendicularly on the movable first hologram plate 150, the scanning beam in the form of roughly a plane wave outgoes from the first hologram plate 150. This beam is diffracted by the fixed second hologram plate 112, causing the beam to converge on a scanning surface 120. When the first hologram plate 150 is moved a distance $x_1$, the beam outgoing from the first hologram plate 150 is subject to an angle change by $\theta_1 = \sin^{-1}(x_1/F_1)$. The outgoing beam is incident on the second hologram plate 112 in such a way as to form an angle $\theta_1$ with respect to the length $L \tan \theta_1$, the beam then outgoes from the second hologram plate at an angle $\theta_2$, wherein $$\sin \theta_2 = x_2/F_2 - \sin \theta_1$$
$$= L \tan \theta_1 / F_2 - \sin \theta_1$$
$$= L \tan\{\sin^{-1}(x_1/F_1)\}/F_2 - x_1/F_1$$

It is found from the equation (27) that the optimum condition for a wavelength variation $\Delta\lambda$ is given by $$\Delta\phi = W \cdot \sin \theta_2 < (¼)(\lambda^2/\Delta\lambda)$$

Therefore, $$\sin \theta_2 = L \tan \{\sin^{-1}(x_1/F_1)\}/F_2 - x_1/F_1 < (¼ W)(\lambda^2/\Delta\lambda) = \xi \qquad (50)$$

$$x_2 = L \tan \theta_1 \qquad (51)$$

Calling $L=F_2$, the relationship among $x_1/F_1$, $\theta_1$, and $\theta_2$ is tabulated in FIG. 24. $\xi=(¼ W)(\lambda_2/\Delta\lambda)$ is tabulated in FIGS. 25(A)–25(C), assuming $\lambda=780$ nm.

A scanning optical system resistant to wavelength variation can be configured on the basis of the values of $\sin \theta_2$ in FIG. 24 and those of $\xi$ in FIG. 25(A).

Take a light beam scanning apparatus, for example, where a semiconductor laser having a wavelength variation of 1 nm is used to construct holograms characterized by the equations (48) and (49) in which $F_1=F_2=200$ mm, where the distance L between the first hologram plate 150 and the second hologram plate 112 is 200 mm, and the beam radius of the reconstructing beam is 2 mm (F number being 100). $\xi$ in this case is 0.076 according to FIG. 25(A).

When the first hologram plate 150 in this configuration is translated $\pm 100$ mm ($x_1/F_1=0.5$), it is found from FIG. 24 that $\sin \theta_2=0.77$ and the equation (50) roughly stands valid. As a result, a light scanning apparatus having a scanning width (twice $x_2$) of 252 mm (B4 size) is obtained, where no degradation of the scanning performance due to displacement of the beam position caused by a wavelength variation is observed.

Figure 26:
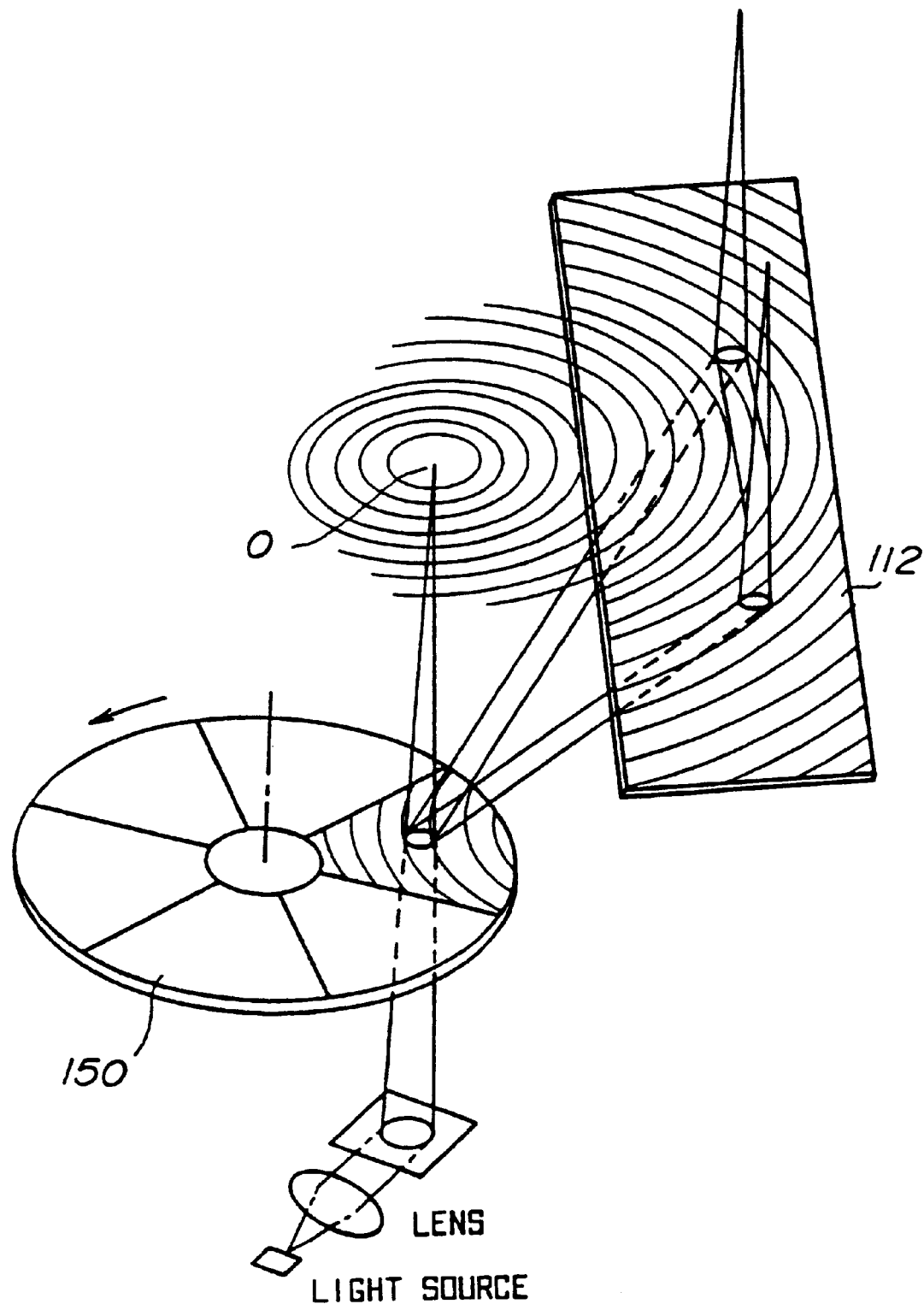
FIG. 26 is another embodiment of the first mode of the second embodiment.

The second embodiment based on the first mode of this invention is illustrated in FIG. 26. In this embodiment, a rotary hologram disk 150 is used as the first hologram. As in the first embodiment, this first hologram is combined with a fixed second hologram plate 112 so that the conditions specified by the equation (27) are met with a configuration of the movable first hologram plate 150 and the fixed second hologram plate 112.

A preferred embodiment is achieved by disposing the second hologram plate 112 to be parallel to the first hologram plate 150, and by ensuring that the principal axis 0 of the hologram of the second hologram plate 112 passes a point, at which point the beam is outgoing, of the first hologram plate 150.

Figure 27:
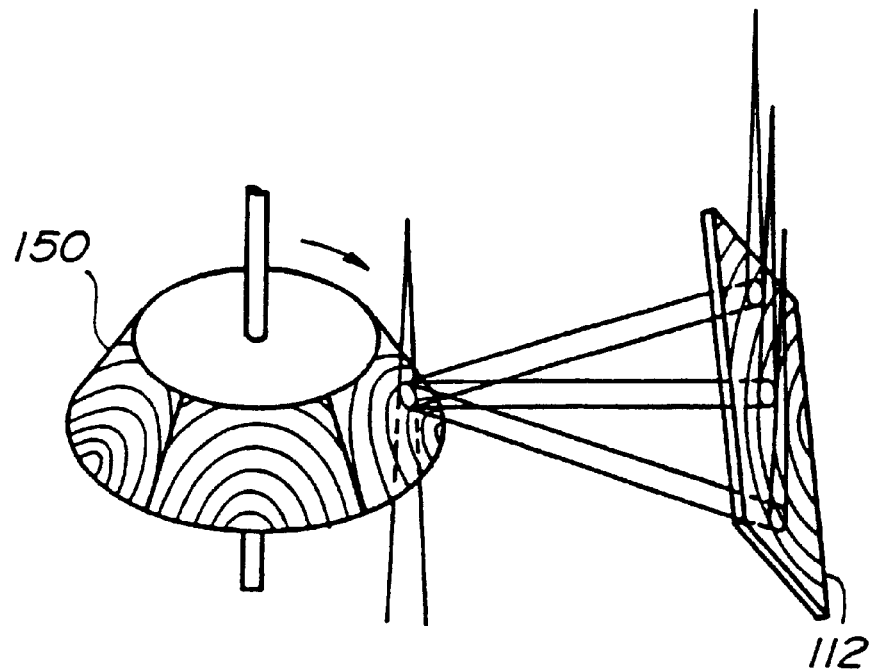
FIG. 27 is another embodiment of the first mode of the second embodiment.

A third embodiment according to the first mode of this invention is illustrated in FIG. 27. A rotary truncated-cone hologram 150 is used as the movable first hologram. A hologram is created on the surface of the truncated cone by means of a spherical wave and a plane wave. Preferably, a wavefront having its center on the rotation axis of the cone is created by a plane wave perpendicular to the surface of the truncated cone.

The fixed second hologram plate 112 is tilted at roughly the same angle as the truncated cone surface of the first hologram plate 150. Preferably, they are disposed so as to be parallel to each other. By arranging the first and second holograms 150 and 112 in such a way that the equation (27) is fulfilled, a light beam scanning apparatus resistant to wavelength variations is obtained.

Figure 28:
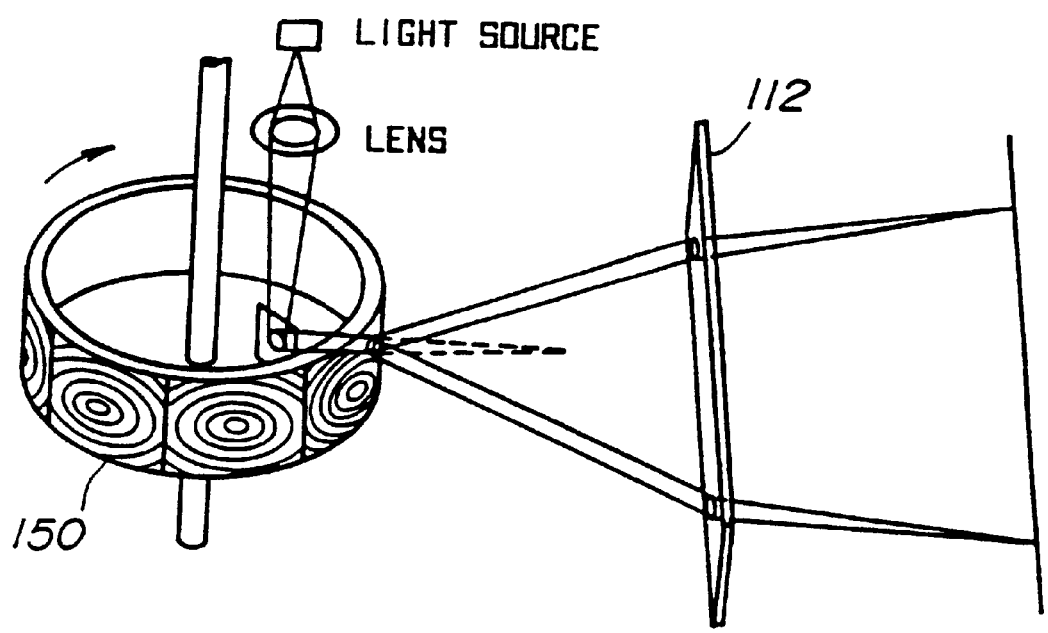
FIG. 28 is another embodiment of the first mode of the second embodiment.

A fourth embodiment according to the first mode of this invention, in which mode a cylindrical hologram 150 is used as the movable first hologram, is illustrated in FIG. 28. A hologram is created on the surface of the cylinder by a spherical wave and a plane wave. Preferably, a wavefront having its center on the rotation axis of the cylinder is created by a plane wave.

The fixed second hologram plate 112 is preferably disposed so as to be parallel to the cylinder surface. By arranging the first and second hologram plates 112 and 150 in such a way that the equation (27) is fulfilled, a light beam scanning apparatus resistant to wavelength variations is obtained.

Figure 29:
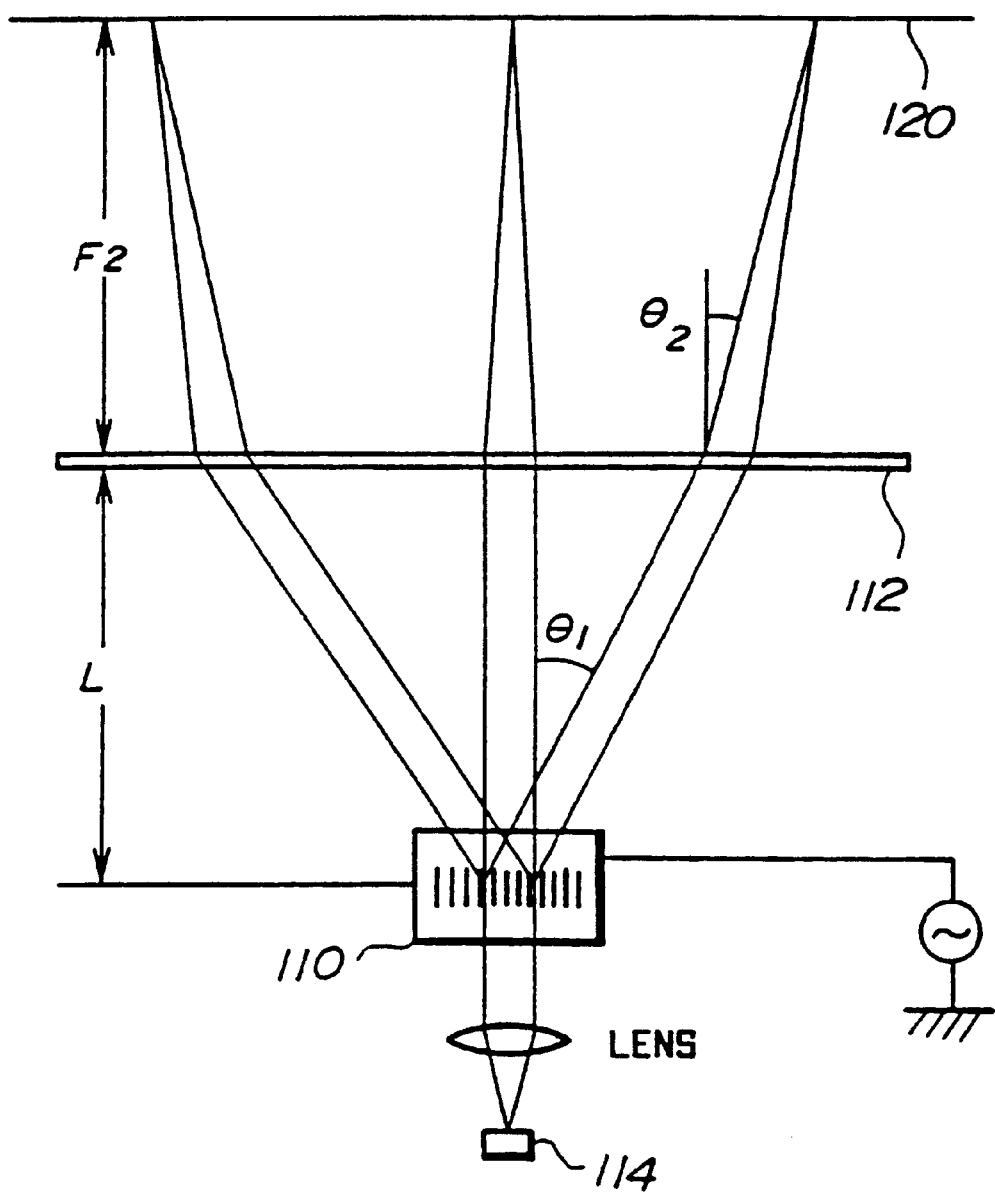
FIG. 29 is another embodiment of the first mode of the second embodiment.

FIG. 29 illustrates a fifth embodiment of an electronic light beam scanning apparatus according to the first mode of this invention. A movable first hologram 110 is formed of an acoustic optic element. Typically, such an element is manufactured by creating a diffraction grating comprising interference fringes having a pitch d of 9–18 μm by applying a high-frequency electrical field having a center frequency of about 55 MHz to a tellurium oxide crystal, and subjecting the crystal to ±18 MHz frequency modulation. The light scanning beam is diffracted as these fringes change with the passing of time.

Designating the direction perpendicular to the direction X (X is the direction of the movement of the first hologram) as the direction Y, the first hologram 110 and the second hologram 112 disposed and fixed at a distance L therefrom are configured such that the spatial frequency distributions $f_x$ and $f_y$ are given by the following equations.

$$f_x \lambda = A \sin \omega t + B, \quad f_y \lambda = 0$$

(The first hologram 110)

$$f_x \lambda = x_2/F_2, \quad f_y \lambda = y_2/F_2$$

(The second hologram 112)

When a plane wave beam is perpendicularly incident on the first hologram 110, a scanning beam in the form of a plane wave exits therefrom. This beam is diffracted by the second hologram plate 112, and converges on the scanning surface 120. The outgoing beam diffracted by the first hologram 110 is deflected by an angle $\theta_1 = \sin^{-1}$ (A sin ωt+B). This outgoing beam is incident, at an incidence angle of $\theta_1$, on a position L tan $\theta_1$ on the second hologram plate 112, and exits from the second hologram plate 112 at an angle $\theta_2$.

It results from this configuration that $$\begin{aligned}\sin\theta_2 &= x_2/F_2 - \sin\theta_1 \\ &= L\tan\theta_1/F_2 - \sin\theta_1 \\ &= L\tan\{\sin^{-1}(A\sin\omega t + B)\} \\ &\quad /F_2 - (A\sin\omega t + B)\end{aligned}$$

It is found from the equation (27) that the condition needed to enable a device to be protected against wavelength variations is as follows.

$$\Delta\phi = W \sin\theta_2 < (\tfrac{1}{4})(\lambda X^2/\Delta\lambda)$$

Therefore, the following relationship holds.

$$|L\tan\{\sin^{-1}(A\sin\omega t + B)\}/F_2 - (A\sin\omega t + B)| < (1/4W)(\lambda^2/\Delta\lambda)$$

When sin $\theta_1$ is relatively small, the left side of the above inequality becomes $|(L/F_2-1)\sin\theta_{1MAX}|\cdot\theta_{1MAX}$ is about 5.

Assuming that a semiconductor laser having a center wavelength of 780 nm, and a wavelength displacement of 5 nm is employed as the light source 114, and that the incident beam radius W is 5 mm, then we obtain the following.

$$(\tfrac{1}{2} W)(\lambda^2/\Delta\lambda) = 0.012$$

Accordingly, it is required that $L/F_2=1\pm0.14$. When an actual attempt was made by the inventor to configure a light beam scanning apparatus in which L=100 mm and $F_2$=110 mm, a light beam scanning apparatus resistant to wavelength variation was obtained.

Although FIG. 29 illustrates an embodiment in which a single first hologram is used, it is also possible to alternatively dispose a plurality of holograms such as the first hologram in stages.

Figure 30:
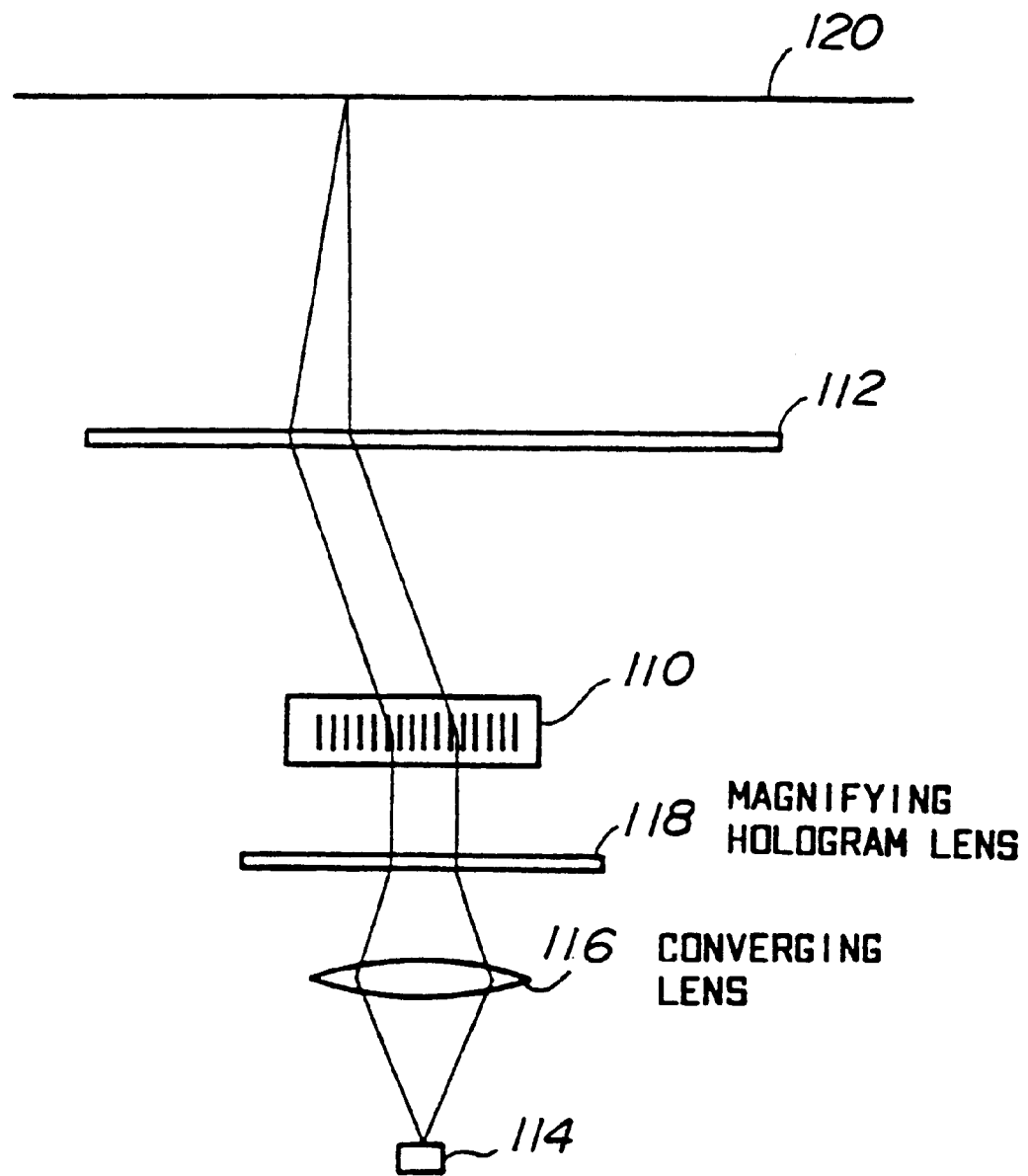
FIG. 30 is a diagram depicting an example of a configuration where the light beam scanning apparatus shown in FIG. 29 is improved.

FIG. 30 illustrates a sixth embodiment of an even more efficient configuration wherein an incident beam is provided in the form of a parallel light so as to prevent a blooming of the scanning beam, the parallel light being created by disposing a converging lens 116 and a magnifying hologram lens 118 in the stage preceding the aforementioned fifth embodiment and subsequent to the diverging light source.

In the fifth embodiment, an optical path length difference $\Delta\phi$ is created between the center of the scanning beam and the end thereof so as to cause a parallel light to converge. The value of the optical path length difference is 110 μm when $F_2$=110 mm. Since the permissible value is $\Delta\phi < (\tfrac{1}{4})(\lambda^2/\Delta\lambda) = 30$ μm, a blooming of the scanning beam created.

The present embodiment provides a correction by eliminating the 80 μm difference above. By ensuring that the focal distance of the spherical converging lens 116 is 10 mm, and disposing a semiconductor lens 114 at a distance of 11 mm from the lens, a converging wave having a focal distance of 110 mm is obtained. Provided that the focal distance of the magnifying hologram lens 118 is 110 mm, the aforementioned optical path length difference can be eliminated by converting this converging wave into a roughly parallel wave. As a result, a scanning beam free from blooming is obtained.

Figure 31:
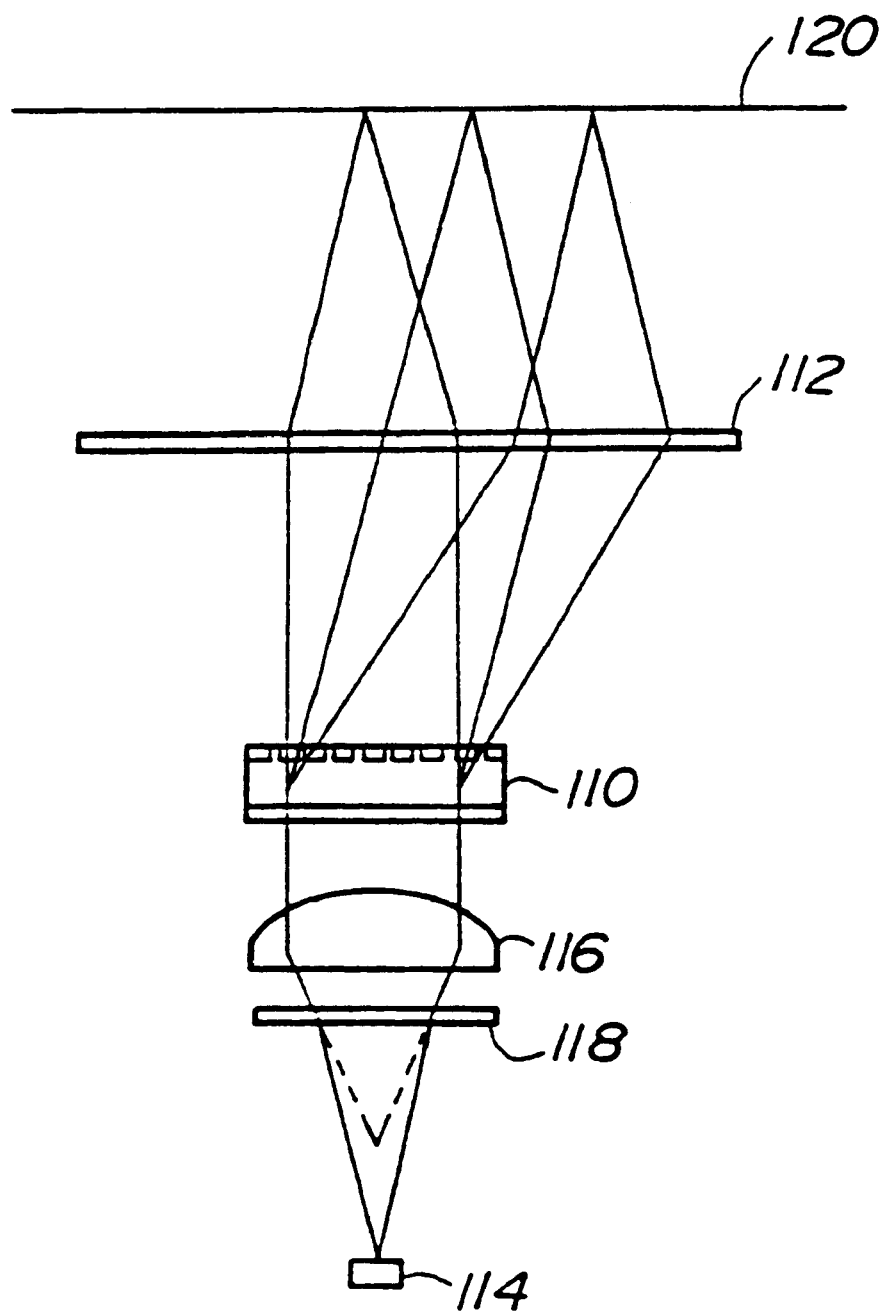
FIG. 31 is another embodiment of the first mode of the second embodiment.

FIG. 31 illustrates a seventh embodiment wherein a liquid crystal element is used, as the first hologram 110, in place of an acoustic optic element used in the sixth embodiment. The magnifying hologram lens 118 and the converging lens 116 are disposed between the light source 114 and the first hologram 110.

Applying an electrical field to a transparent comb electrode having a pitch of 0.5 μm generates a phase difference in the liquid crystal, thus forming a hologram. By changing the applied electrical field, a fringe-free state and diffraction gratings having pitches 0.5 μm and 1 μm are obtained. A light switching not affected by a wavelength variation, for example, can be realized by a semiconductor laser 114 for providing an incident beam, which is diffracted by the second hologram plate 112. While FIG. 31 illustrates an embodiment where a single first hologram is used, a plurality of such first holograms can also be alternatively disposed.

Figure 32:
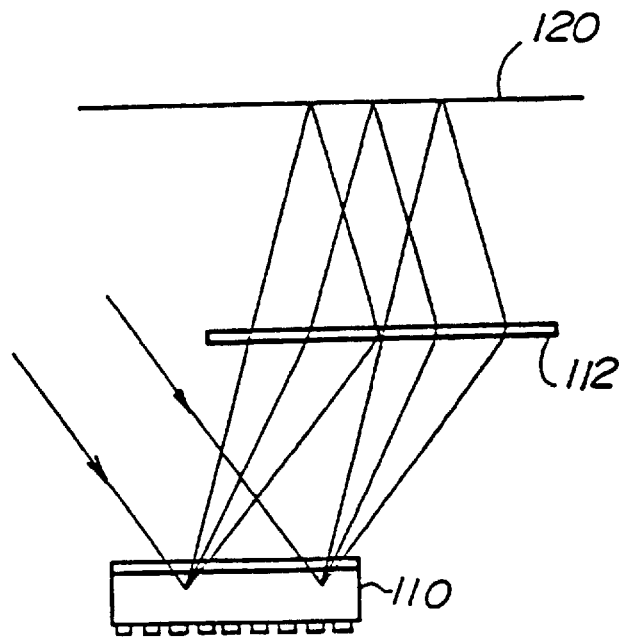
FIG. 32 is a diagram depicting an example of a configuration of the light beam scanning apparatus, which is an improvement on that of FIG. 31.

FIG. 32 illustrates an example where a reflection-type liquid crystal is used as the first hologram.

This example shows that the scanning beam can also be diffracted by a first hologram manufactured from electro-optic crystals such as $LiNbO_3$, $Sr_xBa_{(1-x)}NbO_3$, KDP, GaAs, ZnO, and $LiTaO_3$ when used instead of liquid crystal elements as employed in the seventh embodiment. Further, by using an acoustic optic element, a liquid crystal element, or an electro-optic crystal as the first hologram, the diffraction of the scanning beam in the first hologram can be electrically controlled.

With such electrical control, not only the beam scanning can be performed at a higher velocity than with a mechanical means for moving the first hologram, but also the downscaling of a light scanning apparatus is possible, and a mechanical performance degradation of the light scanning apparatus is prevented because of a lack of any movable parts.

The specifics of the second and third modes of the light beam scanning apparatus of this invention will be described below, on the basis of the light beam scanning apparatus shown in FIG. 23.

The first hologram 110 is of a flat-plate shape and converts a converging wave into a diverging wave. The second hologram 112 is also of a flat-plate shape but converts a diverging wave into a converging wave. The first hologram 110 is moved relative to the second hologram 112. Designating the direction of the movement of the first hologram 110 as the direction X, it is found from the foregoing analysis that a light scanning apparatus free of displacement of the scanning beam position caused by a wavelength variation can be obtained by manufacturing the first and second holograms in such a way that the following equations are fulfilled.

$k(\delta)=k_0-(3/8)(1-k_0^2)(1-2\ k_0)\delta^2$ $k_1=-(3/8)\ (1-k_0^2)(1-2\ k_0^2)\delta^2$ $b_0=L/(1-2\ k_0)$ $a(\delta)=L/k(\delta)$ $\sin \beta = k(\delta) \sin \delta$ $W = L \tan \delta + b_0 \tan \beta$ Assuming that a light is perpendicularly incident on the first hologram, a diffraction angle δ of the outgoing wave changes with time as the first hologram is moved.

FIG. 25(B) shows, using the parameter $k_0$, examples of specifications for designing the diffraction angle β of the second hologram and of the scanning distance W, when $k_1$, the desired value of $b_0$, and δ=35° are given.

FIG. 25(C) shows examples of configurations enabling approximately the same image formation distance both at the outgoing angle δ of 0° and 35°, and ensuring a flat image formation characteristic.

The equations below are employed in the above design.

$1/\alpha(\delta) = k(\delta)/L = (k_0 + k_1 \delta^2)/L$ $\sin \beta = k(\delta) \sin$ $$\frac{\cos^3 \delta}{a(\delta)} + \frac{\cos^3 \beta}{b(\delta)} = (1/L)\cos^2\delta\{-2k_1\delta\sin\delta + (1-k(\delta))\cos\Delta\}$$

$W = L \tan \delta + b_0 \tan \beta$ $b_0 = L/(1-2\ k_0)$

In accordance with this invention, a light scanning apparatus free from displacement of the scanning beam position, displacement of a focus of the scanning beam, or a blooming thereof, is obtained even with a light source having wavelength variation or wavelength dispersion. Further, a light beam scanning apparatus is obtained having not only the capability of correcting a wavelength variation but having also a flat image formation characteristic. Since an inexpensive semiconductor laser or a light emitting diode can be used in a light beam scanning apparatus of this invention, low-cost manufacture of such light beam scanning apparatuses is possible. Since holograms can be mass produced, a light beam scanning apparatus less expensive than the conventional polygon scanner is obtained. This invention can be applied to a scanner for a laser printer, a POS scanner, a light head, a three-dimensional-shape inspection apparatus, and a light switch.

The aforementioned first invention is characterized in that it provides uniform peripheral optical path lengths in a light flux, which optical path lengths are measured from the incident light to the image formation surface. Such a configuration achieves correction for displacement of a scanning beam position.

Figure 33:
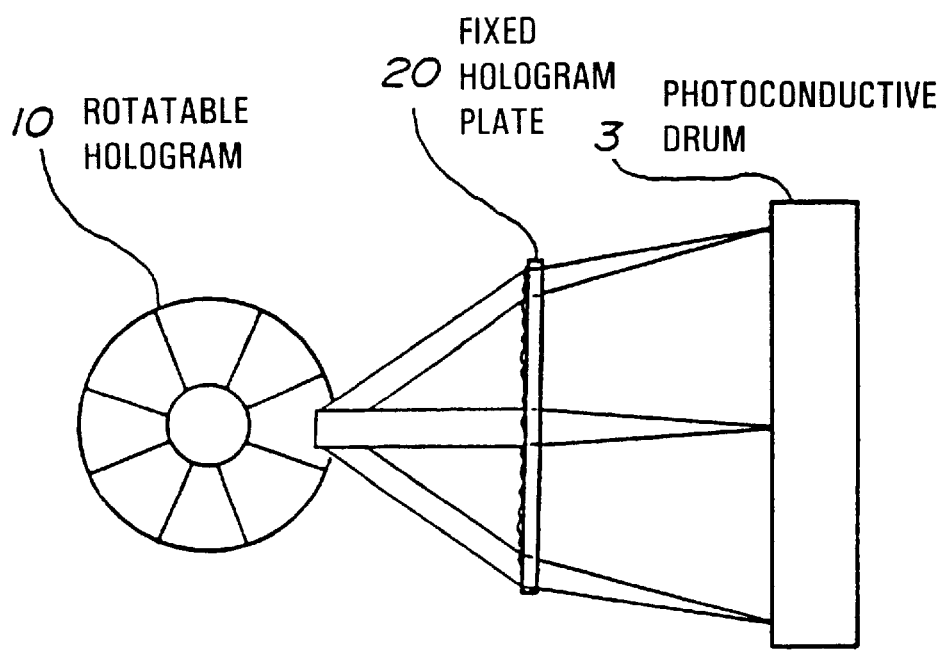
FIG. 33 is a diagram describing a disadvantage of the first embodiment.
Figure 34:
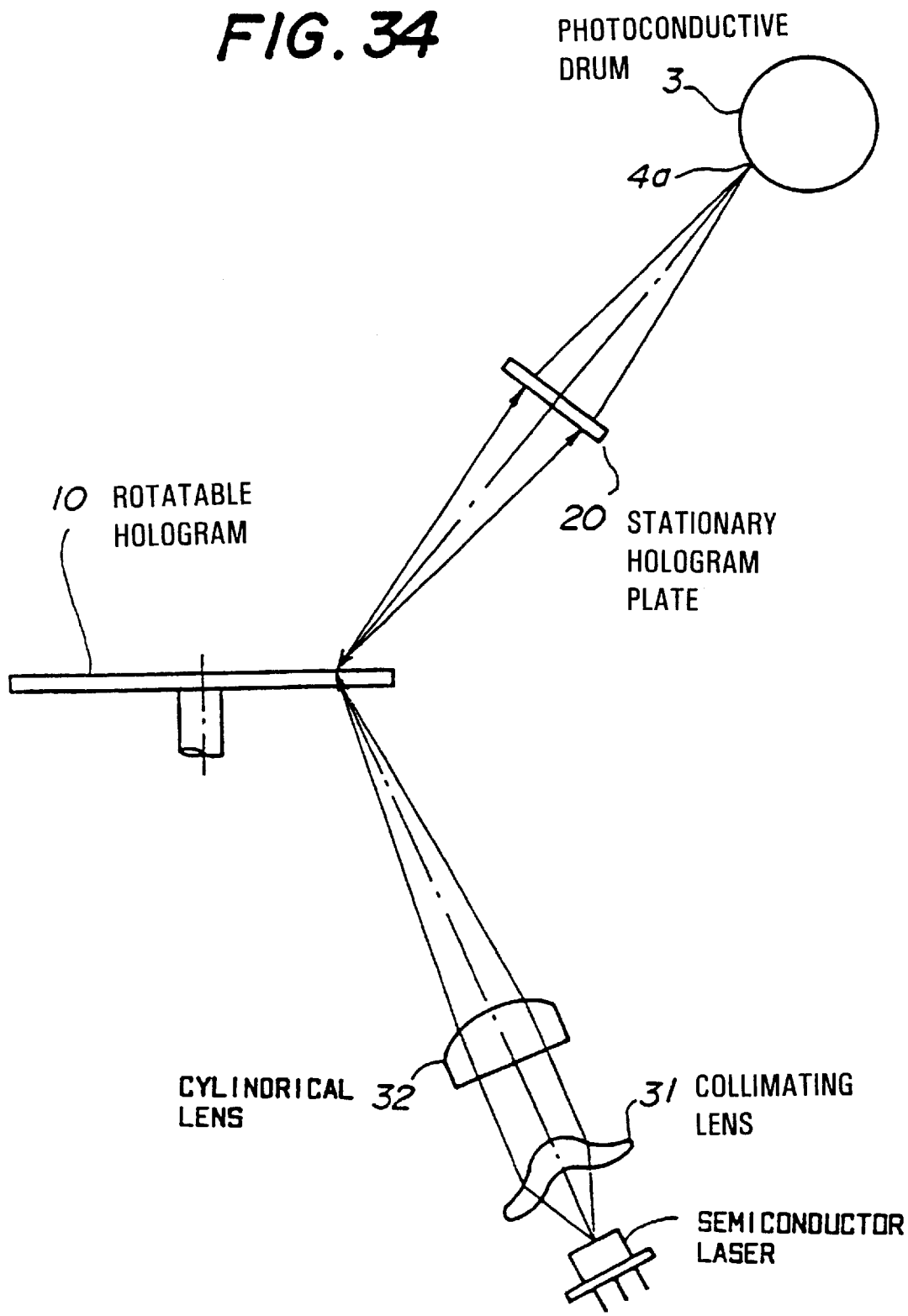
FIG. 34 is a diagram describing another disadvantage of the first embodiment.

Accordingly, as shown in FIGS. 33 and 34, when a plane wave is created by a collimating lens 31 from a diverging light emitted from a semiconductor laser in a light source portion, and the parallel light is then made to converge in the cross scanning direction by a cylindrical lens 32 while the light is maintained so as to be a parallel light in the scanning direction (or while the convergence is also effected in the scanning direction), the focus of the incident wave in the cross scanning direction should be brought onto the rotatable hologram 10.

The following problem may be expected to arise in the first invention.

① The diffraction angle of the fixed hologram plate 20 needs to be as small as about 0.5° in order to provide uniform peripheral optical path lengths in the light flux, which optical paths are measured from the light source to the image formation surface 4a, thereby leading to low spatial frequency (the number of interference fringes per unit area), an inefficient diffraction, weaker light-power on the image formation surface 4a.

② In a so-called in-line hologram characterized by a small diffraction angle, the reference wave and the object wave need to be close to each other when manufacturing a hologram, thus making the manufacture difficult using a light exposure.

③ A small diffraction angle results in difficulty in separation of high-order diffracted lights and it permits unnecessary light mixing.

In view of the above disadvantages, an object of the third invention is to provide a light beam scanning apparatus capable of allowing a large diffraction angle of the fixed diffraction grating even when uniform peripheral optical path lengths in the light flux, which optical path length are measured from the incident light to the image formation, are provided.

Figure 35A:
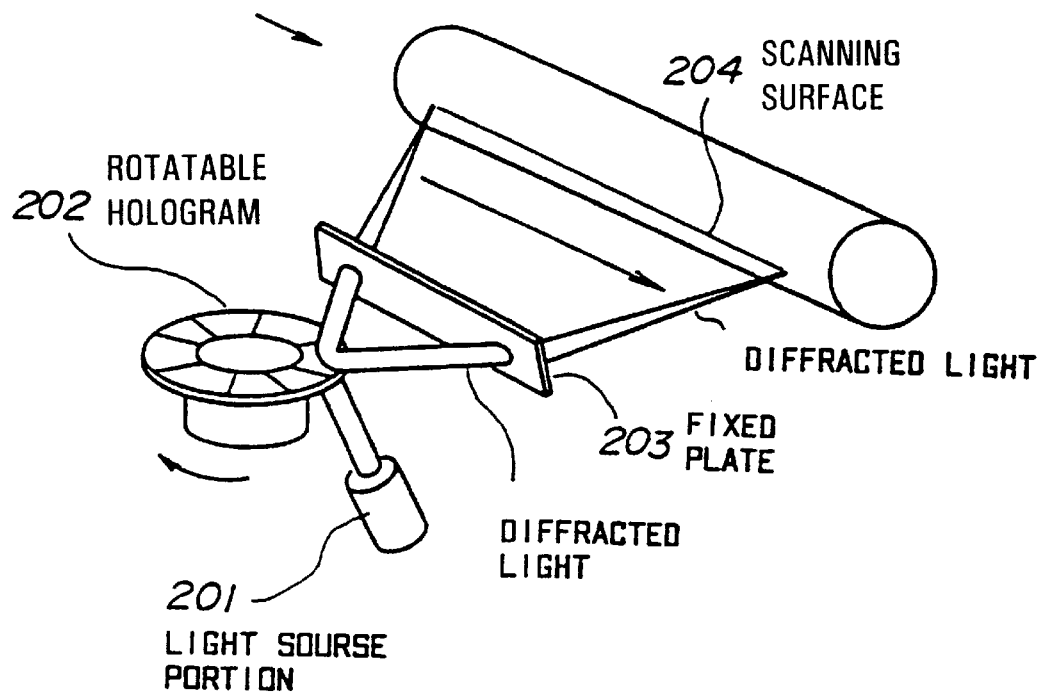
FIGS. 35(A)–35(B) are diagrams describing the principle of the present invention.
Figure 35B:
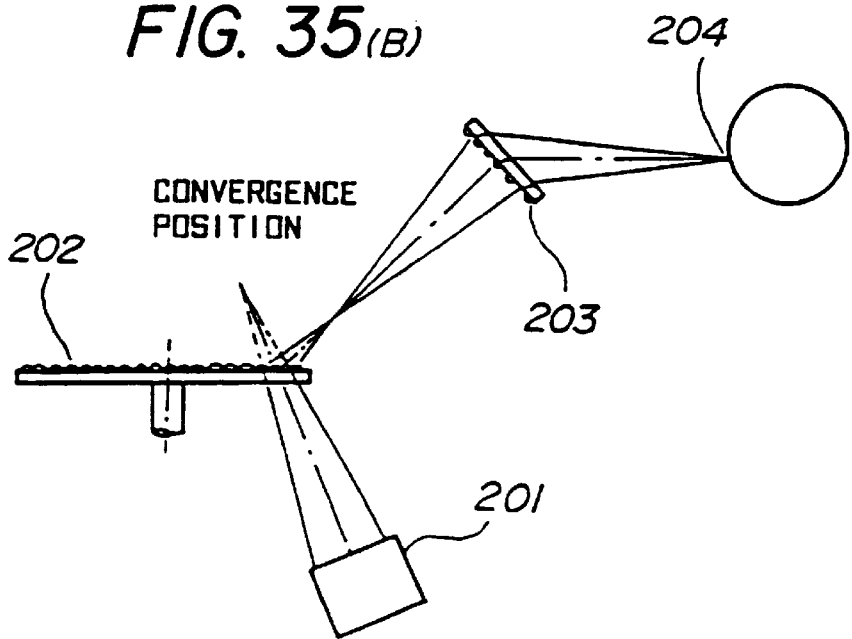

FIGS. 35(A)–35(B) are diagrams illustrating the principle of the third invention.

The third invention comprises: a light source portion 201; a rotatable hologram 202; and a fixed plate 203 disposed between the rotatable hologram 202 and a scanning surface 204 and on which rotatable hologram 202 a diffraction grating is recorded, wherein a light incident from the light source portion is diffracted by a diffraction grating of the rotatable hologram 202, a scanning is conducted with the diffracted light by the rotation of the rotatable hologram 202, the same scanning light is diffracted by the fixed plate 203 so as to conduct a light scanning on the scanning surface 204, the invention characterized in that the convergent position of the light incident on the rotatable hologram 202 is displaced from the surface of the rotatable hologram either toward the image formation surface or toward the incident light in a direction at right angles to the scanning direction, and in that the fixed plate 203 diffracts the diffracted light from the rotatable hologram 202, so that the peripheral optical path lengths are uniform, which optical path lengths are measured from the incident light to the scanning surface 204. Descriptions of the specific embodiments are given below.

Figure 36:
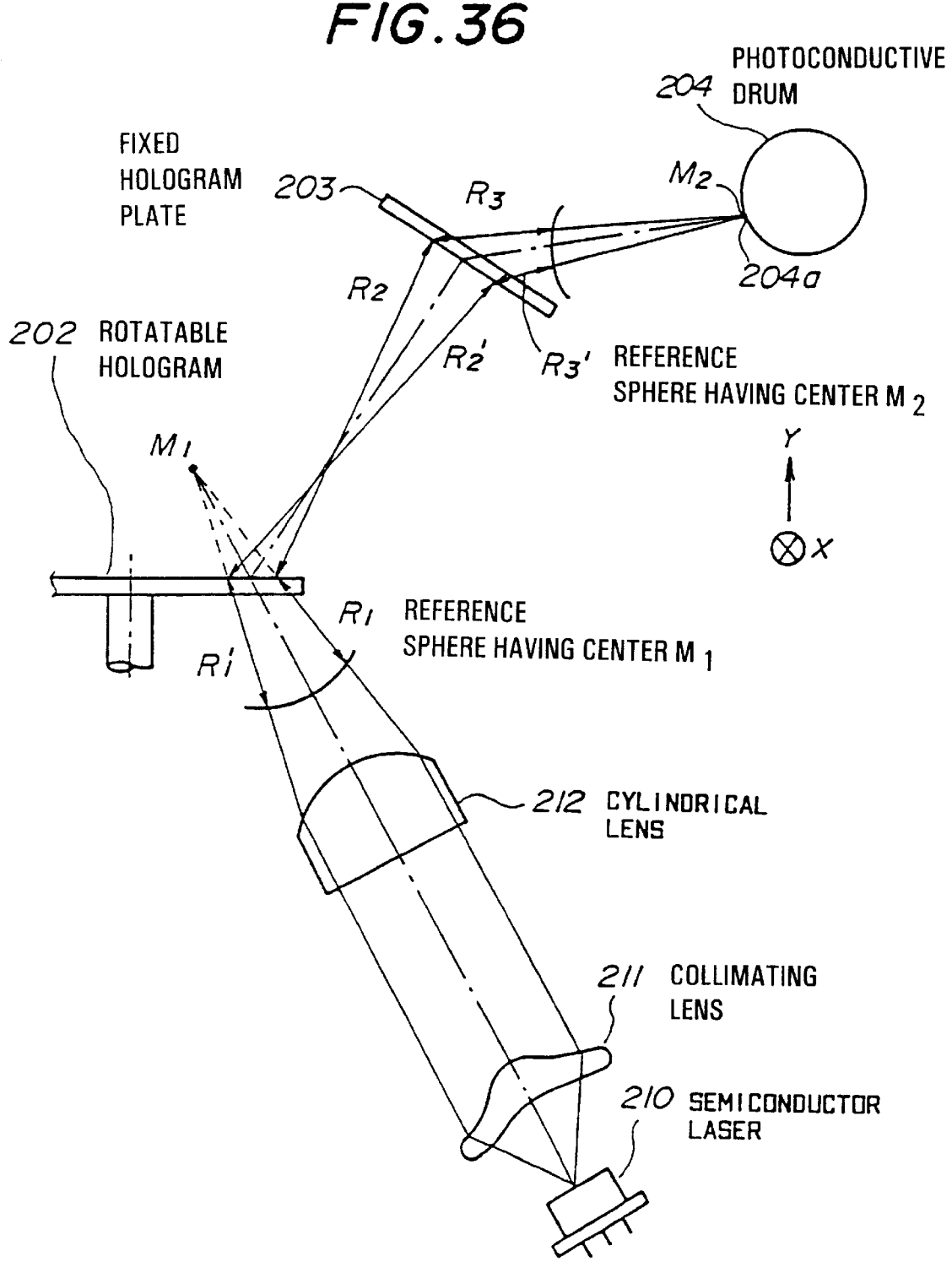
FIG. 36 is a diagram describing a configuration of the first embodiment of the present invention.

FIG. 36 is a diagram illustrating a configuration of a first embodiment of the third invention. In the figure, a diverging light from a semiconductor laser 210 is turned into a parallel light by a collimating lens 211, and is caused to converge in the cross scanning direction Y by a cylindrical lens 212. In order to provide a fixed hologram plate 203 with a diffraction angle under the condition that the one optical path $R_1+R_2+R_3$ and the other optical path $R_1+R_{2'}+R_{3'}$ are configured to be the same, the optical paths $R_3$ and $R_{3'}$ should have different values. This same difference in values should exist between the optical paths $R_1+R_2$ and $R_1+R_{2'}$.

This embodiment is configured such that: the convergent position of the light incident on the rotatable hologram 202 is in a direction away from the rotatable hologram face, towards the image formation surface in a direction at right angles to the scanning direction; a difference exists between the optical paths $R_1+R_2$ and $R_1+R_{2'}$, the fixed hologram plate 203 diffracts the diffracted light from the rotatable hologram 202 to a large extent; and the peripheral optical path lengths in the light flux are uniform. The optical paths are measured from the incident light to the scanning surface 204a. Specifically, moving the cylindrical lens 212 from its position in FIG. 34 nearer to the rotatable hologram 202 enables the focal position to be set away from the rotatable hologram 202 toward the image formation surface, in other words, at $M_1$ beyond the rotatable hologram 202.

Accordingly, the incident wave in the form of a converging spherical wave is diffracted by the rotatable hologram 202, is caused to converge along the way, diverges, and is incident on the fixed hologram plate 203.

Since the relationship $R_1 < R_{1'}$ stands valid regarding the optical paths $R_1$ and $R_{1'}$ measured from the rotatable hologram 202 to a reference sphere surface, which sphere has a center $M_1$, and the relationship $R_2 < R_{2'}$ stands valid regarding the optical paths $R_2$ and $R_{2'}$ measured from the rotatable hologram 202 to the fixed hologram plate 203, the relationship $R_3 < R_{3'}$ stands valid regarding the optical paths $R_3$ and $R_{3'}$ measured from the fixed hologram plate 203 to a reference sphere surface, which sphere has a center $M_2$ (the image formation surface 204a).

Accordingly, there arises a need to bend the scanning beam outgoing from the fixed hologram plate 203, thus ensuring a large diffraction angle of the fixed hologram plate 203, and achieving, instead of an in-line type hologram, an off-axis type hologram having a high diffraction efficiency.

Since the focal position $M_1$ is removed away from the rotatable hologram 202 toward the image formation surface, the diffraction direction of the fixed hologram plate 203 needs to be a positive direction, that is, it needs to be the same direction as the diffraction direction of the rotatable hologram 202.

The conditions for eliminating displacement of the scanning beam position are met, the displacement being due to a wavelength variation (variation of a center wavelength, multi-mode distribution variation) caused by variation in temperature of the semiconductor laser 210, while at the same time the diffraction angle of the fixed hologram plate 203 can be large, thus preventing a lowered light power, hence making the manufacturing of a hologram plate easy, and preventing the mixing of unnecessary high-order diffracted waves.

Figure 37:
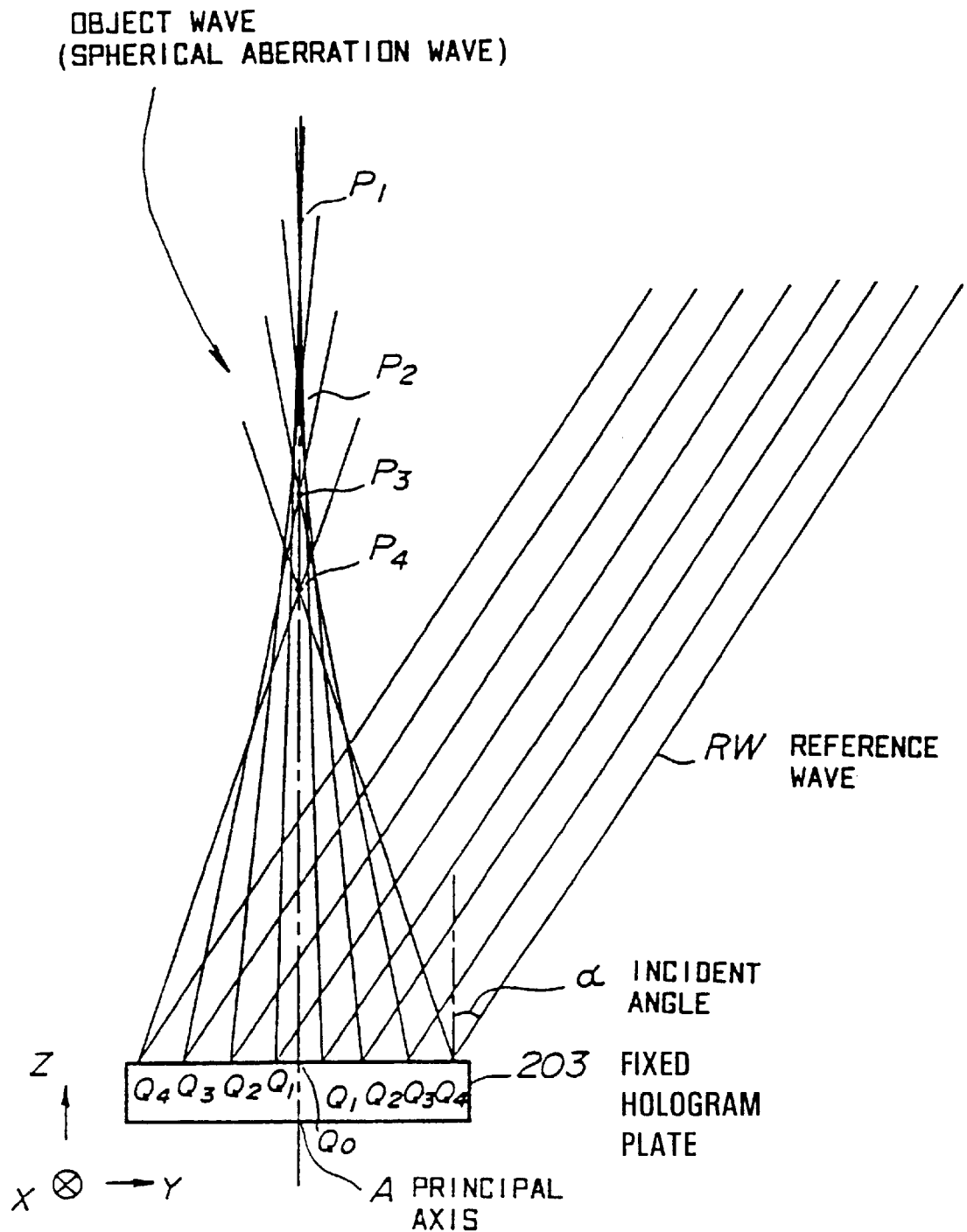
FIG. 37 is a diagram depicting a manufacture of the fixed hologram of the first embodiment of the present invention.

FIG. 37 is a diagram describing the manufacture of a fixed hologram plate of the first embodiment of this invention.

As shown in the figure, the fixed hologram plate 203 is manufactured by the interference of an object wave (spherical converging wave) and a reference wave. Calling the phase of the object wave $\Phi_0$ and the phase of the reference wave $\Phi_R$, the phase distribution $\Phi_H$ of a hologram manufactured by the above object wave and the reference wave is represented by the equation (61) below.

$$\Phi_H = \Phi_0 - \Phi_R \tag{61}$$

Since the diffracted wave of the rotatable hologram 202 is a cylindrical spherical wave, the phase $\Phi_R$ of the reference wave is expressed by the equation (62) below, where the phase differences between the spherical wave having a point $Z_0$ as the center and the cylindrical wave are included.

$$\Phi_R = k_2 \cdot \left( \sqrt{Z_0^2 + X^2 + (Y - Y_0)^2} - \sqrt{Z_0^2 + X^2} \right) \tag{62}$$

where $k_2$ is the wave number of the reconstructing wave, X is a coordinate in the scanning direction, Y is a coordinate in the cross scanning direction, Z is a coordinate in a direction at right angles to the scanning direction and the cross scanning direction.

The object wave is a spherical aberration wave having a principal axis A of the fixed hologram plate 203 as the center, which axis is hit by the outgoing wave from the rotatable hologram 202 at the scanning center. This spherical aberration wave is a so-called "positive spherical aberration wave", bending further toward the axis A as it travels along the axis A. The phase $\Phi_0$ of the object wave is given by the equation (63) below $$\Phi_0 = k_2 \cdot (C_1 \cdot (X^2 + Y^2) + C_0 \cdot Y) \tag{63}$$

where $C_0$ and $C_1$ are constants.

Accordingly, the distribution phase $\Phi_H$ of a hologram is expressed by the equation (64) below.

$$\Phi_H = \tag{64}$$
$$k_2 \left( C_1 \cdot (X^2 + Y^2) + C_0 Y + \sqrt{Z_0^2 + X^2} - \sqrt{Z_0^2 + X^2 + (Y - Y_0)^2} \right)$$

Accordingly, the directional cosines $f_x$ and $f_y$, below of the object wave in the directions X (scanning) and Y (cross scanning) are the partial derivatives of the distribution phase $\Phi_0$ of the hologram with respect to X and Y, respectively and are thus given by the equations (65) and (66).

$$f_x = \frac{1}{2\pi} \cdot \frac{\partial \phi_0}{\partial x} = \frac{2 C_1 X}{\lambda_2} \tag{65}$$

$$f_y = \frac{1}{2\pi} \cdot \frac{\partial \phi_0}{\partial y} = \frac{2 C_1 Y}{\lambda_2} \tag{66}$$

Therefore, it is best to ensure that the optical paths (PQ) originating in principal axes $P_1$, $P_2$, $P_3$ and $P_4$, and ending in points $Q_1$, $Q_2$, $Q_3$, and $Q_4$, namely the points on the fixed hologram plate 203 hit by the light, are of the same length ½ $C_1$.

It is possible to provide a diffraction angle in the Y (cross scanning) direction by the presence of the term $C_0 \cdot y$ in the equation (63).

Figures 39A, 39B, 39C:
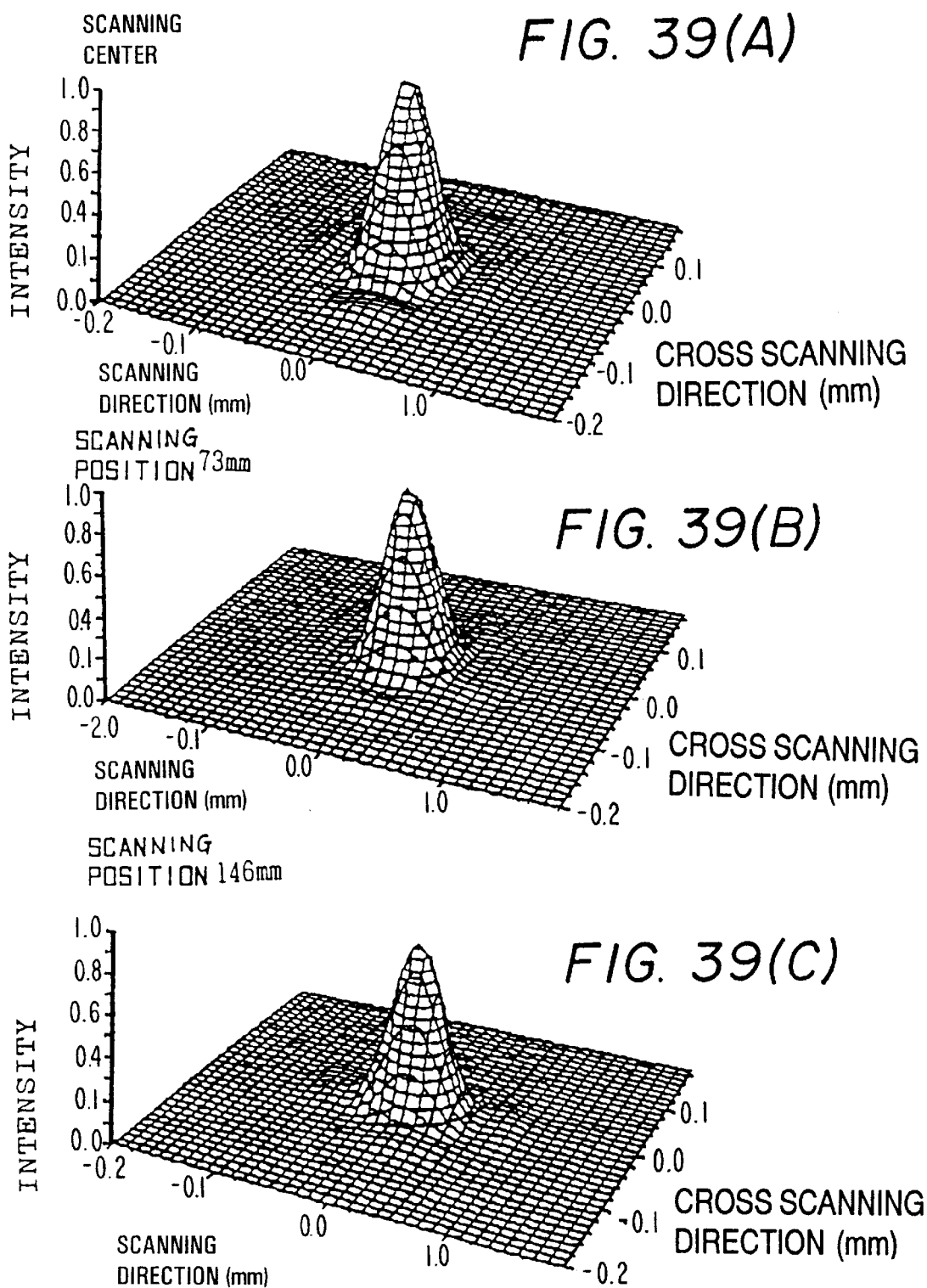
FIGS. 39(A)–39(C) show a beam intensity distribution of the first embodiment of the present invention (part 2)

FIGS. 38(A)–38(C) and 39(A)–39(C) are diagrams showing the distribution of the scanning beam intensity and illustrating the effect obtained in the first embodiment of the third invention. FIG. 38(A)–38(C) illustrate the scanning beam shape determined according to wave optics when the wavelength of the semiconductor laser is of a single mode. FIG. 39(A)–(C) illustrate the scanning beam shape determined according to wave optics when the wavelength of the semiconductor laser is of a multi-mode.

Referring to FIG. 36, the distance between the rotatable hologram 202 and the fixed hologram plate 203 is 223 mm, the distance between the fixed hologram plate 203 and the image formation surface 204a is 265 mm, and the optical axis distance between the rotatable hologram 202 and the convergence point $M_1$ is 35.5 mm.

With such a configuration, the outgoing angle of the fixed hologram plate 203, which angle is provided so as to compensate for displacement of the semiconductor laser 210 incident beam due to the wavelength variation, is 14.4°, thus ensuring a large diffraction angle and an easy separation of high-order lights.

When such an appropriate value was provided, an excellent linear scanning characteristic was obtained, where a straight-line scanning error was less than ±0.1 mm and a linear scanning error less than 0.3%.

The scanning beam intensity distribution at the scanning center and the scanning distance of 146 mm when the wavelength of the semiconductor laser 10 is of a single mode, are shown in FIGS. 8(a) and (b).

As for cases where the wavelength of the semiconductor laser 210 is of a multi-mode, a case is considered, which case is affected by the wavelength variation, where the multi-mode width is as large as 2 nm and the power ratio is 0.6 in contrast with the value of 1 taken at the wavelength center.

The actual semiconductor laser 210 is of a heavily centralized spectral characteristic.

The scanning beam intensity distributions shown in FIGS. 39(A), 39(B), and 39(C) were obtained at the scanning center, at the scanning distance of 73 mm, and at the scanning distance of 146 mm.

It is found from these results that, in a multi-mode distribution affected by a wavelength variation, a scanning beam intensity distribution not very different from the one of a single mode distribution is obtained, and that the effect of the semiconductor 210 wavelength variation is completely compensated for.

Thus, it is possible to provide a large diffraction angle of the fixed hologram plate 203, prevent a reduction of light power on the image formation surface, making the manufacturing of a hologram plate easy and preventing the mixing of unnecessary high-order diffracted waves, while fulfilling the conditions for eliminating displacement of the scanning beam position due to a wavelength variation (variation of the center frequency, a distribution variation in multi-mode) of the semiconductor laser 210.

FIG. 40 is a diagram showing a configuration of the second embodiment of this invention.

Referring to FIG. 40, configurations that correspond to the configurations shown in FIG. 36 are given the same reference notation as in the previous figure. This embodiment is configured such that, in the direction at right angles to the scanning direction, the convergent position of the light incident on the rotatable hologram 202 is nearer to the incident light than the rotatable hologram face, a difference is provided between the optical paths $R_1+R_2$ and the optical paths $R_{1'}+R_{2'}$, the diffracted light from the-rotatable hologram 202 is diffracted to a great extent by the fixed hologram 203, so that the peripheral optical path lengths within the light flux, which optical paths are measured from the incident light to the scanning surface 204a, are uniform.

The diverging light of the semiconductor 201 is turned into parallel light with a collimating lens 211, and is caused to converge in the cross scanning direction Y by a cylindrical lens 212. By moving this cylindrical lens 212 nearer to the semiconductor laser 210 than the position shown in FIG. 34, the focal position can be set at $M_1$, that is, nearer to the incident light than the rotatable hologram 202.

Consequently, the converging spherical wave diverges after converging along the way, is diffracted by the rotatable hologram 202, and is incident on the fixed hologram plate 203.

The optical paths $R_1$ and $R_{1'}$ from the rotatable hologram 202 to the surface of the reference sphere having the center $M_1$ have the relationship $R_1 < R_{1'}$, while the optical paths $R_2$ and $R_{2'}$ from the rotatable hologram 202 to the fixed hologram plate 203 have the relationship $R_2 < R_{2'}$, so that the optical paths $R_3$ and $R_{3'}$ from the fixed hologram plate 203 to the surface of the reference sphere having the center $M_2$ (the image formation surface 204) have the relationship $R_3 < R_{3'}$.

Accordingly, the scanning beam outgoing from the fixed hologram plate 203 needs to be bent so as to allow the diffraction angle of the fixed hologram plate 203 to be large, thereby creating an off-axis type hologram instead of an in-line type hologram, and assuring a large diffraction efficiency.

Since the focal position $M_1$ is in the light source side of the rotatable hologram 202, the diffraction direction of the fixed hologram plate 203 needs to be negative, that is, counter to the diffraction direction of the rotatable hologram 202.

Thus, the conditions for eliminating displacement of the scanning beam position are met, the displacement being due to a wavelength variation (variation of a center wavelength, or multi-mode distribution variation) caused by variation in temperature of the semiconductor laser 210, while at the same time the diffraction angle of the fixed hologram plate 203 can be large, thus preventing a lowered light power, making the manufacturing of a hologram plate easy, and preventing the mixing of unnecessary high-order diffracted wave.

Other than the above-described embodiments, this invention allows the variations listed below.

① As shown in a description of an electrophotograph printing apparatus where a light beam scanning apparatus is applied, this invention can be applied to such apparatuses as a laser drawing apparatus and a laser inspection apparatus.

② Although the use of a hologram as a diffraction grating was assumed, a diffraction grating can be configured in other ways.

③ Although a disk shaped rotatable hologram was assumed in the description, a drum shaped rotatable hologram can also be employed.

④ Although the movement of the convergence position was described in accordance with the movement of the position of the cylindrical lens 212, the movement of the focal distance of the cylindrical lens 212 can also be utilized.

This invention is not limited to the embodiments described so far, and variations are possible within the scope of this invention and are not excluded from the scope of this invention.

As has been described, the third invention ensures that the convergence position of the light incident on the rotatable hologram 202 is nearer (in a direction at right angles to the scanning direction) to the light source than the surface of the rotatable hologram, that a difference is provided between the optical paths $R_1+R_2$ and $R_{1'}+R_{2'}$, and that the diffracted light from the rotatable hologram 202 is diffracted to a great extent by the fixed hologram plate 203 so that the peripheral optical paths within the light flux, which optical paths originate in the incident light and end in the scanning surface 204, have uniform lengths. Thus, it is possible to provide a large diffraction angle of the fixed hologram 203 and to prevent a light-power reduction on the image formation surface, while fulfilling the conditions for eliminating displacement of the scanning beam position, displacement being due to a wavelength variation caused by temperature variation of the semiconductor laser 210.

Because it is possible to provide a large diffraction angle of the fixed hologram 203, a diffraction grating can be manufactured easily, making the provision thereof inexpensive and stable. The large diffraction angle of the fixed hologram 203 also means that a mixture of unnecessary high-order diffracted waves can be prevented.

Figure 41A:
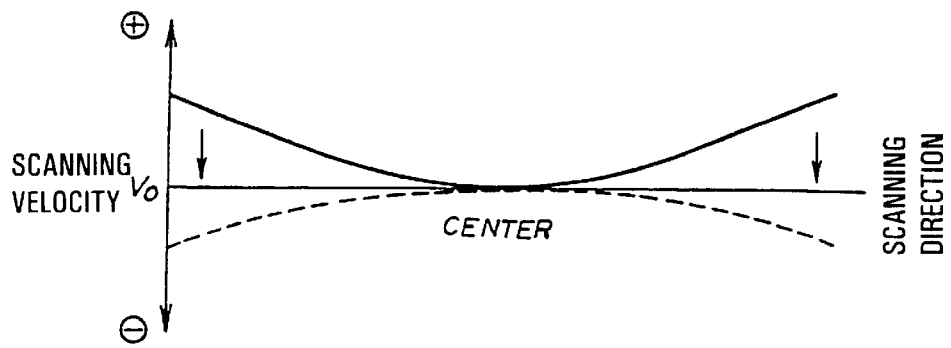
FIGS. 41(A)–41(C) are diagrams for describing a correction function for ensuring the constant velocity of the fixed hologram plate.
Figure 41B:
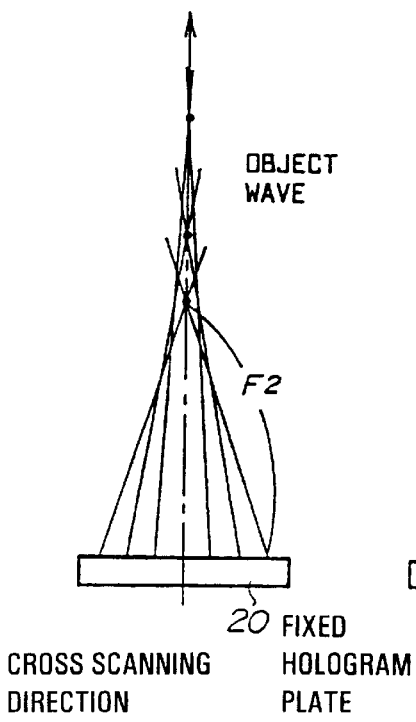
Figure 41C:
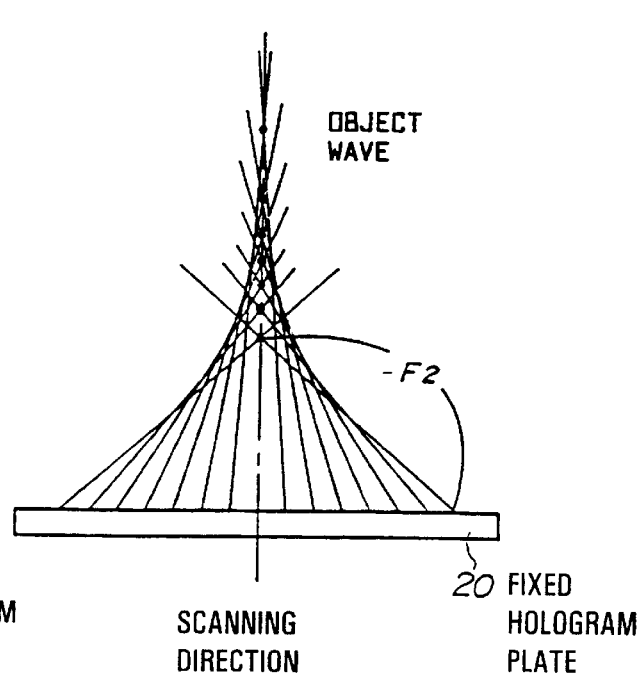

When applying a light beam scanning apparatus to such apparatus as a laser printer, a scanning beam is required to scan on a photoconductive drum, always at a constant velocity. Therefore, a fixed hologram plate is equipped with a correction function for ensuring linearity. As shown in FIGS. 41(A)–41(C), the linearity correction function of the fixed hologram plate in the first invention is such that considering that the scanning velocity of the light beam used in the constant angular velocity scanning by the rotatable hologram is greater toward the scanning end than at the center, as shown by a solid line, a diffraction angle is larger toward the scanning end than at the center, as shown in FIG. 33, so that the diffraction toward the center takes place and the scanning velocity at each scanning position remains a constant velocity $V_0$ (see FIG. 41(A)).

Therefore, as shown in FIGS. 41(B) and 41(C), the object wave for producing interference fringes of the fixed hologram plate 20 needs to be a spherical aberration wave. Further it is required that the amount of aberration of the object wave is maintained at the same level in both the scanning direction and the cross scanning direction, in order to obtain the same beam radius on the image formation surface 4 in both the scanning direction and the cross scanning direction.

However, the following problem may be expected to arise in the first invention.

In order to achieve downsizing of an apparatus, the optical path from the rotatable hologram 10 to the image formation surface 4 should be short (see FIG. 1), and the optical path from the rotatable hologram 10 to the fixed hologram plate 10 is preferably short.

Since maintaining the scanning width of the rotatable hologram 10 causes the scanning width on the image formation surface 4 to be small, the scanning width of the rotatable hologram 10 needs to be large. This enlarges the angle incident on the fixed hologram plate 20, causing the diffracted light to bend too much toward the center given the same spatial frequency, with the result that the linearity exhibits a degradation, as shown by broken lines in FIG. 41(A).

It is an object of this fourth invention to provide a light beam scanning apparatus that does not exhibit degradation in linearity, and which is free from beam aberration even when the optical path is shortened.

Figure 42:
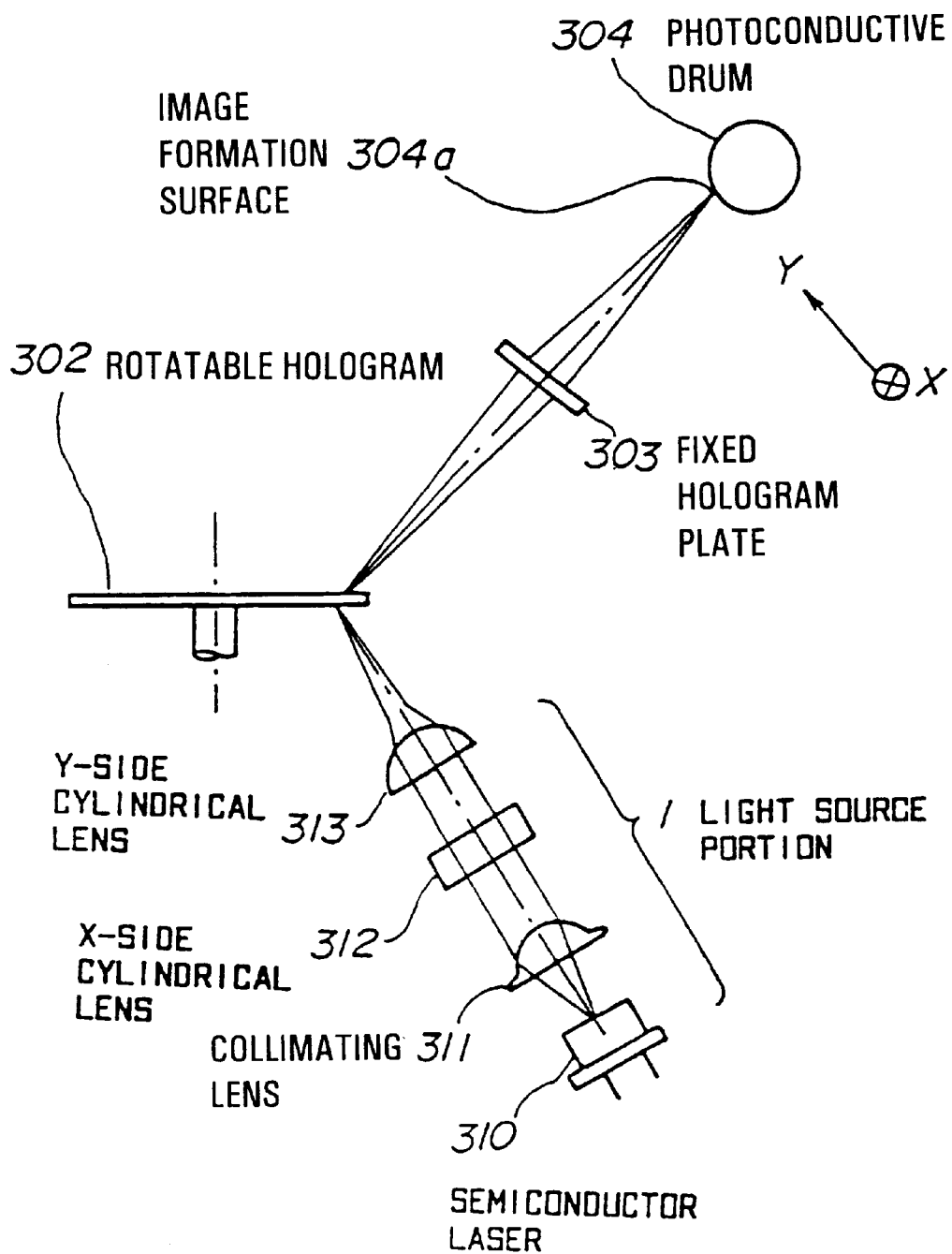
FIG. 42 is a diagram depicting a configuration of the first embodiment of the present invention (cross scanning direction)
Figure 43:
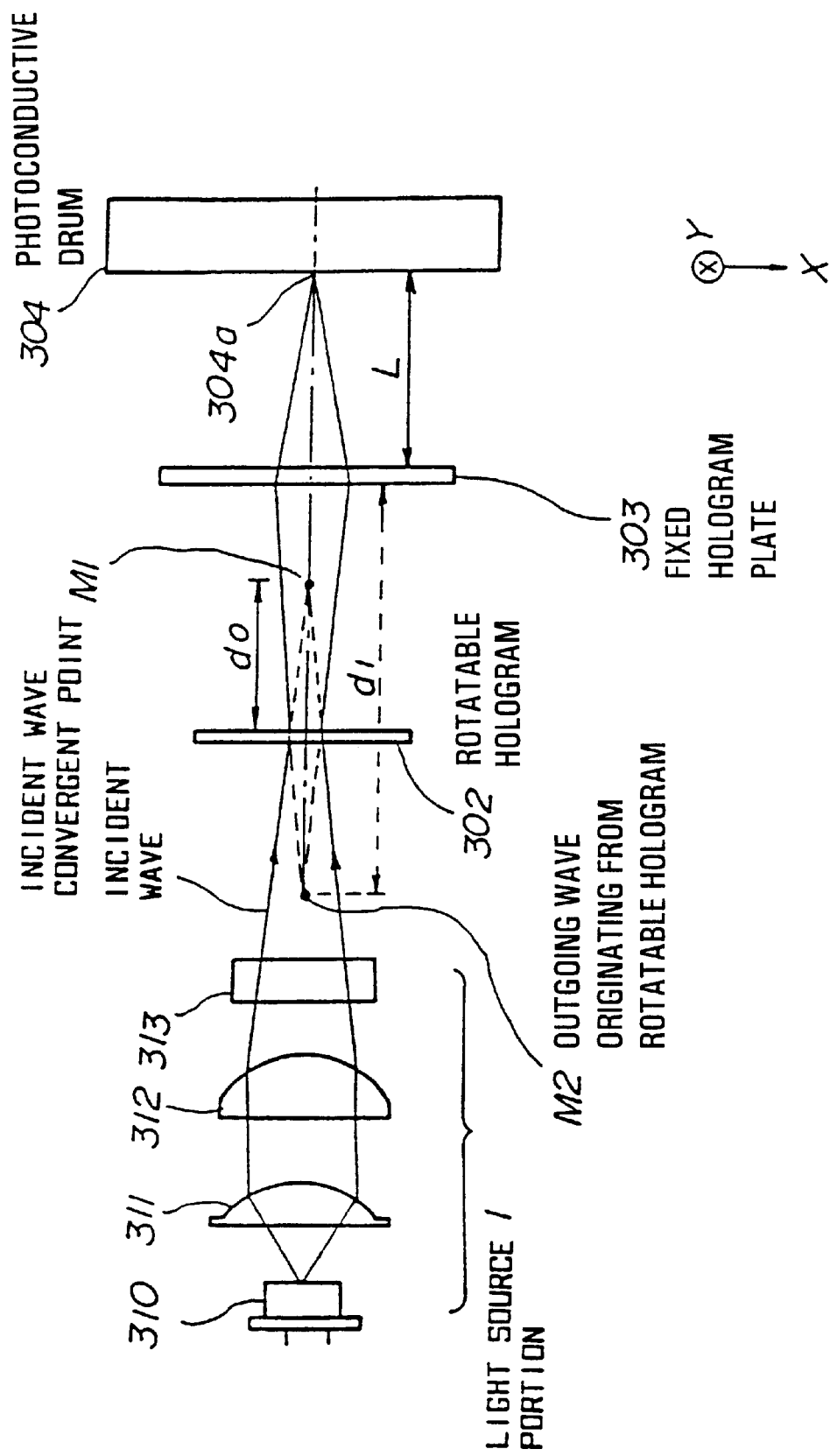
FIG. 43 is a diagram depicting a configuration of the first embodiment of the present invention (scanning direction)
Figure 44:
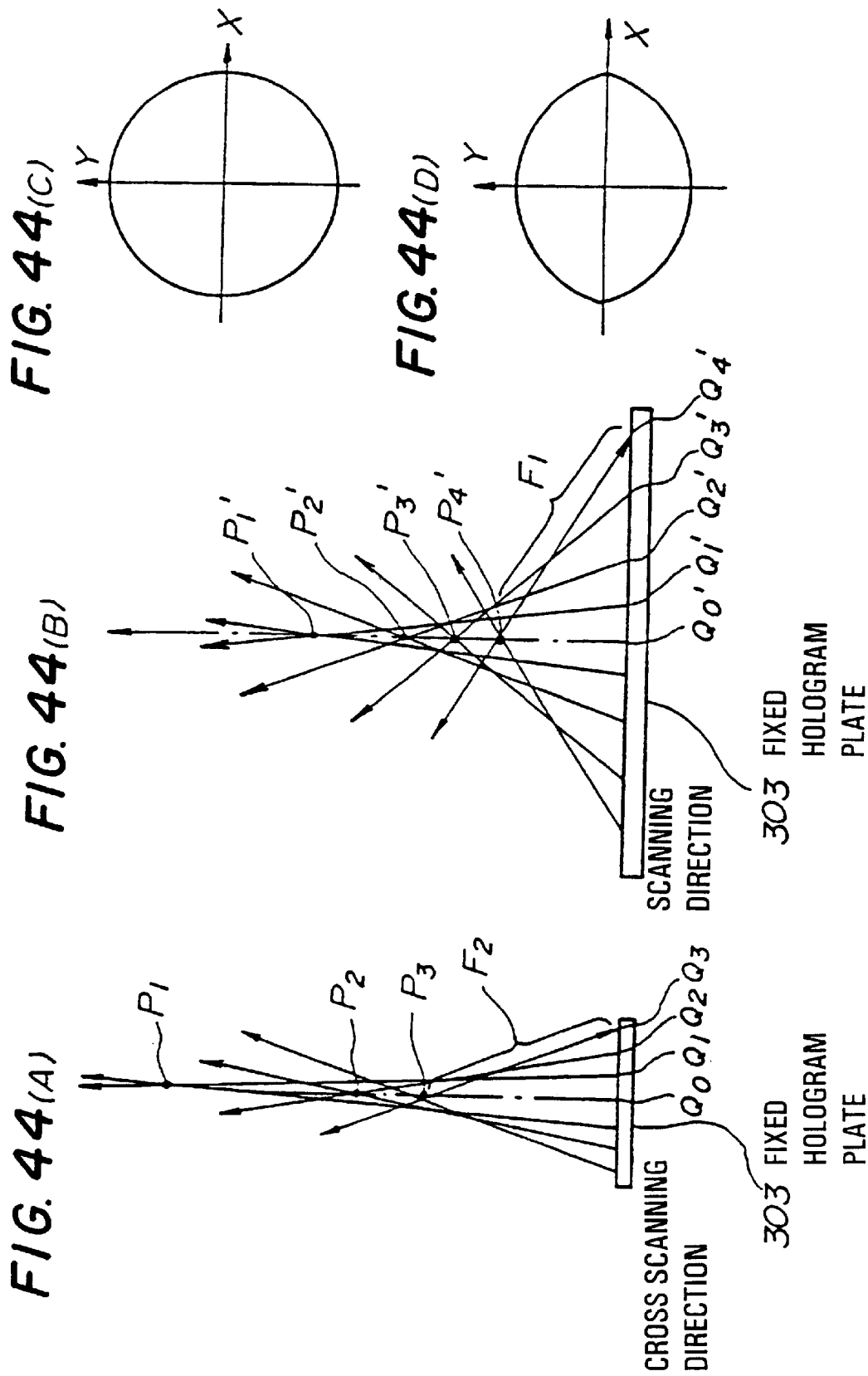
FIGS. 44(A)–44(D) are diagrams describing the fixed hologram plate of the first embodiment of the present invention.

FIG. 42 is a diagram depicting a configuration of an embodiment of this invention (cross scanning direction). FIG. 43 is a diagram depicting a configuration of an embodiment of this invention (scanning direction). FIG. 44 is a diagram describing a fixed hologram plate of an embodiment of this invention.

Viewed along the cross scanning direction of FIG. 42: the diverging light of the semiconductor laser 310 is turned into plane wave by a collimating lens 311; is caused to converge on the rotatable hologram 302 in the cross scanning direction Y, convergence being effected by a Y-side cylindrical lens 313 and via an X-side cylindrical lens 312; is diffracted by the rotatable hologram 302; is incident on the fixed hologram plate 303; is diffracted and made to converge again; and is finally convergent on an image formation surface 304a on a photoconductive drum 304.

On the other hand, viewed in the scanning direction of FIG. 43; the diverging light of the semiconductor laser 310 is turned into plane wave by a collimating lens 311; is made to converge by an X-side cylindrical lens 312; is further made to converge, via the Y-side cylindrical lens 313, at M1 beyond the rotatable hologram 302 in the scanning direction X; is diffracted by the rotatable hologram 302 for scanning; is incident on the fixed hologram plate 303; is diffracted and made to converge again; and is finally convergent on the image formation surface 304a on the photoconductive drum 304.

This fixed hologram plate 303 allows different rates of variation of direction in cosines of the object wave in the scanning direction and the cross scanning direction.

Thus, while the object wave for creating interference fringes of the fixed hologram plate 303 is conventionally an isotropic spherical wave, this invention allows for different amounts of aberration in the scanning direction and the cross scanning direction, as shown in FIGS. 44(A) and 44(B), and a linear scanning may be achieved for any point in each direction because aberration is provided such that the distance from the optical axis to the hologram face is uniform.

On the other hand, in the conventional technology, shortening the optical path between the rotatable hologram 302 and the fixed hologram plate 303, and enlarging the scanning width of the rotatable hologram 302 causes a degradation in the linearity because high spatial frequency of the fixed hologram plate 303 brings the diffracted light toward the scanning center.

In order to lower the spatial frequency in the scanning direction, the length F1, the distance between the optical axis and the hologram face, is longer than the regular distance F2 in the cross direction shown in FIG. 44(A). F1 is the same at any point at which an amount of aberration in the main scanning direction in FIG. 44(B) is determined.

That is, the distances between the optical axis and the hologram face in the cross scanning direction fulfill the equation (71) below.

$$P_1Q_1 = P_2Q_2 = P_3Q_3 \ldots = F2 \tag{71}$$

Further, the distances between the optical axis and the hologram face in the scanning direction fulfill the equation (72) below.

$$P_1Q_{1'} = P_2Q_{2'} = P_3Q_{3'} \ldots = F1 \tag{72}$$

The distances F2 and F1 are arranged so that a condition represented by the inequality (73) below stands valid.

$$F1 > F2 \tag{73}$$

This arrangement ensures that the spatial frequency of the fixed hologram plate 303 in the scanning direction is low, and that an over-correction of the linearity is prevented.

The phase $\Phi_0(X, Y)$ of the object wave fulfilling the above equation, the wave being recorded on the fixed hologram plate 303, is given by the equation (74) below.

$$\Phi_0(X,Y) = k_2 \cdot (C_1 \cdot X^2 + C_2 \cdot Y^2 + C_0 \cdot Y) \tag{74}$$

$$C_1 = \frac{1}{2 \cdot F1}$$

$$C_2 = \frac{1}{2 \cdot F2}$$

where X and Y are coordinates in the scanning direction and the cross scanning direction respectively, the origin of the coordinates being the scanning center of the fixed hologram plate 303, and $k_2$ is a wave number derived from the wavelength $\lambda_2$ of the reconstructing wave.

As can be seen from the equation (74), since $C_0 \cdot Y$ is a correction term provided because of an off axis incidence, the phase of the object wave needs to be an ellipse as shown in FIG. 44(D), which is different from a circle shown in FIG. 44(C) produced by the conventional isotropic spherical wave.

The phase $\Phi_R$ of the reference wave in this case is represented by the phase difference between a spherical wave having a center $Z_0$ and a cylindrical wave, and is expressed by the equation (75) below:

$$\Phi_R = k_2\left(\sqrt{X^2 + (Y-Y_0)^2 + Z_0^2} - \sqrt{X^2 + Z_0^2}\right) \quad (75)$$

where Z is a coordinate in a direction at right angles to the scanning direction and the cross scanning direction.

Accordingly, a direction cosine $f_x$ in the scanning direction of the object wave and a direction cosine $f_y$ in the cross scanning direction are the results of partial differentiation of the equation (74), and are given by the following equations (76) and (77).

$$f_x = \frac{1}{k_2} \cdot \frac{\partial \phi_0}{\partial X} = \frac{1}{F1 \cdot \lambda_2} \cdot X \quad (76)$$

$$f_y = \frac{1}{k_2} \frac{\partial \phi_0}{\partial y} = \frac{1}{F2 \cdot \lambda_2} \cdot Y + C_0 \quad (77)$$

When the equations (76) and (77) are compared, it is found that the rate of variation of the direction cosine $f_x$ of the object wave in the scanning direction is smaller than the rate of variation of the direction cosine $f_y$ of the object wave in the cross scanning direction, which makes it possible to make small the spatial frequency $f_x$ in the scanning direction.

Changing the distance to F1 produces a difference in the beam image-formation distances in the scanning direction and the cross scanning direction on the image formation surface 304a, thereby necessitating the correction thereof.

As shown in FIG. 43, assuming that the image formation at the image formation distance L takes place in the cross scanning direction when the fixed hologram plate 303 is of a parameter F2, the image formation in the scanning direction at the image formation distance L, when the parameter is F1, requires that the focal distance $d_1$ of the diverging wave outgoing from the rotatable hologram 302 be obtained by a known equation (78) shown below.

$$1/d_1 = 1/F1 - 1/L \quad (78)$$

Since the position of the rotatable hologram 302 cannot be changed because of the image formation condition in the cross scanning direction, the incident focal distance $d_0$ of the incident wave is adjusted.

That is, the beam radius difference between the scanning direction and the cross scanning direction can be corrected by controlling the focal distance $d_0$ of the incident light by means of the X-side cylindrical lens 312, setting the incident convergence point $M_1$ to be beyond the rotatable hologram 302 so that the outgoing wave originating position $M_2$ of the rotatable hologram 302 is removed from the fixed hologram plate 303 by a distance $d_1$ and the image formation takes place at the image formation distance L in the scanning direction at the parameter F1. Normally, the X-side cylindrical lens 312 can be omitted and the controlling in the direction X can be performed with the position LD control by means of the collimating lens.

Specifically, this embodiment is configured such that the optical path $L_1$ between the rotatable hologram 302 and the fixed hologram plate 303 is as short as 234 mm, the optical path L between the fixed hologram plate 303 and the image formation surface 304a is 276 mm, and F1 and F2 are 279 mm.

With this configuration, a beam having only a 50 micron deviation from the straight line and little aberration can be obtained by choosing an appropriate parameter, a linearity, however, is as bad as at a −1.4% level.

When a step was then taken to make F1 become larger than F2, F1 being 356 mm and F2 being 226 mm, $L_1$ became 273 mm and L2 became 226 mm. Although the overall optical paths remained unchanged, a beam having a 50 micron deviation from the straight line, no aberration, and a linearity as good as a 0.6% level was obtained. These values are sufficient for actual operation.

In the equation (74), the constant $k_2$ used in determining the phase of the object wave is equal to wave number derived from the wavelength $\lambda_2$ of the reconstructing wave, and this constant can be different from the wave number of the reconstructing wave.

In case the semiconductor laser 310 is used for producing a reconstructing wave, the wavelength $\lambda_2$ is 780 nm. Since the wavelength sensitivity of a hologram material having a high diffraction efficiency belongs to a wavelength range shorter than this wavelength, manufacture of a hologram should be done with a laser light source having a shorter wavelength, for example, an argon laser having a wavelength $\lambda_1$ of 488 nm may be used.

Thus, because the wavelength of the object wave is $\lambda_1$ and the wavelength of the reconstructing wave is $\lambda_2$, it is required to change the phase of the object wave.

Given that the wave number derived from the wavelength $\lambda_1$ of the constructing wave is $k_1$, and that the wavelength ratio between the constructing wave and reconstructing wave is S $(=\lambda_2/\lambda_1)$, the phase $\Phi_O(X, Y)$ of the object wave is given by the equation (79) below.

$$\Phi_0(X, Y) = k_1\left(\frac{X^2}{2(F1 \cdot S)} + \frac{Y^2}{2(F2 \cdot S)}\right) \quad (79)$$

Accordingly, the distances F1 and F2 being of the object wave are determined by multiplying, F1 and F2 chosen in accordance with the equation (74), by a wavelength ratio, when the wave number derived from the wavelength $\lambda_1$ of the hologram constructing wave is $k_1$, which constructing wave is not produced by the semiconductor laser 310.

Thus, even when the distance from the hologram rotatable hologram 302 to the image formation surface 304a is shortened for the purpose of downsizing, a linear scanning and a light scanning free from light-beam aberration can be achieved.

This invention is not limited to the above-mentioned embodiment and the following variations are also possible.

① Although the application of a light beam scanning apparatus to an electrophotograph printing apparatus was assumed, it can also be applied to a laser drawing apparatus or a laser inspection apparatus, for example.

② Although a diffraction grating in the form of a hologram was assumed, the diffraction grating can also be of another configuration.

③ Although a rotatable hologram of a disk-shape was assumed, other shapes including a drum-shape can also be applicable.

④ While, in the aforementioned example, degradation of linearity in the negative direction was assumed, F1 should be made smaller than F2 and the rate of variation of the spatial frequency in the scanning direction should be larger than the rate of variation of the spatial frequency in the cross scanning direction, when the degradation in the positive direction takes place.

As has been described, this invention has the following effects.

① Since the rate of variation of the direction cosine of the object wave in the scanning direction of the fixed hologram plate 303 is configured to be different from the rate of variation of the direction cosine of the object wave in the cross scanning direction, a linear scanning is achieved even when optical path lengths are made shorter.

② Even when the beam image formation distance varies in the scanning direction and the cross scanning direction, the variation of the amount of the beam aberration can be corrected by configuring the light incident on the rotatable hologram 302 such that the light has different focal distances in the scanning direction and the cross scanning direction, so that there is no beam aberration.

An object of this invention is also to provide a light beam scanning apparatus exhibiting no degradation in linearity even when the optical path length are configured to be short, the scanning apparatus being free from light beam aberration.

Figure 45:
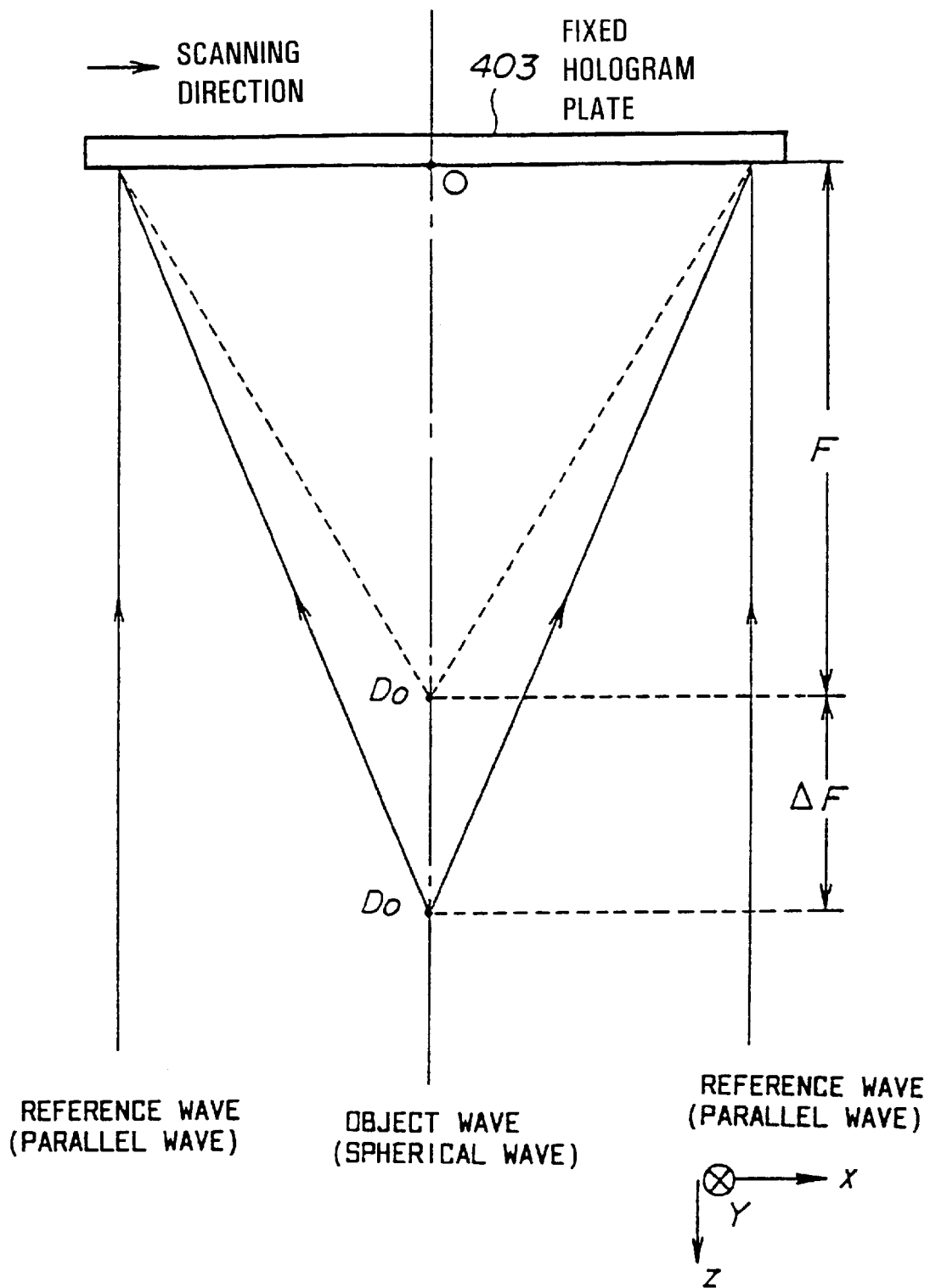
FIG. 45 is a diagram describing the first embodiment of the present invention.
Figure 46A:
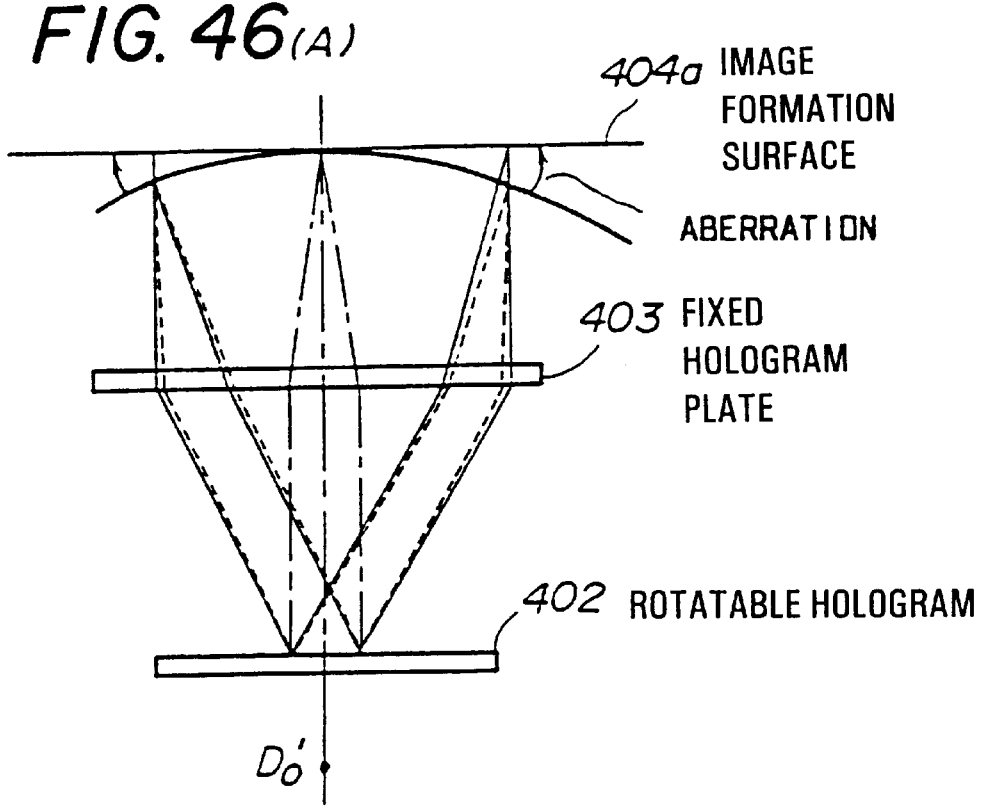
FIGS. 46(A)–46(B) are other diagrams describing the first embodiment of the present invention.
Figure 46B:
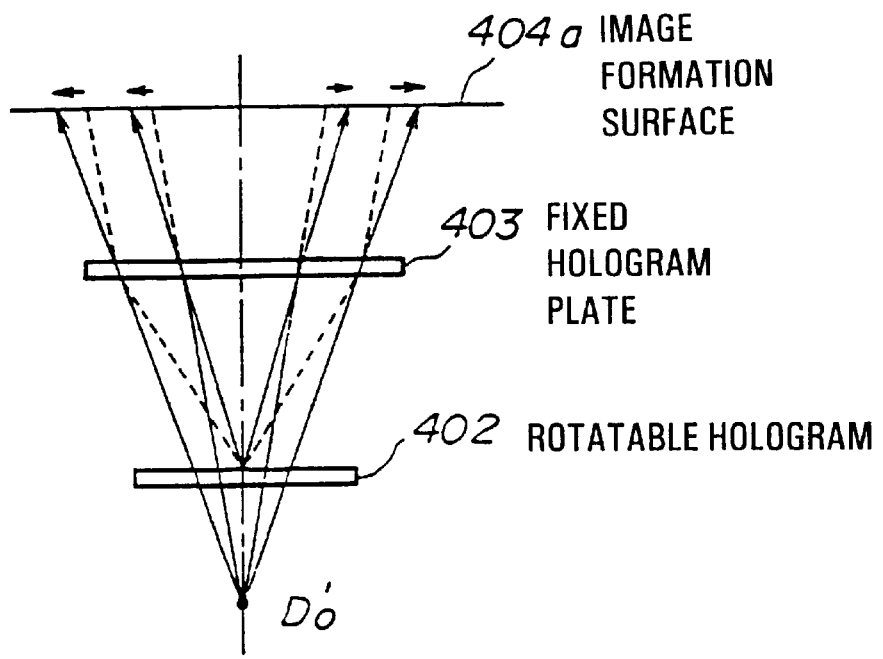

FIGS. 45 and 46(A)–(B) are diagrams illustrating an embodiment of the fifth invention. Referring to FIG. 45, a focal distance F needs to be large in order to reduce distortion, as is known in a convex lens optical system. To achieve the same with a hologram, the distance from the point light source of the object wave to the hologram face needs to be longer. That is, referring to the figure, the position of the point light source of the spherical wave constituting the object wave should be at $D_0$, instead of at $D_0$.

Providing a larger distance F of the reference spherical wave puts the image formation position in the center further away from the light source, so that a distortion, though decreased to some extent, cannot be completely eliminated.

The phase $\Phi_R(X, Y)$ of the reference wave shown in the above-mentioned equation (62) is expressed by the equation (81) below.

$$\Phi_R(X, Y) = k_2 \left( -\sqrt{X^2 + (Y - Y_0)^2 + Z_0^2} + \sqrt{X^2 + Z_0^2} \right) \quad (81)$$

That is, the phase of the reference wave is determined from the spherical wave phase represented by the first term in the equation (81) and the phase difference of the cylindrical wave represented by the second term. In the scanning direction, the reference wave is a roughly parallel perpendicular light. $k_2$ is the wave number $(2\pi/\lambda_2)$ derived from the wavelength $\lambda_2$ of the reconstructing wave, and is the same as the wave number $k_1$ derived from the wavelength $\lambda_1$ of the constructing wave, and contains the wavefront having a spherical wave optical axis $D_0O$, $D_0O$ being the same as the distance between the hologram optical axis and the face of hologram disk 2.

Accordingly, the manufacture, using a hologram, of a non-spherical lens, where the focal distance is $F(D_0O)$ in the center and the focal distance is greater toward the end of the lens, is required. The phase $\Phi_R$ of the reference wave for manufacturing the hologram is given by the equation (82) below.

$$\Phi_R(X, Y) = k_1 \left( -\sqrt{X^2 + (Y - Y_0)^2 + Z_0^2} + \sqrt{X^2 + Z_0^2} \right) \quad (82)$$

The difference between the equations (81) and (82) is that the wave number $k_1$, derived from the wavelength $\lambda_1$ of the constructing wave, is used instead of the wave number $k_2$ derived from the wavelength $\lambda_2$ of the reconstructing wave.

If this wavelength $\lambda_1$ is greater than $\lambda_2$, the wave number $k_1$ is smaller than $k_2$ and the phase of the reference wave becomes smaller.

Consequently, a wavefront different from the wavefront manifested when the diffracted wave from the rotatable hologram 402 is incident on the fixed hologram plate 403, is recorded on the fixed hologram plate 403.

In this way, a non-spherical lens, where the focal distance is $F(D_0O)$ at the center and the focal distance is greater toward the end of the lens, can be realized with a hologram on the condition that the reconstructing-wave wavelength $\lambda_2$ is employed during reconstruction.

The above arrangement also enables the obtaining of a scanning beam free of distortion, in which beam the convergence position in the scanning center remains unchanged and the convergence position at the scanning end is shifted toward the image formation surface 404a. The arrangement also enables a linear scanning, because the beam at the scanning end is shifted toward the outside as shown in FIG. 46(B).

While the coefficient $k_1$ is used in the term relative to the cylindrical wave in the phase equation (82), it is possible, in order to obtain the same function as above, to retain the coefficient $k_2$ in the term relative to the cylindrical wave and employ the phase equation (83) below, because only a spherical wave is responsive to the above-mentioned aberration correction and linear scanning operation. The same effect is achieved by ensuring that the wavefront of the reference wave is different from the wavefront of the wave incident from the rotatable hologram 402 on the fixed hologram plate 403. The phase of the reference wave in this case can be obtained by changing the point light source position $D_0$ of the reference wave, or specifically, by substituting $Z_0$ for $Z_0$ in the equation (82). Thus the following equation holds.

$$\Phi_R(X, Y) = -k_1 \sqrt{X^2 + (Y - Y_0)^2 + Z_0^2} + k_2 \sqrt{X^2 + Z_0^2} \quad (83)$$

For example, when the fixed hologram plate 403 manufactured in accordance with the phase equation (81) is employed while providing an optical path length of 500 mm, a beam aberration radius is as large as 80 microns, a linearity is below the 0.5% level, and the deviation from the straight-line is controlled to be less than 50 microns.

When employing the fixed hologram plate 403 manufactured according to the phase equation (82), the beam aberration radius is reduced to 20 microns, the linearity is improved to a level below 0.4%, and the deviation from a straight line is maintained so as to be below a 50 micron level.

The wavelength ratio $(\lambda_1/\lambda_2)$ in this case is set to be at 1.02.

Thus, once a necessary phase is obtained, a hologram can be manufactured by drawing a pattern with an electron beam or a laser, assisted in some cases by an auxiliary optical system. Extracting this hologram pattern enables the reconstruction of the fixed hologram plate 403.

This way, even when the optical path length is short, a distortion can be eliminated and the linearity can be improved by changing the phase of the reference wave for manufacturing interference fringes of the fixed hologram plate to obtain a non-spherical lens hologram.

This invention is not limited to the above embodiments but the following variations are also possible.

①Although an electrophotograph printing apparatus was assumed as an apparatus in which to apply the light beam scanning apparatus, the light beam scanning apparatus can also be applied to other apparatuses, such as a laser drawing apparatus or a laser inspection apparatus.

② Although a disk-shape rotatable hologram was assumed, other shapes including a drum-shape can also be applicable.

③ The point-light source position of the reference wave, spherical wave, and cylindrical wave can also be shifted in the Y-axis direction (cross scanning direction).

As has been described, this invention allows the fixed hologram plate to have an interference fringe distribution produced by the wave, where the wave number of the spherical wave has a phase different from the wave number derived from the wavelength of the reconstructing wave, thereby allowing the construction of a non-spherical lens and a scanning beam free of aberration or distortion, while enabling the reduction of the optical path length. Also, because it is a non-spherical lens, a linear scanning is realized even when the optical path length is configured to be short.

The above-mentioned first through fifth inventions are equipped with a rotatable hologram and a fixed hologram plate. While methods of manufacturing interference fringes configuring a hologram have been described in detail in the above-mentioned inventions, optimum conditions for the shapes of a rotatable hologram and a fixed hologram plate have not been considered at all.

Generally, the length of a fixed hologram plate in the scanning direction is set to be smaller than the scanning distance of a light beam. This is because it is known that the smaller a fixed hologram plate, the easier its manufacture.

Experiments were carried out to determine various characteristics. Attention was paid to the length of a fixed hologram plate and a scanning distance of a light beam. Two cases were considered, namely, ① a case where the scanning distance of a light beam is longer than the length of a fixed hologram plate, and ② a case where the scanning distance of a light beam is shorter than the length of a fixed hologram plate. The results of the above mentioned experiments are shown in FIGS. 47 and 48. FIG. 47 shows results in a case ① where the scanning distance of a light beam is longer than the length of a fixed hologram plate, while FIG. 48 shows results in a case ② where the scanning distance of a light beam is shorter than the length of a fixed hologram plate.

In the experiments, the basic configuration shown in FIG. 1 was employed as the configuration of a light beam scanning apparatus. The distance separating the rotatable hologram 10 and the fixed hologram plate 20 is set to be 275 mm. The distance separating the fixed hologram plate 20 and the photoconductive drum 3 is 391 mm. The scanning width therein is 291 mm. In the case ① experiment, the length of the fixed hologram plate 20 in the scanning direction is set to be 244 mm (shorter than the scanning width 291 mm), while in the case ② experiment, the length of the fixed hologram plate 20 in the scanning direction is set to be 344 mm (longer than the scanning width 291 mm). Both were optimally designed using a computer.

The results in FIG. 47 show that the linearity and the beam aberration are greater when the scanning distance of a light beam is longer than the length of the fixed hologram plate 20, and that a successful light beam scanning cannot be performed in this case.

On the other hand, the results in FIG. 48 show that the linearity, the beam aberration, and the displacement of position in the scanning direction due to a wavelength variation are small enough for application in a laser printer, for example, when the scanning distance of a light beam is smaller than the length of the fixed hologram plate 20 (in other words, when the fixed hologram plate 20 is shorter than the scanning distance of a light beam).

Figure 49:
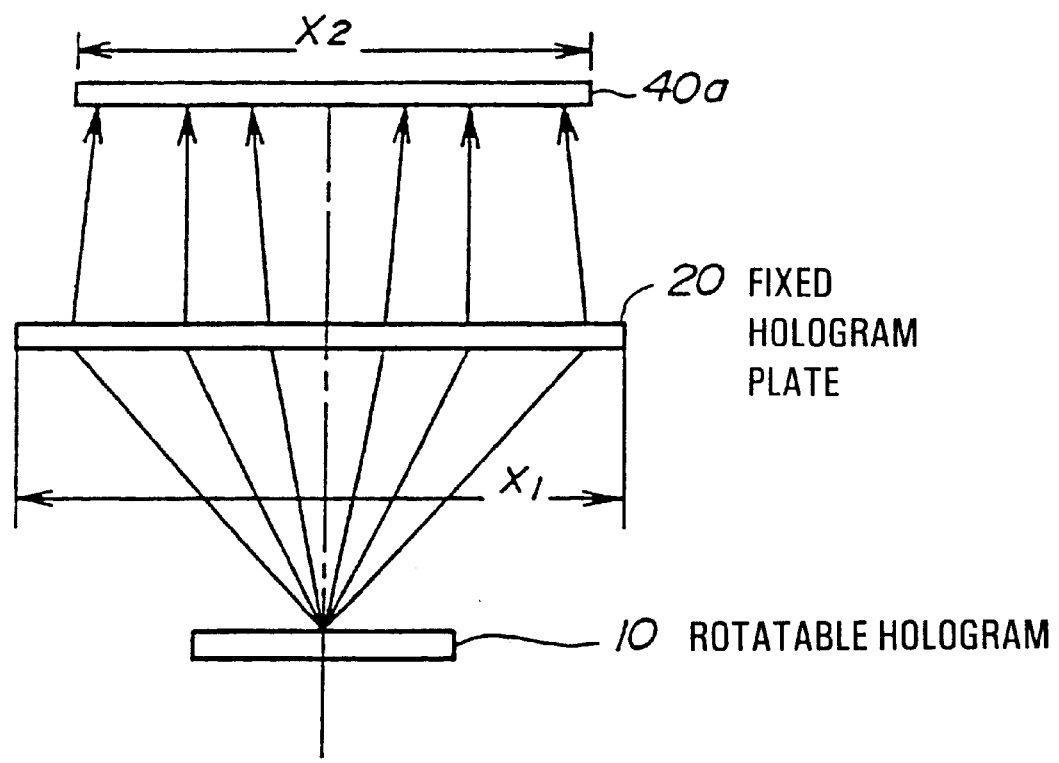
FIG. 49 is a diagram depicting a configuration of an embodiment of a sixth embodiment.

Accordingly, as shown in FIG. 49, a light beam scanning in which an excellent linearity is obtained, and affected by little beam aberration and displacement of beam position, is achieved by setting the length $X_1$ of the fixed hologram plate 20 measured in the scanning direction, to be shorter than the scanning distance $X_2$ of a light beam.

The light beam scanning apparatuses in the above-described first, and third through sixth embodiments are configured such that a rotatable hologram equipped with a plurality of hologram lenses on the circumference of a circle is rotated with linearity, a laser light is incident on the rotatable hologram via a collimating lens, and the laser light diffracted thereby is put through the fixed hologram plate so that an image is formed on an image formation surface.

However, in this light beam scanning apparatus consisting of a rotatable hologram and a hologram optical system, a motor is required to rotate a rotatable hologram. This motor has a disadvantage in that it is expensive and there is an upper limit to its revolution speed (10,000 rpm with a normal bearing; 40,000 to 50,000 rpm with an air bearing). While a hologram optical system has an advantage in that it is cost effective, being less expensive than an Fθ lens optical system, it has a disadvantage when it comes to downsizing and increasing the velocity thereof.

A light scanning apparatus employing a galvanomirror is characterized in that, because it uses a sine wave oscillation, the scanning frequency (20 kHz, for example) is markedly higher than the motor rotation frequency (10,000 rpm=167 Hz, for example). However, since the mirror oscillation is of a sine mode, a difference results in the scanning velocity at the center and the periphery of the scanning surface, thus making it difficult to achieve a linear scanning (a scanning where light scanning velocities are the same at the center and at the ends). A method has already been developed where a saw-tooth waveform is used as a driving wave of a galvanomirror and a linear range of an oscillation mode is enlarged so that a linear scanning is secured. However, this method entails disadvantages in that an oscillation frequency becomes low, and the scanning velocity becomes low (several hundred Hz) as compared with the mirror rotation. Moreover the need for adding a galvanowaveform driving circuit raises the cost.

An object of this invention is to provide a small and inexpensive light beam scanning apparatus capable of performing a high-speed linear scanning.

Figure 50A:
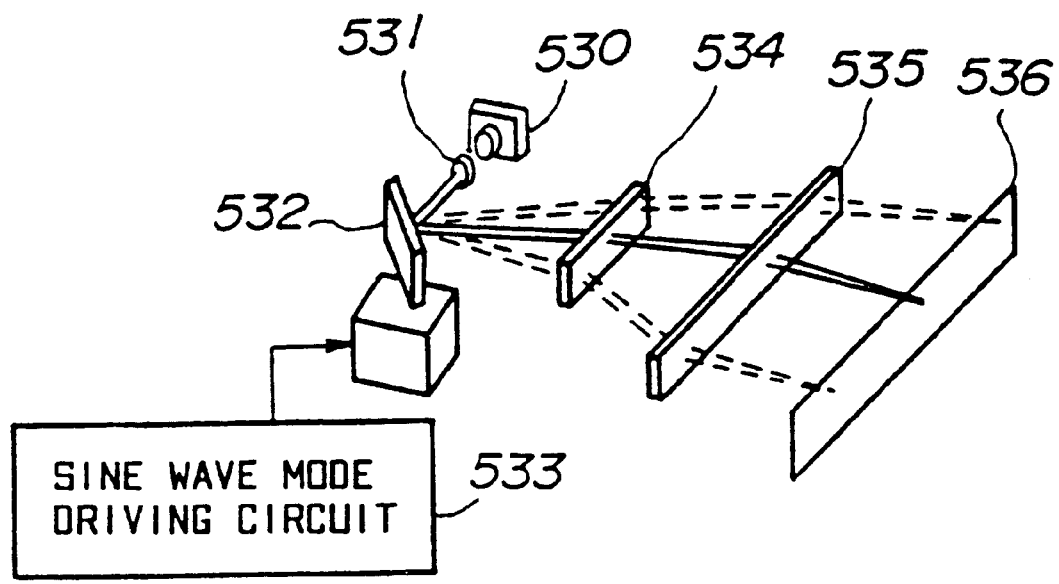
FIGS. 50(A)–50(B) show a configuration and a top view of the first embodiment of the present invention.
Figure 50B:
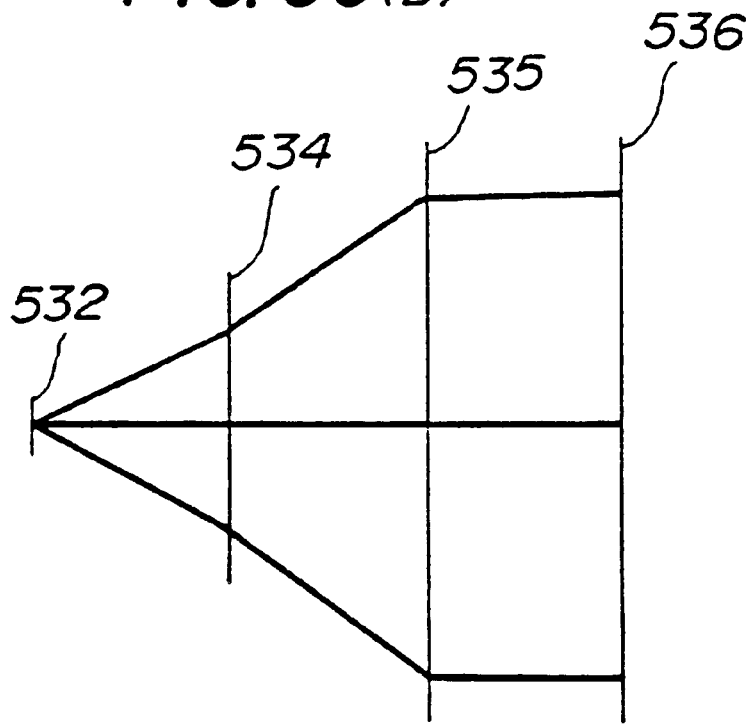

FIGS. 50(A) and 50(B) are, respectively, a configuration diagram and a top view of the first embodiment of this invention.

Referring to FIG. 50(A), a laser light outgoing from the laser diode 530 is turned into parallel light by a collimating lens 53 and is incident on a galvanomirror 532.

Figure 51A:
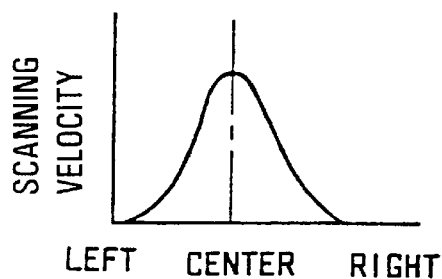
FIGS. 51(A)–51(E) show graphs for describing an apparatus of FIG. 50.

A galvanomirror 532 is driven by a sine driving waveform generated in a sine-wave mode driving circuit 533, and produces a sine wave mode oscillation as shown in FIG. 51(A). This oscillation is done at a frequency of 20 kHz, for example. This configuration is not enough to achieve a linear scanning.

As shown in FIG. 50(B), the laser light reflected by the above-mentioned galvanomirror 532 forms an image on an image formation surface 536 via a first hologram 534 and a second hologram 535 disposed on parallel planes.

Figure 51B:
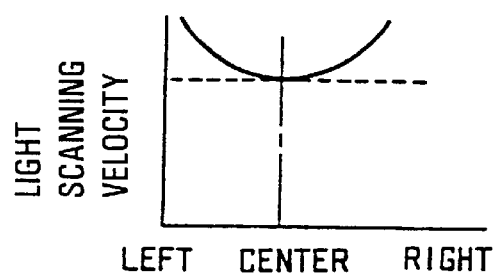
Figure 51C:
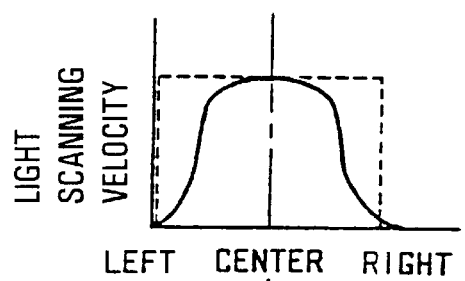
Figure 52A:
FIGS. 52(A)–52(B) are diagrams describing holograms of the apparatus of FIG. 50.
Figure 52B:

As shown in FIG. 52(A), the first hologram 534 is of a fringe pattern such that a fringe density at the center is about 1700 fringes/mm and a fringe density at the ends is about 1800 fringes/mm, and such that a reverse sine conversion is thereby performed, where a diffraction angle is gradually greater at both ends than at the center. The first hologram has a light scanning velocity conversion characteristic shown in FIG. 51(B). As shown in FIG. 51(C), this light scanning exhibits, by being allowed to go through the first hologram 534, a velocity characteristic where the velocity remains at the same level at the center of the image formation surface and drops at the ends.

Figure 51D:
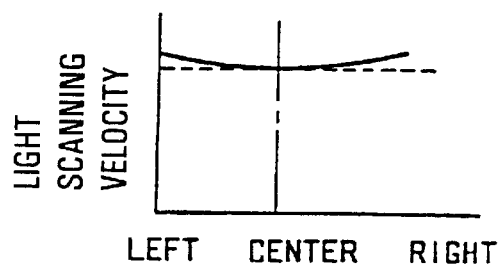
Figure 51E:
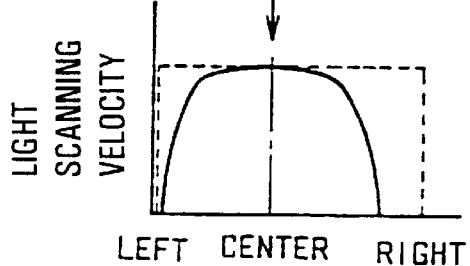

The second hologram 535 is of a fringe pattern such that a fringe density at the center is about 400 fringes/mm and a fringe density at the ends is about 700 fringes/mm, and such that a tangent conversion is thereby conducted, where a diffraction angle remains uniform from the center to the left and right middle portions and increases steeply at the left and right ends. The second hologram has a light scanning velocity conversion characteristic shown in FIG. 51(D). The light outwardly diffracted by the first hologram 534 is inwardly diffracted, by being allowed to go through the second hologram 535, and, as shown in FIG. 51(E), the light scanning velocity having a characteristic shown in FIG. 51(C) is corrected such that the velocity is constant in a range extending from the center and covering more than half the image formation surface. A linear scanning is possible with a sine wave mode driving by using the first hologram 534 and the second hologram 535.

Figure 53:
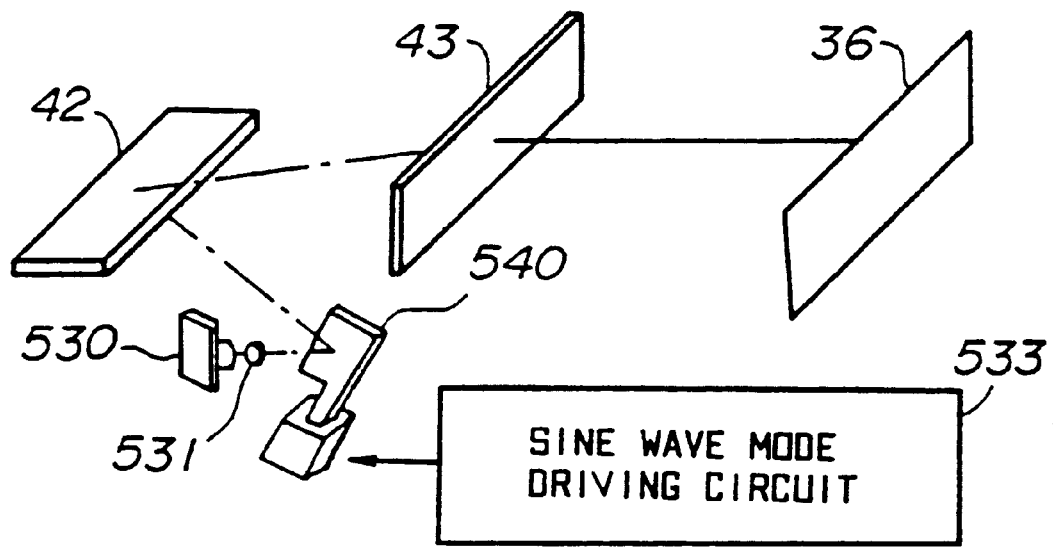
FIG. 53 is a diagram depicting a configuration of the second embodiment of the present invention.

FIG. 53 illustrates a configuration of the second embodiment of this invention. In the figure, parts that are the same as those in FIG. 50 are given the same reference notations as in the previous figure.

Referring to FIG. 53, a laser light passing through a collimating lens 53 is incident on a torsion bar mirror 540. The torsion bar mirror 540 is driven by a sine-mode driving circuit 533, and produces a sine wave mode oscillation. The laser light reflected by the torsion bar mirror 540 forms an image on an image formation face 536 via a first hologram 542 and a second hologram 543 disposed as shown in a side view in FIG. 54(A) and a top view in FIG. 54(B).

As shown in FIG. 55(A), the first hologram 534 allows a larger diffraction angle toward the left and right ends than at the center, so that a reverse sine conversion can be performed. The fringe pattern thereof is of an arc shape with its center residing on a line extending above the center portion of the hologram, and maintains the same perpendicular upward diffraction angle over the entire longitudinal direction range.

As shown in FIG. 55(B), the second hologram 543 is of a fringe pattern such that a diffraction angle remains the same from the center portion to the left and right middle portions, and a diffraction angle is increased steeply at the left and right ends, so that a tangent conversion can be performed. Also, the fringe pattern thereof is of an arc shape with its center residing on a line extending below the center portion of the hologram, and maintains the same perpendicular downward diffraction angle over the entire longitudinal direction range.

Thus, an oscillation frequency, that is a scanning frequency, becomes 10 to 100 times higher by using a sine-wave mode signal mirror. In case of a motor rotation, a rotation frequency has an upper limit of 1 kHz (50,000 rpm) even when an expensive air bearing is used. When a polygon mirror is used as a scanning means, such a rapid revolution may cause a brittle fracture, thus prohibiting the use of a glass-base mirror. It is known, however, that sine wave mode oscillation mirrors having a rotation frequency of 20 kHz are generally available, and can actually be used in a high-frequency driving. A polygon mirror is not only expensive itself but has a disadvantage in that an expensive high-precision motor is required (a rotation jitter of below 0.1% is required), making the composite large and heavy. By comparison, a galvanomirror and a torsion bar mirror are known to be small and inexpensive (with an exception that a saw-tooth wave oscillation mirror is expensive). As for resolution, 400 dpi (400 dots/inch) can be easily achieved by using a hologram or an optical system.

In the embodiment shown in FIG. 50, a fringe interval is greater in the center portion of the hologram 534 and in the end portions of the hologram 535, thus increasing the ratio of non-diffracted light, and possibly creating a light-amount variation in each portion of the image formation surface 536. In the embodiment shown in FIG. 53, the ratio of non-diffracted light is very small in each portion of the holograms 542 and 543, thus not creating a light-amount variation in each portion of the image formation surface 536.

Further, since the above embodiment employs a hologram optical system where the first holograms 534 and 542 and the second holograms 535 and 543 are combined, even when a minute change occurs in the diffraction direction of the laser light from each hologram, the change being due to a laser light wavelength-variation caused by a fluctuation in temperature of the laser diode 530, the changes in the diffraction directions of the first and second holograms are absorbed by each other, so that the variation of the beam image-formation position can be prevented.

As described above, a light scanning apparatus of this invention is extremely useful in that it allows a high-speed linear scan, and allows configuration of a small-scale inexpensive apparatus.

This invention relates to an optical divider employing two hologram plates.

Recent speed-up of a VLSI circuit (Very Large Scale Integrated Circuit) is bringing about an increase in speed of a clock supplied in a VLSI circuit. As the degree of integration grows, it is desired that a clock signal be shared in VLSI circuits.

A method of supplying a clock by means of leads generates a delay in a clock signal due to lead capacitance, thereby obstructing the synchronization among each VLSI circuit.

To solve this problem, a method has been proposed for supplying a clock to a VLSI by means of a light signal. In a configuration in which synchronization is achieved with a light signal, synchronization is easily achieved because of the lack of delay such as that found in a configuration using leads. A semiconductor laser, which has an advantage of compactness, is generally used as a light source for this light signal, a laser light from the semiconductor laser being divided by an optical divider and being incident on a photodetector provided in each VLSI.

It may be expected that, when a wavelength variation occurs in this semiconductor laser, the position of light converging on the photodetector provided in each VLSI circuit is displaced, and that a blooming is caused, thus preventing accurate synchronization.

An object of the eighth embodiment is to provide an optical element in which a displacement of a converging light position, and an occurrence of blooming are prevented.

Figure 57:
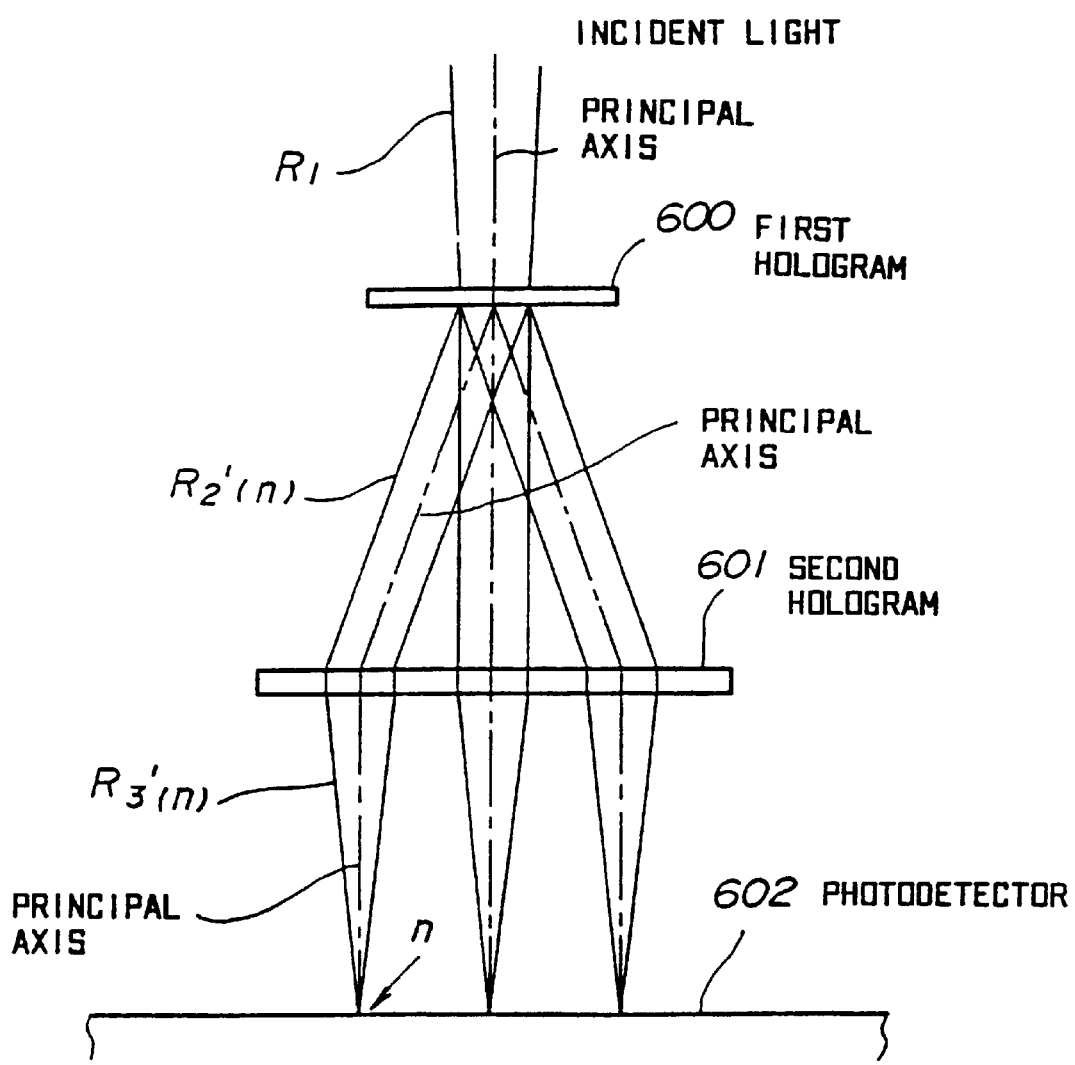
FIG. 57 is a diagram describing the principle of the optic element, which is an embodiment of the present invention.

FIGS. 56 and 57 are diagrams illustrating a configuration of optical elements constituting an embodiment of this invention.

In the figures, 600 represents a first hologram, and 601 a second hologram. The first hologram 600 and the second hologram 601 are disposed opposite to each other and are separated by a certain distance. Below the second hologram 601 are disposed photodetectors 602 in a matrix (6×6 matrix in this embodiment), the photodetectors being provided in VLSI circuits.

A laser light emitted from a semiconductor laser not shown in the figure is incident on the first hologram 600 and is divided thereby into lights of equal intensity. A Damann grating, for example, is available as the first hologram 600. Ideally, the incident light is a converging light but it can also be a parallel light.

The diffracted light, after being divided into lights of equal intensity by the first hologram 600, is incident on the second hologram 601. The second hologram 601 is constructed in a matrix (6×6 matrix) corresponding to the photodetectors 602, also disposed in a matrix, and the above-mentioned diffracted light is uniformly made to converge on each of the photodetectors 602 by the second hologram 601. In case a parallel light is outgoing from the first hologram 600, it is best for the second hologram 601 to be of a phase derived from expanded paraxial phase shift. Supposing that this phase is $\Phi(X, Y)$, adjusting $\Phi(X, Y)$ to be the value obtained by the following equation to $\Phi(X, Y)$ ensures that the laser light converges on each photodetector element:

$$\Phi(X, Y) = k_2 \times (X^2 + Y^2)/2F,$$

where

X, Y: coordinates of each photodetector $k_2$: constant

F: distance from the first hologram to the photodetector.

As shown in FIG. 57, assuming that the sum of three optical paths: the optical path $R_1$ of the light incident on a photodetector element belonging to a matrix of photodetectors 602 and located at a point n; the optical path $R_2(n)$ of the outgoing wave corresponding to the point n; and the optical path $R_3(n)$ of the diffracted light corresponding to the point n; is $E_0$, and that the optical path of the principal axis point of the light flux incident on the point n is $E_1$; and that the difference thereof $(E_0 - E_1)$ is $\delta W_m(n)$, E is defined from the equation below.

$$E = \sum_n \sum_m (\delta W_m(n))^2$$

By carrying out an optimization so that E becomes minimized, the variation of a convergence point due to a wavelength variation of the semiconductor laser is minimized. This minimization ensures that lights of uniform intensity can be distributed among the photodetector elements constituting the photodetectors 602, and that an occurrence of displacement of a convergence point and of a blooming is prevented.

Figure 58:
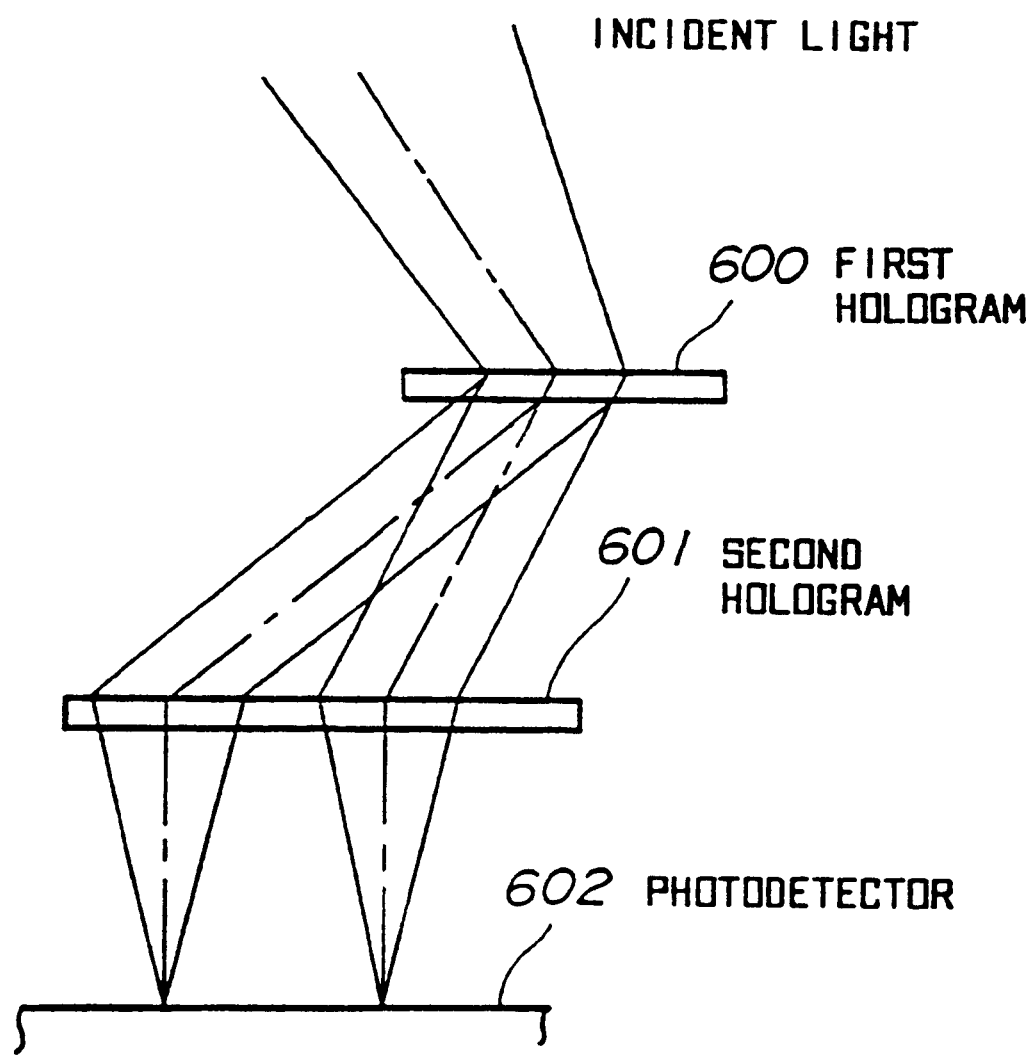
FIG. 58 is a diagram depicting a variation of the optical element shown in FIG. 56.
Figure 59:
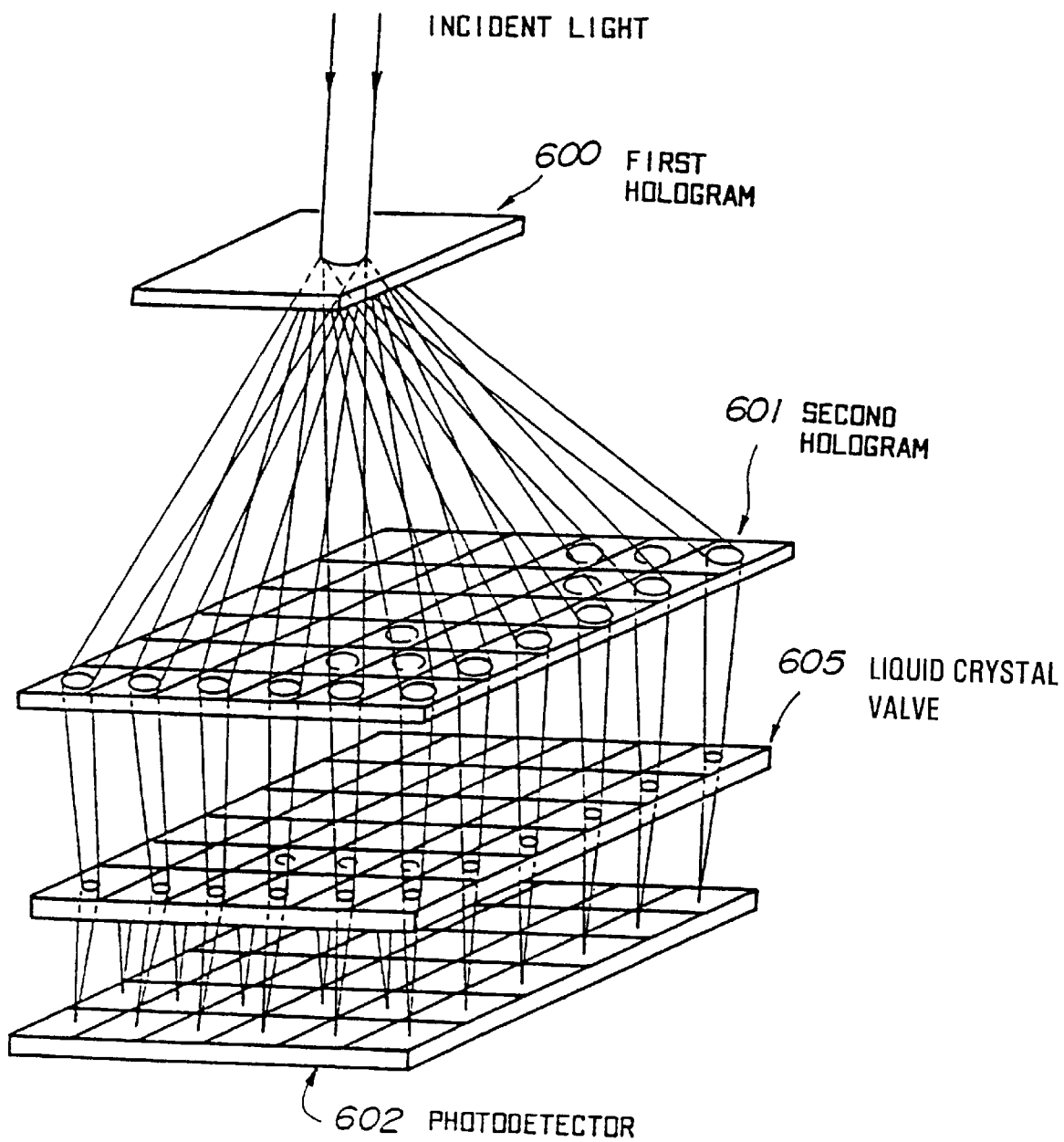
FIG. 59 is a diagram depicting another variation of the optic element shown in FIG. 56.

FIG. 58 illustrates an example where two holograms are provided not in an in-line configuration but with the axes thereof being displaced with respect to each other, in order to increase the efficiency of light usage. FIG. 59 illustrates an example where a liquid crystal valve 605 is provided between the second hologram 601 and the photodetectors 602, so that a laser light can selectively irradiate a plurality of photodetector elements constituting the photodetectors 602.

An object of the ninth embodiment is to provide a light beam scanning apparatus exhibiting no degradation in linearity and no beam aberration even when the optical path lengths are configured to be short. Another object of this invention is to provide a method of manufacturing a fixed hologram plate of a light beam scanning apparatus exhibiting no degradation in linearity and no beam aberration even when the optical path lengths are short.

Figure 60A:
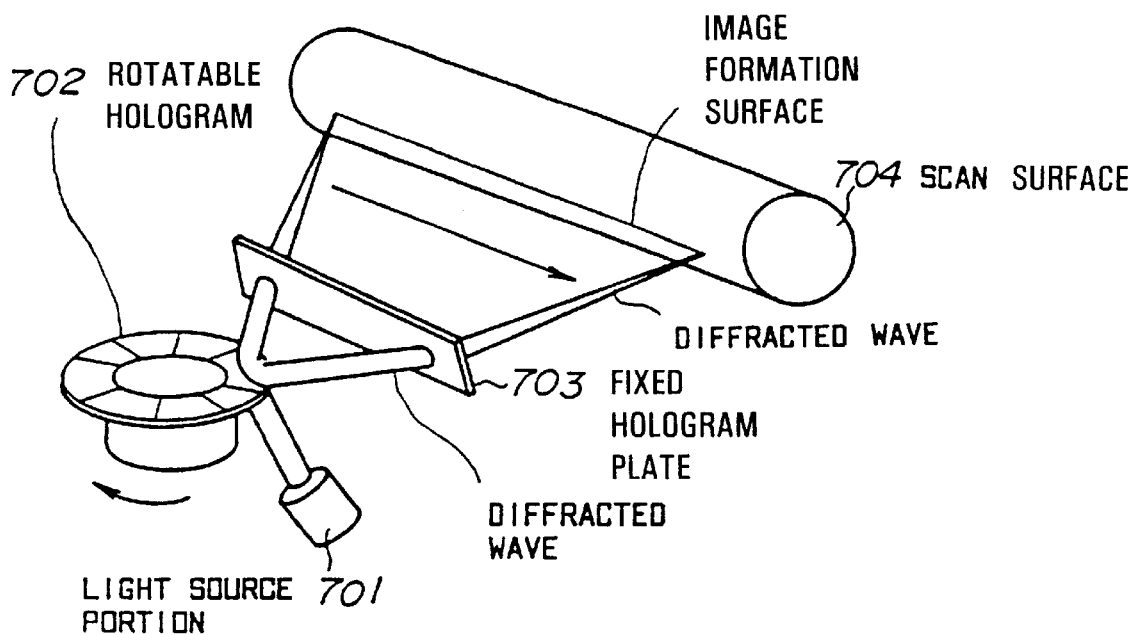
FIGS. 60(A)–60(B) are diagrams describing the principle of a ninth embodiment.
Figure 60B:
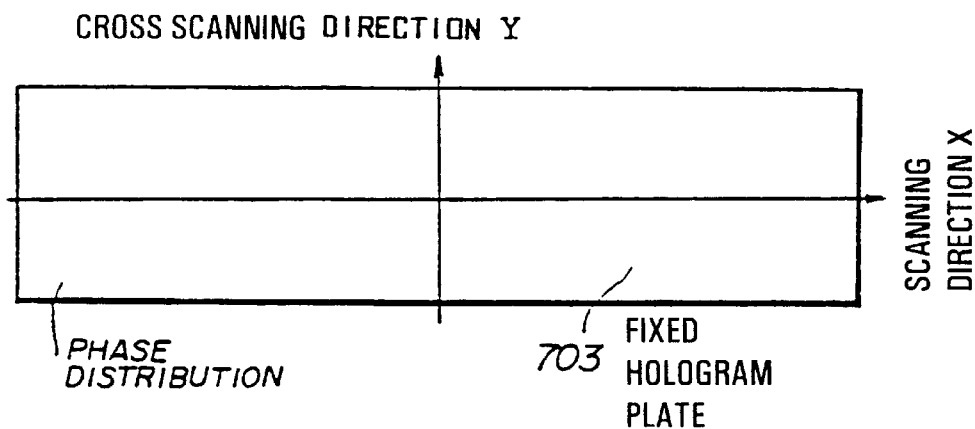

FIGS. 60(A)–60(B) are diagrams illustrating the principle of this invention. This invention provides a light beam scanning apparatus wherein an incident light from a light source portion 701 is diffracted by a rotatable hologram 702, a scanning being conducted by the rotation of this rotatable hologram 702 using the diffracted light, the scanning light being diffracted by a fixed hologram plate 703 so as to carry out a scanning on a scanning surface 704.

The apparatus is characterized in that the fixed hologram plate 703 has a phase distribution $\Phi_H$ determined from the equation (91) below, given that the scanning direction is X and the cross scanning direction is Y; and in that the light incident on the above-mentioned rotatable hologram 702 is configured to have different focal distances in the scanning direction and the cross scanning direction.

$$\Phi_H = \qquad (91)$$
$$k_2\left(C_1 \cdot X^2 + C_2 \cdot Y^2 + a \cdot \sqrt{X^2 + Z_0^2} - b\sqrt{X^2 + (Y - Y_0)^2 + Z_0^2}\right)$$

Also, this invention provides a light beam scanning apparatus, wherein an incident light from the light source portion 701 is diffracted by the rotatable hologram 702, a scanning being conducted by the rotation of the rotatable hologram 702 using the diffracted light, and the scanning light is diffracted by the fixed hologram plate 703 so as to carry out a scanning on the scanning surface 704.

This apparatus is characterized in that the above-mentioned fixed hologram plate 703 has a phase distribution $\Phi_H$ determined from the equation (92) below, given that the scanning direction is X and the second scanning direction is Y, and in that the light incident on the rotatable hologram 702 is configured to have different focal distances in the scanning direction and the cross scanning direction.

$$\Phi_H = k_2\left(C_1 \cdot X^2 + C_2 \cdot Y^2 + C_0 \cdot Y + \qquad (92)\right.$$
$$\left. a \cdot \sqrt{X^2 + Z_0^2} - b\sqrt{X^2 + (Y - Y_0)^2 + Z_0^2}\right)$$

Also, this invention provides a method of manufacturing the fixed hologram plate 703 of a light beam scanning apparatus, wherein an incident light from the light source portion 701 is diffracted by the rotatable hologram 702, a scanning being conducted by the rotation of the rotatable hologram 702 using the diffracted light, and wherein the scanning light is diffracted by the fixed hologram plate 703 so as to carry out a scanning on the scanning surface 704.

This method is characterized in that an interference fringe distribution of the fixed hologram plate 703 is created on the basis of a wave having a spherical aberration, the aberration amount being measured in the Y direction, astigmatism, and coma; and a wave having an aberration amount measured in the X direction, and has a spherical aberration and astigmatism of a wavelength different from that of a reconstructing wave.

Further, this invention provides a method of manufacturing the fixed hologram plate 703 of a light beam scanning apparatus, wherein an incident light from the light source portion 701 is diffracted by the rotatable hologram 702, a scanning being conducted by the rotation of the rotatable hologram 702 using the diffracted light, and wherein the scanning light is diffracted by the fixed hologram plate 703 so as to carry out a scanning on the scanning surface 704.

This method is characterized in that an interference fringe distribution of the fixed hologram plate 703 is created on the basis of two waves, one wave having a spherical aberration, the wave coming from a point light-source and a coma, and being an origin of the Y direction component of an elliptic phase wave, and the other wave being an origin of a line light-source wavefront and the X direction component of the elliptic phase wave.

While, in the aforementioned embodiments, the rates of variation of the spatial frequencies in the scanning direction and the cross scanning direction are configured to be the same so that the beam radiuses in the scanning direction and the cross scanning direction measured on the image formation surface are controlled to be the same by the fixed hologram plate, a scanning linearity can be maintained in the scanning direction even under the condition of small optical path lengths, by making the rate of variation of the spatial frequency in the scanning direction meet the same conditions as above, and by controlling the phase of the object wave so that it becomes an elliptical wave.

Since the amount of beam aberration in the scanning direction and the cross scanning direction becomes different by providing the above configurations, the variation of the amount of beam aberration is corrected by configuring the light incident on the rotatable hologram 702 so that the focal distances in the scanning direction and the cross scanning direction are different.

Another thing to be noted is that, in order to decrease the distortion, the focal distance F needs to be made larger, as is known in a convex lens optical system. Similar results can be achieved, however, by a hologram, by enlarging the distance between the hologram face and the point light source of the reference wave.

Enlarging the focal distance F of the reference spherical wave causes the image formation position in the center to be further away, thus decreasing the distortion but not cancelling it completely.

Complete cancellation of the distortion can be achieved by a non-spherical lens where F is larger nearer the lens rim, or by a hologram where the constructing wave and the reconstructing wave are controlled as appropriate to achieve the same effect.

This invention realizes an elliptical phase by providing, in the phase equation of the object wave, different coefficients of X and Y for $C_1$ and $C_2$ respectively, thus reducing the rate of variation of the spatial frequency in the scanning direction, preventing an over-correction at the scanning center, and realizing a linear scanning. This invention also corrects the variation in the amount of beam aberration by a configuration such that the light incident on the rotatable hologram 702 has different focal distances in the scanning direction and the cross scanning direction. This invention succeeds in completely cancelling the distortion by ensuring that the wave number of a spherical wave and a wave number derived from the wavelength of a reconstructing wave are of different phases by virtue of coefficients a and b in the phase equation of the reference wave, so that F becomes larger toward the scanning end than towards the scanning center.

This invention also prevents reduction of light power on the image formation surface 704 and improves the diffraction efficiency by introducing the term $C_0 \cdot Y$ so that the fixed hologram plate 3 is provided with an off axis characteristic where the diffracted light is diffracted in the cross scanning direction.

Because the interference fringe distribution of the fixed hologram plate 703 is manufactured by using waves, one of which has a spherical aberration, the amount of aberration being measured along the Y direction, astigmatism, and a coma; and the other of which waves has a spherical aberration, the amount of aberration being measured along the X direction, this other wave having a wavelength different from the wavelength of the reconstructing wave, and having astigmatism, a fixed hologram plate 703 capable of linear scanning and correction of distortion can easily be manufactured by exposure.

Furthermore, because the interference fringe distribution of the fixed hologram plate 703 is manufactured by using waves, one of which waves has a spherical aberration coming from a point-light source, the wave being an origin of the Y direction component of an elliptical phase wave and having coma, and the other of which waves is an origin of a line-light source wavefront and the X direction component of an elliptical phase wave, a fixed hologram plate 703 capable of linear scanning and correction of distortion can be manufactured with a simple exposure optical system.

Figure 61:
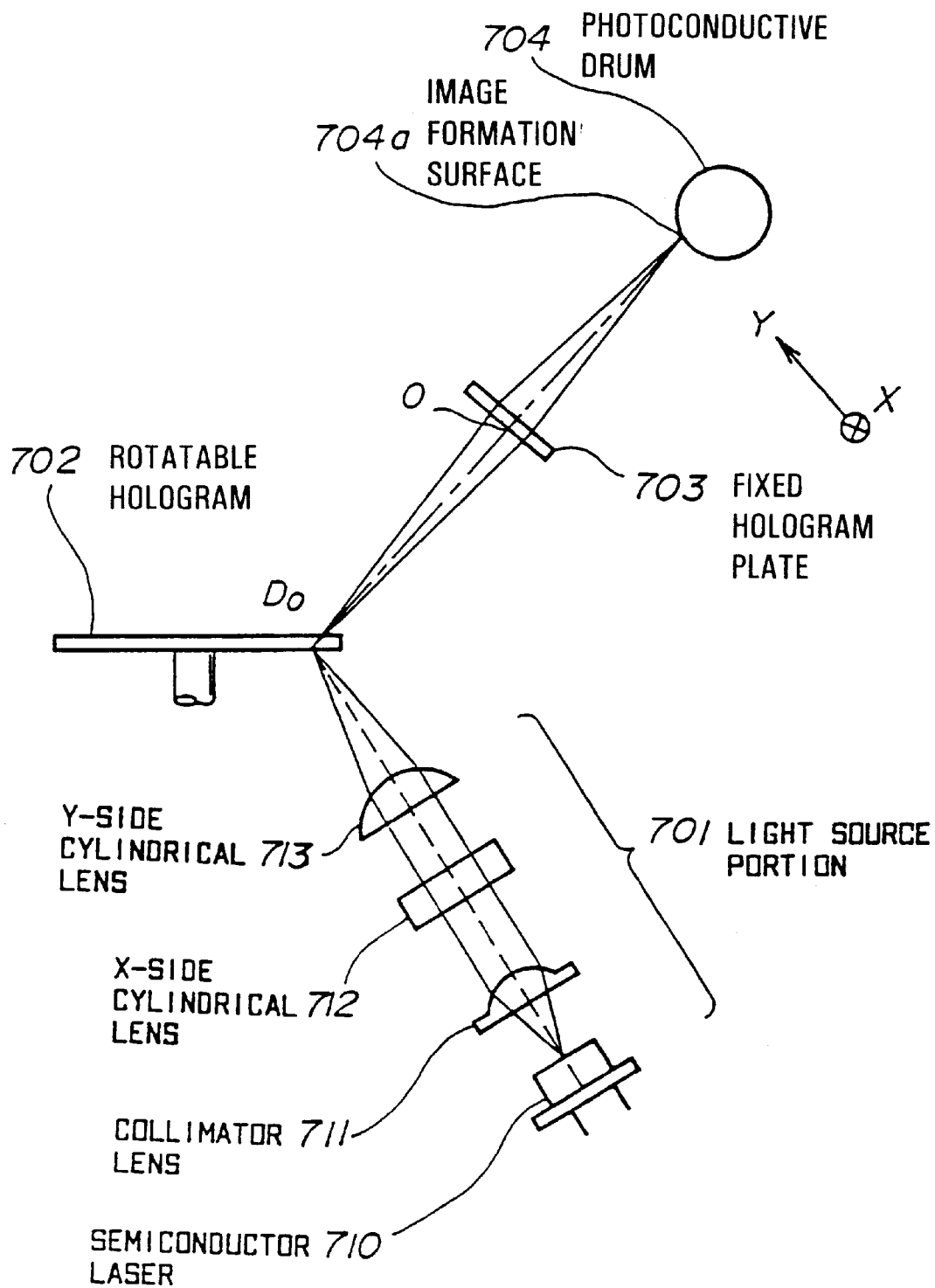
FIG. 61 is a diagram depicting a configuration of an embodiment of the present invention (cross scanning direction)
Figure 62:
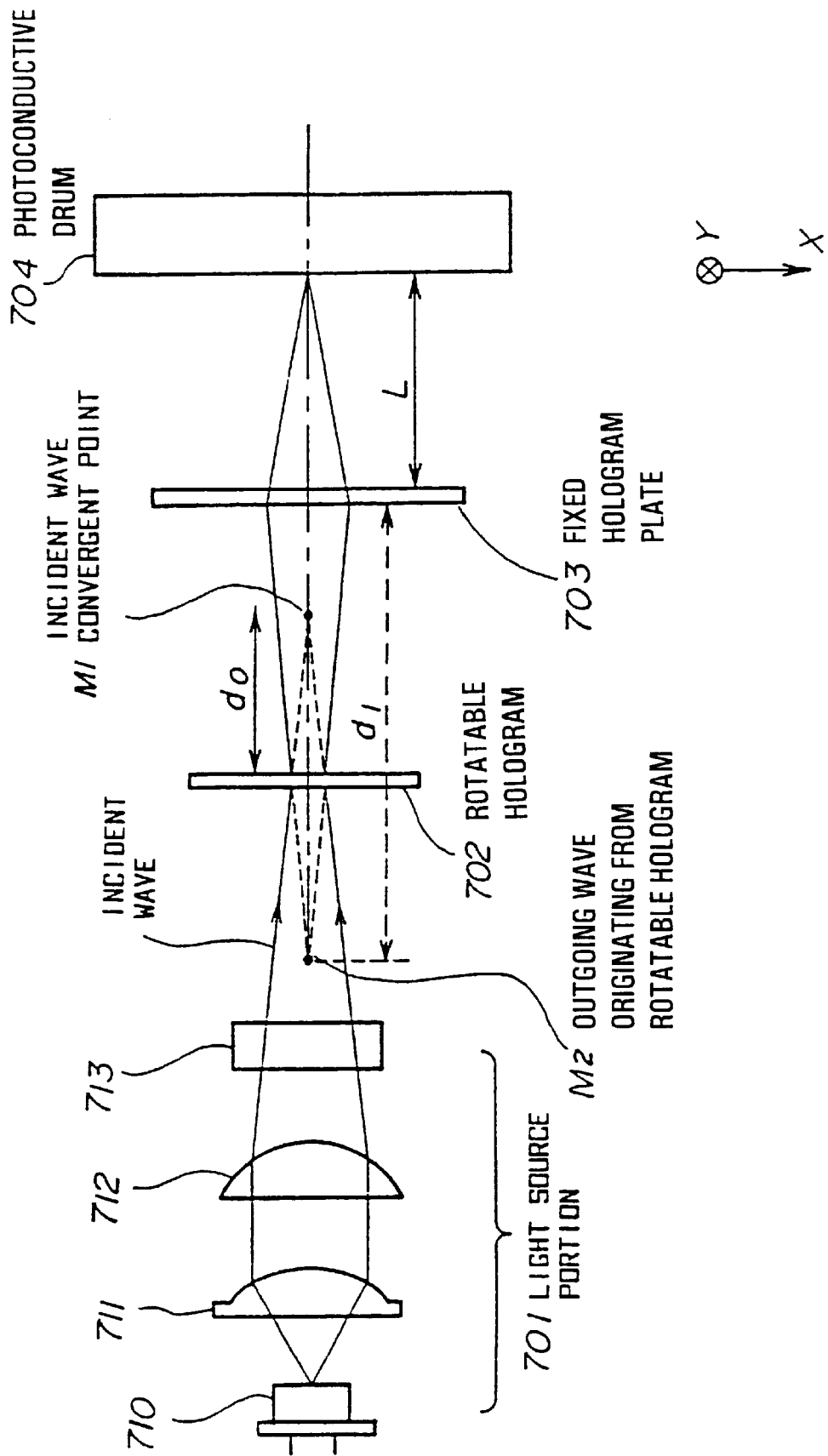
FIG. 62 is a diagram depicting a configuration of an embodiment of the present invention (scanning direction)
Figure 64:
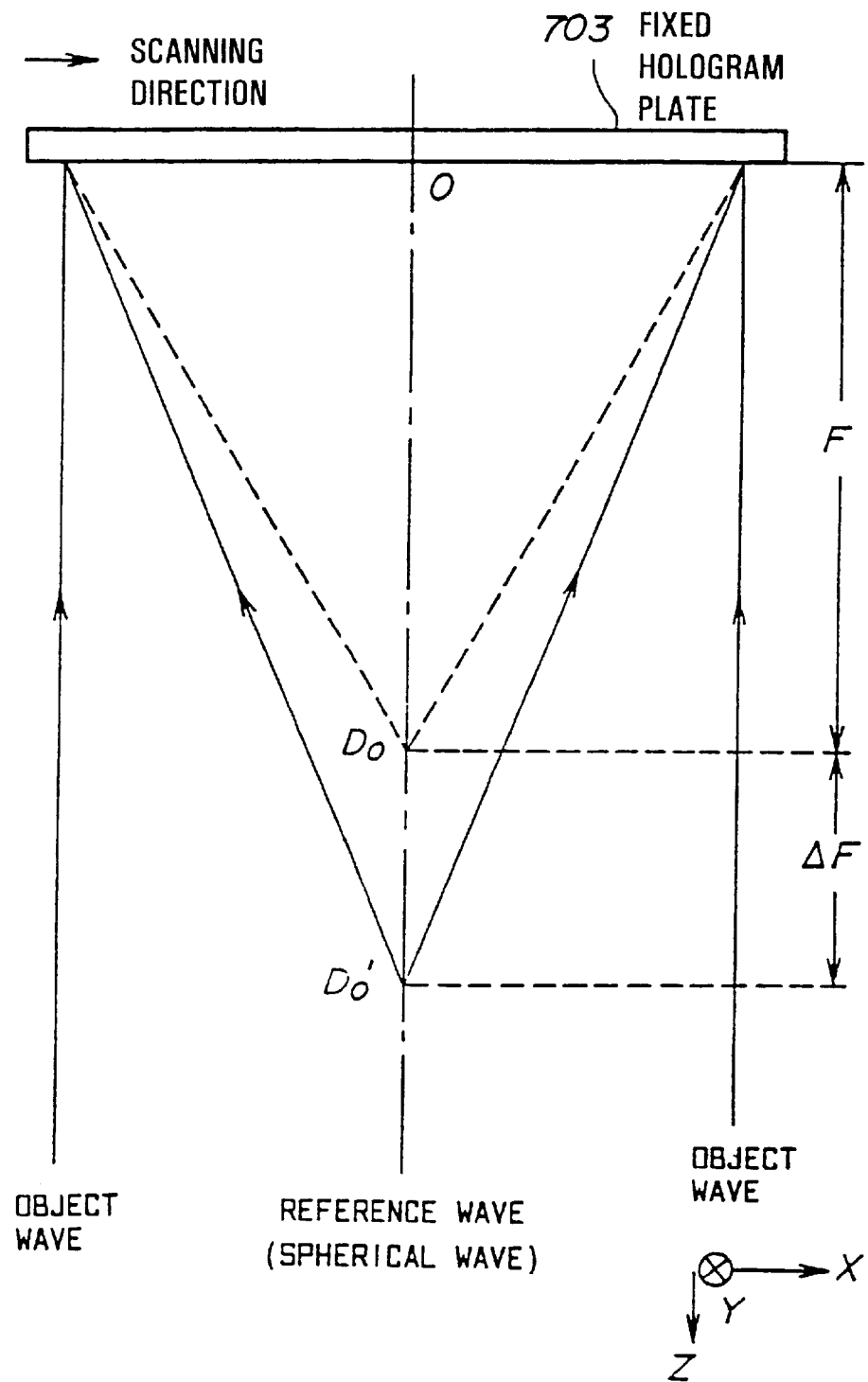
FIG. 64 is a diagram describing the fixed hologram plate of an embodiment of the present invention (reference wave)
Figure 65A:
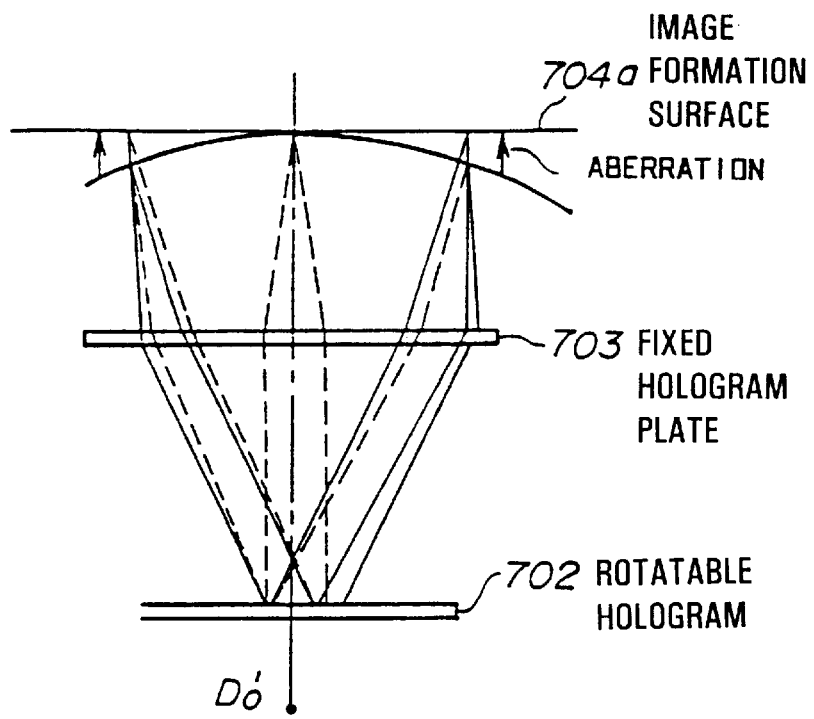
FIGS. 65(A)–65(B) shows diagrams describing the fixed hologram plate of an embodiment of the present invention (reference wave)
Figure 65B:
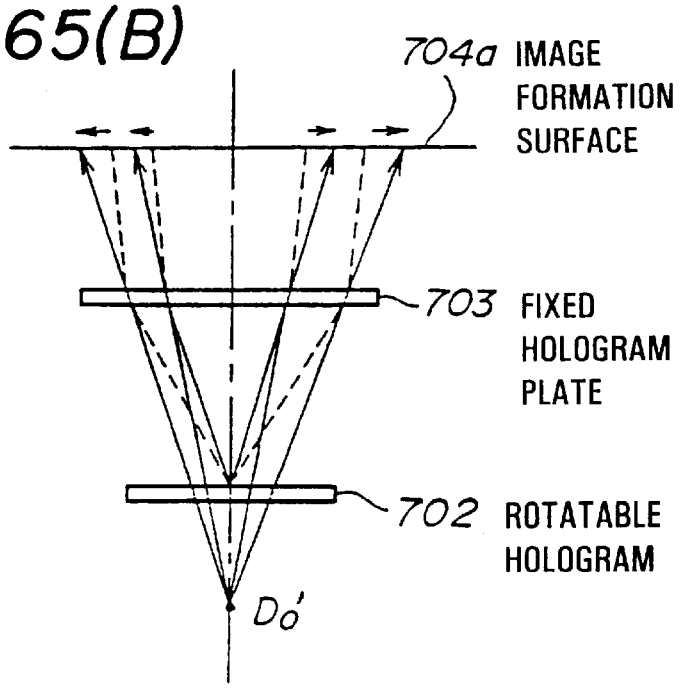

FIG. 61 is a diagram illustrating a configuration of an embodiment of this invention (cross scanning direction). FIG. 62 is a diagram illustrating a configuration of an embodiment of this invention (scanning direction). FIGS. 63(A)–63(D) are diagrams describing the fixed hologram plate of an embodiment of this invention (object wave). FIG. 64 is a diagram describing the fixed hologram plate of an embodiment of this invention (reference wave). FIGS. 65(A)–65(B) are diagrams describing the fixed hologram plate of an embodiment of this invention (reference wave).

A diverging light from a semiconductor laser 710 is first turned into a plane wave by a collimating lens 711 in the cross scanning direction of FIG. 61, and is then made to converge on a hologram disk 702 in the cross scanning direction Y by a Y-side cylindrical lens 713 via an X-side cylindrical lens 712. The light is diffracted by the hologram disk 702, is then incident on the fixed hologram 703, and it is diffracted and made to converge on the image formation surface 704a of the photoconductive drum 704. A diverging light from a semiconductor laser 710 is turned into plane wave by a collimating lens 711 in the scanning direction of FIG. 62, is then converged by a X-side cylindrical lens 712 hologram disk 702, and is made to converge at a point $M_1$ beyond the hologram disk 702 in the scanning direction X via the Y-side cylindrical lens 713. The light is then incident on the fixed hologram plate 703, and is diffracted and made to converge on the image formation surface 704a on the photoconductive drum 704.

The fixed hologram plate 703 in this embodiment is configured so that the rates of variation of the spatial frequency in the scanning direction and the cross direction thereof are different.

While the object wave for manufacturing the interference fringe distribution of the fixed hologram plate 703 is an isotropic spherical wave, this invention allows the amount of the aberration in the scanning direction and the cross scanning direction to be different from each other, as shown in FIGS. 63(A) and 63(B). A linear scanning is achieved by providing aberration, such as creating regular distances from the optical axis to the hologram face at any point in each scanning direction.

This linearity is possible because a large scanning width on the hologram disk 702 under a small optical path from the hologram disk 702 to the fixed hologram plate 703 causes degradation of linearity because the high spatial frequency of the fixed hologram plate 703 acts to draw the diffracted light back to the scanning center.

In order to lower the spatial frequency, the distance F1 from the optical axis to the hologram face is configured to be uniform at any point used for determining the amount of aberration in the scanning direction in FIG. 63(B). The distance F1 is also configured to be longer than the distance F2, F2 being the corresponding distance in the cross scanning direction in FIG. 63(A).

That is, in the cross scanning direction, the distance from the optical axis to the hologram face fulfills the equation (93) below:

$$P_1Q_1 = P_2Q_2 = P_3Q_3 \ldots = F2 \tag{93}$$

In the scanning direction, the distance from the optical axis to the hologram face fulfills the equation (94) below:

$$P_{1'}Q_{1'} = P_{2'}Q_{2'} = P_{3'}Q_{3'} \ldots = F1 \tag{94}$$

where the distances F2 and F1 fulfill the inequality (95) below.

$$F1 > F2 \tag{95}$$

In this way, the spatial frequency of the fixed hologram plate 703 in the scanning direction will be relatively low and an over-correction of linearity can be prevented.

The phase $\Phi_O(X, Y)$ of the object wave fulfilling the above equations and recorded on the fixed hologram plate 703 is represented by the equation (96) below:

$$\Phi_0 = k_2 \cdot (C_1 \cdot X^2 + C_2 \cdot Y^2 + C_0 \cdot Y) \tag{96}$$

where $$c_1 = \frac{1}{2 \cdot F1}$$

$$c_2 = \frac{1}{2 \cdot F1}$$

and where X and Y are coordinates in the scanning direction and the cross scanning direction are respectively determined with respect to the origin at the scanning center of the fixed hologram plate 703, and $k_2$ is a wave number derived from the wavelength $\lambda_2$ of the reconstructing wave.

As can be seen from the equation (94), since $C_0 \cdot Y$ is an off-axis term provided so that the diffracted light from the fixed hologram plate 703 is bent in the cross scanning direction so as to improve the diffraction efficiency, the object wave is of an elliptical phase with respect to X and Y, as shown in FIG. 63(D), and not a circle phase derived from the isotropic spherical wave of the conventional technology as shown in FIG. 63(C).

Accordingly, since the spatial frequency $f_x$ in the scanning direction and the spatial frequency $f_y$ in the cross scanning direction are obtained by a partial differentiation of the equation (96), they are given by the following equations (97) and (98).

$$f_x = \frac{1}{k_2} \cdot \frac{\partial \Phi_0}{\partial x} = \frac{1}{F1 \cdot \lambda_2} \cdot X \tag{97}$$

$$f_y = \frac{1}{k_2} \cdot \frac{\partial \Phi_0}{\partial y} = \frac{1}{F2 \cdot \lambda_2} \cdot Y + C_0 \tag{98}$$

It is known from comparison of the equations (96) and (97), that the spatial frequency $f_x$ can be made relatively small because it follows from the condition specified in the equation (95) that the rate of variation of the spatial frequency $f_x$ in the scanning direction is smaller than the rate of variation of the spatial frequency $f_y$ in the cross scanning direction.

Providing the distance F1 in the scanning direction separately from the cross scanning direction causes the beam radius on the image formation surface 704a to be different in the scanning direction and the cross scanning direction. Correction by such provision is essential in this embodiment.

As shown in FIG. 62, assuming that, in the cross scanning direction, an image is formed at an image formation distance L when the fixed hologram plate 703 is of a parameter F2, the focal distance $d_1$ of the diverging wave outgoing from the hologram disk 702 is determined from the equation (99) below, derived from a known image-formation equation, which equation determines the focal distance required for an image formation in the scanning direction at the image formation distance L and at a parameter F1.

$$1/d_1 = 1/F1 - 1/L \tag{99}$$

Since the position of the hologram disk 702 cannot be changed, due to a requirement from the image formation condition in the cross scanning direction, an incident focal distance do of an incident wave is adjusted.

That is, the focal distance $d_0$ of the incident light is adjusted by the X-side cylindrical lens 712, and the incident convergence point $M_1$ is set beyond the hologram disk 702. This arrangement ensures that the outgoing wave originating position $M_2$ of the hologram disk 702 is removed from the fixed hologram plate 703 by the distance $d_1$, so that an image is formed in the scanning direction at the image formation distance L and at a parameter F1. This way, the beam radius variation in the scanning direction and the cross direction can be corrected.

While in the equation (96), the wave number derived from the wavelength $\lambda_2$ of the reconstructing wave is represented by the constant $k_2$ of the phase of the object wave, this wave number can be different from the wave number of the reconstructing wave.

In case the semiconductor laser 710 is used for producing a reconstructing wave, the wavelength $\lambda_2$ is 780 nm. Since the wavelength sensitivity of a hologram material having a high diffraction efficiency belongs to a wavelength range shorter than this wavelength, manufacture of a hologram should be done with a laser light source having a shorter wavelength. For example, an argon laser having a wavelength $\lambda_1$ of 488 nm may be used.

Thus, with the wavelength of the object wave being $\lambda_1$ and the wavelength of the reconstructing wave being $\lambda_2$, it is required to change the phase of the object wave.

Given that the wave number derived from the constructing wave having a wavelength of $\lambda_1$ is $k_1$, and that the wavelength ratio between the constructing wave and reconstructing wave is S ($= \lambda_2/\lambda_1$), the phase $\Phi_0(X, Y)$ of the object wave is given by the equation (100) below.

$$\Phi_0(X, Y) = k_1 \left( \frac{X^2}{2(F1 \cdot S)} + \frac{Y^2}{2(F2 \cdot S)} \right) \tag{100}$$

Accordingly, when using a wave number $k_1$ derived from the wavelength $\lambda_1$ of a hologram constructing wave, which wavelength is different from the wavelength of the semiconductor laser 710, the distances F1 and F2 of the object wave are determined by multiplying the wavelength ratio times F1 and F2 determined as appropriate on the basis of the equation (94).

Reduction of distortion is achieved by shifting the point-light source position of the spherical wave used as the reference wave, from $D_0$ to $D_0'$, as shown in FIG. 64. Such shifting places the image formation position at the scanning center further away, and therefore cannot ensure a cancellation of distortion.

The phase $\Phi_{R'}(X, Y)$ of the reference wave given by the aforementioned equation (62) is represented by the equation (101) below.

$$\Phi_{R'}(X, Y) = k_2 \left( \sqrt{X^2 + (Y - Y_0)^2 + Z_0^2} - \sqrt{X^2 + Z_0^2} \right) \quad (101)$$

The phase of the reference wave is expressed by the difference between the phase of the spherical wave shown by the first term of the equation (101) and the phase of the cylindrical wave shown by the second term thereof, $k_2$ being the wave number $(2\pi/\lambda_2)$ derived from the wavelength of the reconstructing wave and being of the same value as the wave number $k_1$ derived from the wavelength $\lambda_1$ of the constructing wave. The reference wave contains a wavefront having a spherical wave optical axis $D_0 O$, which is the same as the distance from the hologram optical axis to the face of the hologram disk 2.

Cancellation of distortion requires that a non-spherical lens having a focal distance $F(D_0 O)$ at the center, and an increasingly greater focal distance toward the end is manufactured with a hologram, wherein the phase $\Phi_R(X, Y)$ of the reference wave for constructing the hologram should fulfill the equation (102) below.

$$\Phi_R(X, Y) = k_1 \left( \sqrt{X^2 + (Y - Y_0)^2 + Z_0^2} - \sqrt{X^2 + Z_0^2} \right) \quad (102)$$

The difference between the equations (101) and (102) is that the wave number $k_1$ derived from the wavelength $\lambda_1$ of the constructing wave is used in the equation 102 instead of the wave number $k_2$, used in the equation 101, derived from the wavelength $\lambda_2$ of the reconstructing wave. Increasing the wavelength $\lambda_1$ of the constructing wave to be greater than $\lambda_2$ makes the wave number $k_1$ smaller than $k_2$, thus making the phase of the reference wave smaller.

Accordingly, a wave front, different from the wavefront of the diffracted wave incident on the fixed hologram plate 703 from the hologram disk 702, is recorded on the fixed hologram plate 703. Therefore, use of a reconstructing wave of wavelength $\lambda_2$ at the time of reconstructing ensures that a non-spherical lens having a focal distance $F(D_0 O)$ at the center, and an increasingly greater focal distance toward the end can be manufactured with a hologram.

This arrangement maintains the scanning center convergence at the same position, as shown in FIG. 65(A), thus enabling the obtaining of a distortion-free scanning beam as the scanning end convergence position shifts toward the image formation surface 704a. As shown in FIG. 65(B), because the scanning beam shifts outward at the scanning end, a linear scanning is realized.

Although, in the phase equation (102), the coefficient $k_1$ is valid for the cylindrical wave term, too, only a spherical wave can be responsive to distortion correction. Therefore, the same effect is achieved as with the equation (102) by using the phase equation (103), where the coefficient $k_2$ for the cylindrical wave term is retained.

$$\Phi_R(X, Y) = k_1 \cdot \sqrt{X^2 + (Y - Y_0)^2 + Z_0^2} - k_2 \cdot \sqrt{X^2 + Z_0^2} \quad (103)$$

Thus, the phase distribution $\Phi_H(X, Y)$ of the fixed hologram plate 703, which distribution serves the purpose of linearity correction and distortion correction, is the difference obtained when subtracting the reference wave phase $\Phi_R$ from the object wave phase $\Phi_O$, and is given by the equation (104) or the equation (105).

$$\Phi_H = C_1 \cdot X^2 + C_2 \cdot Y^2 + a\sqrt{X^2 + Z_0^2} - b\sqrt{X^2 + (Y - Y_0)^2 + Z_0^2} \quad (104)$$

$$\Phi_O = C_1 \cdot X^2 + C_2 \cdot Y^2 + C_0 \cdot Y + \\ a\sqrt{X^2 + Z_0^2} - b\sqrt{X^2 + (Y - Y_0)^2 + Z_0^2} \quad (105)$$

FIG. 66 is a spot diagram of an embodiment of this invention.

In a light beam scanning apparatus shown in FIGS. 61 and 62 employing the fixed hologram plate 703 that has a phase distribution determined from the equation (105), different beam radiuses shown in FIG. 66 are obtained at each position in the range from the scanning center to the scanning end. The beam radius is maintained smaller than 60 microns, small enough to be applied to 400 dpi resolution.

A linearity of below a 0.7% level and deviation from a straight line, of the photoconductive drum 704, below a 200 micron level result from this embodiment. Other benefits include little scanning-position variation due to wavelength variation of the semiconductor laser.

In this way, a linear scanning and a light scanning free from distortion can be achieved even when the distance between the hologram disk 702 and the image formation surface 704a is maintained small for purposes of downscaling. (See a description of an embodiment of manufacture of the fixed hologram plate 703.)

FIGS. 67(A)–67(C) and 68(A)–68(F) are diagrams (Part 1 and Part 2) illustrating a manufacture of the fixed hologram plate of an embodiment of this invention. Since the phase function $\Phi_H(X, Y)$ of the fixed hologram plate 703 is represented by the above equation (105), the spatial frequency ($f_x$ in the direction X, and $f_y$ in the direction Y) of the fixed hologram plate 703 is obtained by carrying out a partial differentiation on the equation (105), the result thereof being the equations (106) and (107) below.

$$f_x = \frac{\partial \Phi_H}{\partial x} = \left( 2C_1 X + \frac{aX}{\sqrt{X^2 + Z_0^2}} - \frac{bX}{\sqrt{X^2 + (Y - Y_0)^2 + Z_0^2}} \right) \cdot \frac{1}{\lambda_2} \quad (106)$$

$$f_y = \frac{\partial \Phi_H}{\partial x} = \left( 2C_2 Y + C_0 - \frac{b(Y - Y_0)}{\sqrt{X^2 + (Y - Y_0)^2 + Z_0^2}} \right) \cdot \frac{1}{\lambda_2} \quad (107)$$

A hologram on which the above wavefront is recorded can be manufactured by an electron beam or a laser drawing, but the manufacture takes time since the area concerned is large. The use of a hologram as an auxiliary optical system in an exposure invites a degradation of S/N ratio.

Therefore, an exposure optical system is needed for manufacturing a hologram having a high S/N ratio, which optical system generates the wavefront described above.

It is also to be noted that a wave having a wavelength different from that of the reconstructing wave may be needed in the manufacture, in consideration of the sensitivity of the hologram material.

Figure 67A:
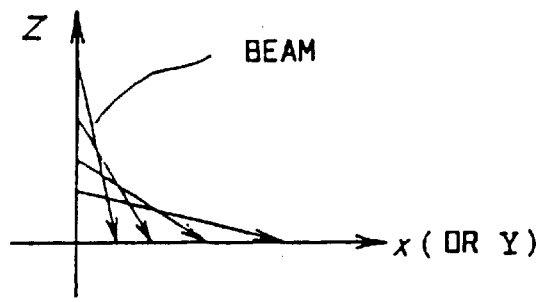
FIGS. 67(A)–67(C) show diagrams describing manufacture of the fixed hologram plate of an embodiment of the present invention (part 1)

Examining the equations (106) and (107), $2C_1 \cdot X$ as well as $2C_2 \cdot Y$ signifies the beam in FIG. 67(A), and indicates a wave of an elliptical phase, as shown in FIG. 63.

Figure 67B:
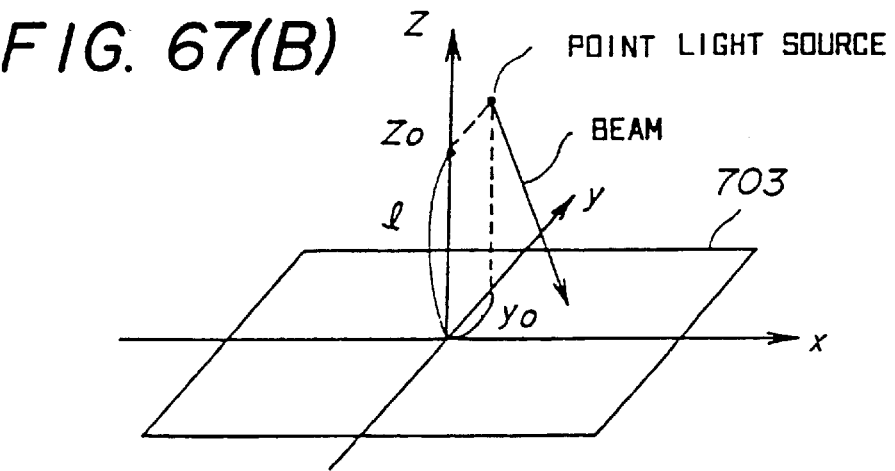

The third term in each of the equations (106) and (107), with b excluded, signifies a beam from the point-light source having the coordinates $(0, Y_0, Z_0)$, as shown in FIG. 67(B). With b included, the third term in each equation signifies waves having spherical aberration. This is equivalent to the hologram lens reconstructed with the wavelength altered.

Figure 67C:
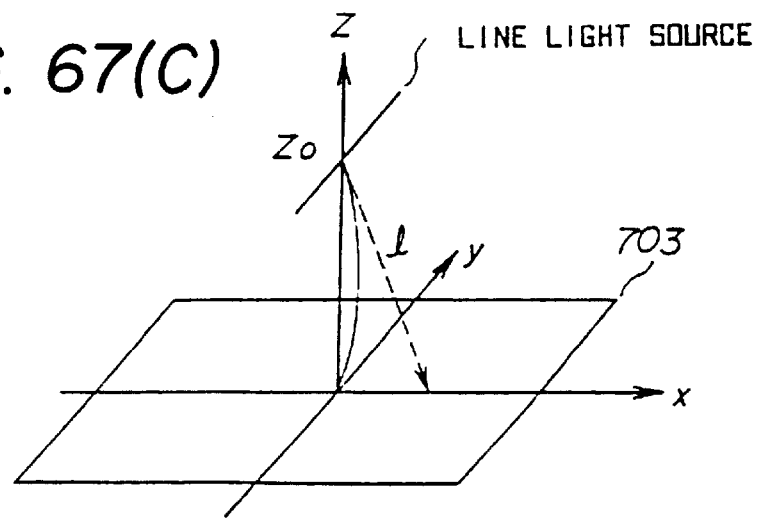
Figure 68A:
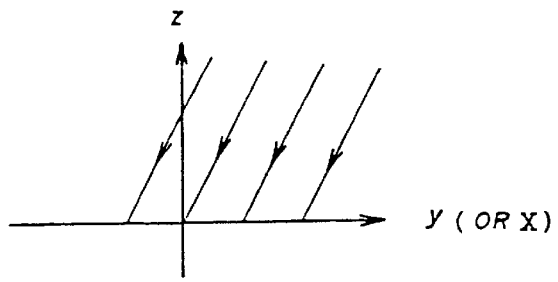
FIGS. 68(A)–68(C) show diagrams describing manufacture of the fixed hologram plate of an embodiment of the present invention (part 2)

The second term of the equation (106) signifies a beam from the line-light source passing the coordinate $(0, 0, Z_0)$, as shown in FIG. 67(C), while the second term $C_0$ of the equation (107) signifies a diagonally incident plane wave, as shown in FIG. 68(A), a coma being created by combining this beam with other beams.

Figure 68B:
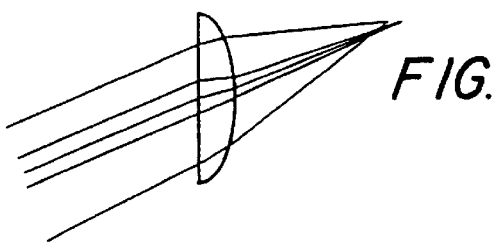

The above arrangement is the same as allowing a beam to go diagonally into a lens, as shown in FIG. 68(B).

Accordingly, the wave obtained by this arrangement is a wave having, in the direction X, the wavefront from the line-light source of FIG. 67(C), the spherical aberration from the point-light source of FIG. 67(B), and the X component of the wave of FIG. 67(A) having an elliptical phase and having, in the direction Y, the spherical aberration from the point light source of FIG. 67(B), the coma of FIG. 68(A), and the Y component of the wave of FIG. 67(A) having an elliptical phase.

That is, two waves are constructed, namely, one wave having a wavefront from the line-light source, a spherical aberration from the point-light source, and an X component of the wave having an elliptical phase; and a wave, having a spherical aberration from the point-light source, a coma, and a Y component of the wave having an elliptical phase. An interference fringe distribution having the phase function of the equation (105) is obtained by the interference of these two waves.

Figure 68C:
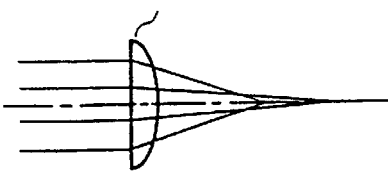
Figure 68F:
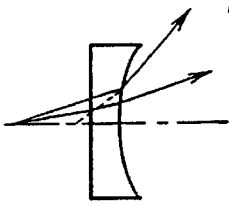
Figure 68D:
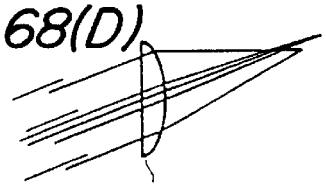
Figure 68E:
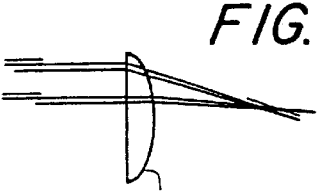

A construction of these wavefronts is achieved as follows: a spherical aberration is constructed by allowing a beam to be incident on a plano-convex lens in an on-axis manner, as shown in FIG. 68(C); a coma is constructed either by allowing a beam to be diagonally incident on a plano-convex (or plano-concave) cylindrical lens, as shown in FIG. 68(D), or by allowing a beam to be incident on a plano-convex (or plano-concave) cylindrical lens in an off-axis manner, as shown in FIG. 68(E).

A wave having an elliptical phase is constructed with the use of plano-concave (or plano-convex) cylindrical lenses disposed at right angles to each other, that is one in the direction X and the other in the direction Y, as shown in FIG. 68(F).

Since the X's in the numerator and the denominator of the equation (106) relative to the direction X cancel each other, the rate of variation is relatively small. The $(Y-Y_0)$'s in the numerator and the denominator of the equation (107) relative to the direction Y also cancel each other, but the denominator thereof contains X of a great variation rate, and so is subject to a greater change.

Therefore, a hologram construction optical system is designed such that two lenses are provided separately, namely a lens functioning in the longitudinal direction X of the fixed hologram plate 703, and a lens functioning in the direction Y, which is at right angles to the direction X. A relatively simple optical system is provided in the direction X, in which direction the rate of variation is small.

Accordingly, the line-light source wavefront (an origin of spherical aberration, and astigmatism) and the X component of the wave having an elliptical phase are obtained when the reference-wave side is designated as the direction X; the spherical aberration coming from the point-light source, the coma, and the Y component of the wave having an elliptical phase are achieved when the object wave side is designated as the direction Y.

Although spherical aberration is effective in both the reference and object sides, it is utilized in the object side. FIGS. 69(A)–69(B) describe the first embodiment of the exposure system for the manufacture of a hologram of this invention. Specifically, FIG. 69(A) is a diagram illustrating the configuration thereof as viewed from the face formed by the coordinate axes Y and Z, while FIG. 69(B) is a diagram illustrating the configuration as viewed from the face formed by the coordinates axes X and Z.

The X component of the wave having an elliptical phase, which component constitutes the reference wave, and the line-light source wavefront of the reference wave are generated by allowing a diverging wave from the point-light source 750 to pass through the X-side plano-convex cylindrical lens 751, and allowing it to be incident on the fixed hologram plate 703.

The spherical aberration of the object wave is created by allowing a diverging wave from the point light source 760 to pass through the plano-convex lens 761. The Y component of the object wave has an elliptical phase, and the coma of the object wave are created by allowing the outgoing wave, outgoing from the plano-convex lens 761, to pass through the piano concave lens 762 on the Y side before allowing it to be incident on the fixed hologram plate 703.

In accordance with this configuration, the line-light source wavefront (an origin of spherical aberration and astigmatism) and the X component of the wave having an elliptical phase are created with the reference-wave side designated as the direction X. The spherical aberration and coma coming from the point-light source, and the Y component of the wave having an elliptical phase are created with the object-wave side designated as the direction Y, thereby allowing the obtaining of the phase distribution of the equation (105).

Figure 70:
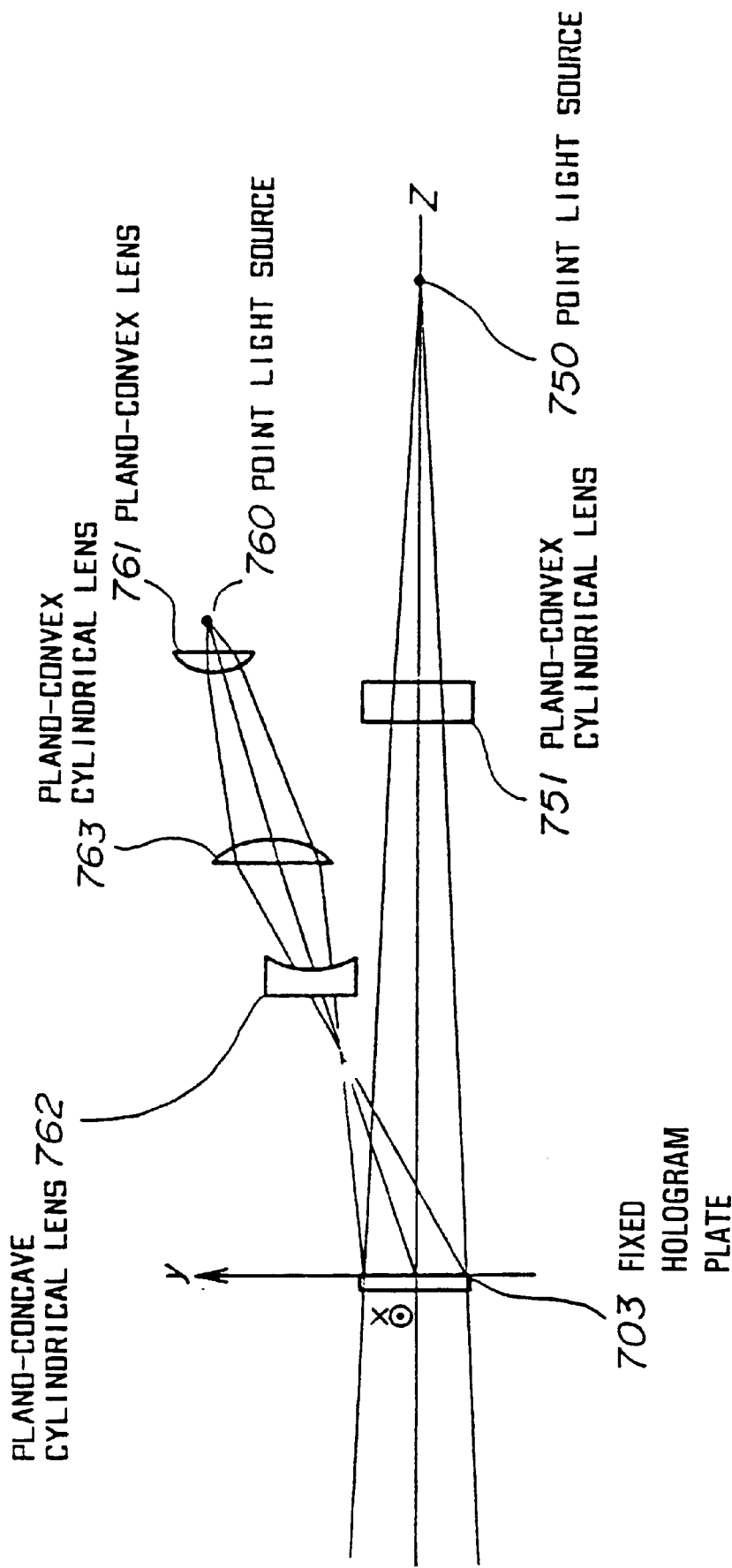
FIG. 70 is a diagram describing the second embodiment of the hologram constructing exposure system of the present invention.

FIG. 70 is a diagram describing the second embodiment of the exposure system for the manufacture of a hologram of this invention, and showing a configuration thereof as viewed from the face formed by the coordinate axes Y and Z, wherein the parts that are the same as parts shown in FIGS. 69(A)–69(B) are given the same reference numerals as in the previous figure.

In this embodiment, a plano-convex cylindrical lens 763 is added to the object wave side.

This is because, although the configuration of FIGS. 69(A) and 69(B) are applicable to a case where the object-wave side and the reference-wave side are separated enough to allow insertion of each lens therebetween, the configuration is not applicable to a case where, in the object-wave side, the image formation surface blocks the reference-wave side. The plano-convex cylindrical lens 762 alone cannot assure a sufficient amount of coma.

Therefore, when creating the object wave, a diverging wave from the point-light source 760 is allowed, in order to generate the spherical aberration, to pass through the plano-convex lens 761, the wave is then allowed, in order to generate the coma, to pass through the Y-side piano-convex cylindrical lens 763, and is allowed, in order to generate the Y-component of the wave having an elliptical phase and the coma, to pass through the Y-side plano-concave cylindrical lens 762, before being allowed to be incident on the fixed hologram plate 703.

This arrangement ensures that, even when the Y-side length of the fixed hologram plate 703 is great, a lens can be inserted so that the coma is greater than otherwise.

Figure 71A:
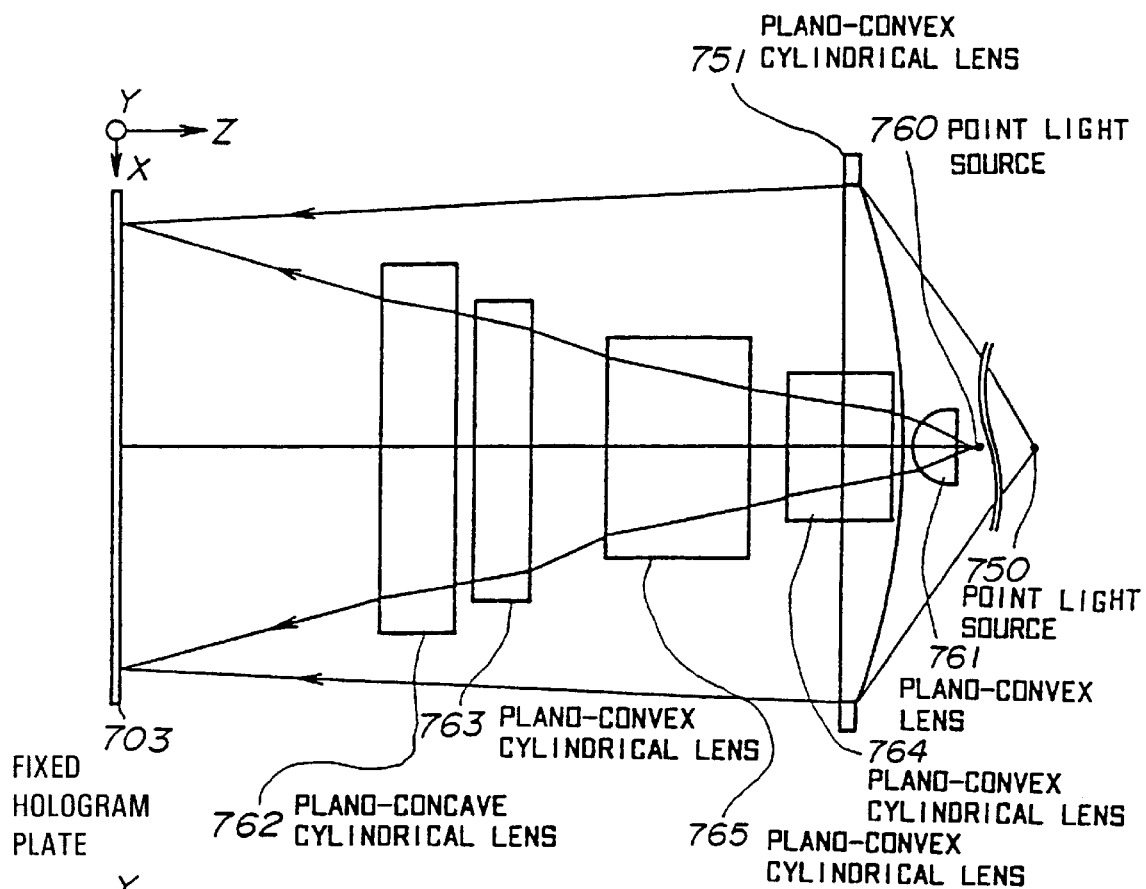
FIGS. 71(A)–71(B) show diagrams describing the third embodiment of the hologram constructing exposure system of the present invention.
Figure 71B:
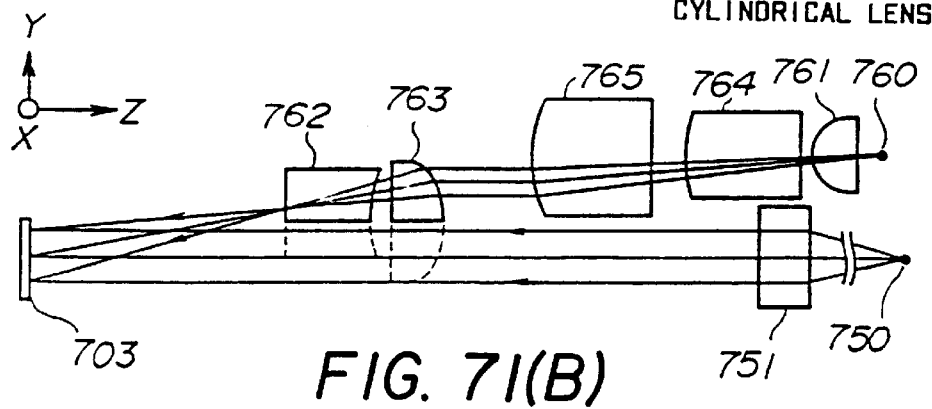

FIGS. 71(A)–71(B) show the third embodiment of the exposure system for the manufacture of a hologram of this invention. Specifically, FIG. 71(A) is a diagram showing a configuration thereof as viewed from the face formed by the coordinate axes X and Z, and FIG. 71(B) is a diagram showing the configuration as viewed from the face formed by the coordinate axes Y and Z.

In this embodiment, two plano-convex cylindrical lenses 764 and 765 are provided on the object-wave side, in addition to those already provided in the configuration shown in FIG. 70, so that a large enough coma is obtained.

The X component of the wave having an elliptical phase, which component constitutes the reference wave, and the line-light source wavefront of the reference wave are generated by allowing a diverging wave from the point light source 750 to pass through the X-side plano-convex cylindrical lens 751 before allowing it to be incident on the fixed hologram plate 703.

Therefore, when creating the object wave, a diverging wave from the point-light source 760 is allowed, in order to generate the spherical aberration, to pass through the spherical plano-convex lens 761, the wave is then allowed, in order to obtain the necessary coma, to be off-axially incident on three Y-side plano-convex cylindrical lenses 764, 765, and 763, and is allowed, in order to generate the Y-component of the wave having an elliptical phase and the coma, to pass through the Y-side plano-concave cylindrical lens 762 before being allowed to be incident on the fixed hologram plate 703.

In accordance with this configuration, the line-light source wavefront (an origin of spherical aberration and astigmatism) and the X component of the wave having an elliptical phase are created with the reference-wave side designated as the direction X. The spherical aberration and coma coming from the point light source, and the Y component of the wave having an elliptical phase are created with the object-wave side designated as the direction Y, thereby allowing the obtaining of the phase distribution of the equation (105). Thus, many of the lenses in the exposure system share a common optical axis and therefore allow for easy adjustment.

The fixed hologram plate 703 thus manufactured is used as the original, from which a mold is taken. The mold is then used to reproduce a fixed hologram plate 703 of the same characteristics.

In addition to the above-described embodiments, this invention can be extended to variations such as follows.

In a manufacture of the fixed hologram plate in this invention, it is possible to employ a method (a so-called electron-beam exposure method) where an electron beam is controlled by a computer in accordance with the above equations so that predetermined interference fringes are formed on a hologram dry plate. Another method (a so-called laser-beam exposure method) can also be employed, as described before, whereby a laser beam is controlled by a computer in accordance with the above equations.

These methods are suitable for cases where the fixed hologram plate is mass-produced, or where the size thereof or the deflection mode of the light is changed from time to time. While these methods include computer control and have a disadvantage of leading to large size of apparatuses for such manufacture, the above-mentioned embodiments allow a relatively inexpensive manufacture of the fixed hologram plate with a small apparatus for the manufacture.

Although the above description was given assuming that the light-beam scanning apparatus is applied in an electrophotograph printing apparatus, it could also be applied to a laser drawing apparatus or to a laser inspection apparatus.

Although a disk shaped rotatable hologram was assumed in the description, a drum shaped rotatable hologram can also be employed.

As has been described, an elliptical phase is realized in this invention by providing, in the phase equation of the object wave, different coefficients X and Y with respect to $C_1$ and $C_2$. This invention also enables the lowering of the rate of variation of the spatial frequency in the scanning direction, and the preventing of over-correction of the scanning center, thus realizing a linear scanning. Variations in the amount of beam aberration can be corrected by configuring so that the light incident on the rotatable hologram 702 has different focal distances in the scanning direction and the cross scanning direction. Further, F of the scanning beam in this invention is configured to be larger toward the scanning end than at the scanning center, so that distortion is cancelled by ensuring that the wave number of the spherical wave is different from the wave number derived from the wavelength of the reconstructing wave by adjusting the coefficients a and b in the phase equation of the reference wave.

This invention is not limited to the embodiments described, but variations and modifications are possible without departing from the scope of this invention.

Figure 72A:
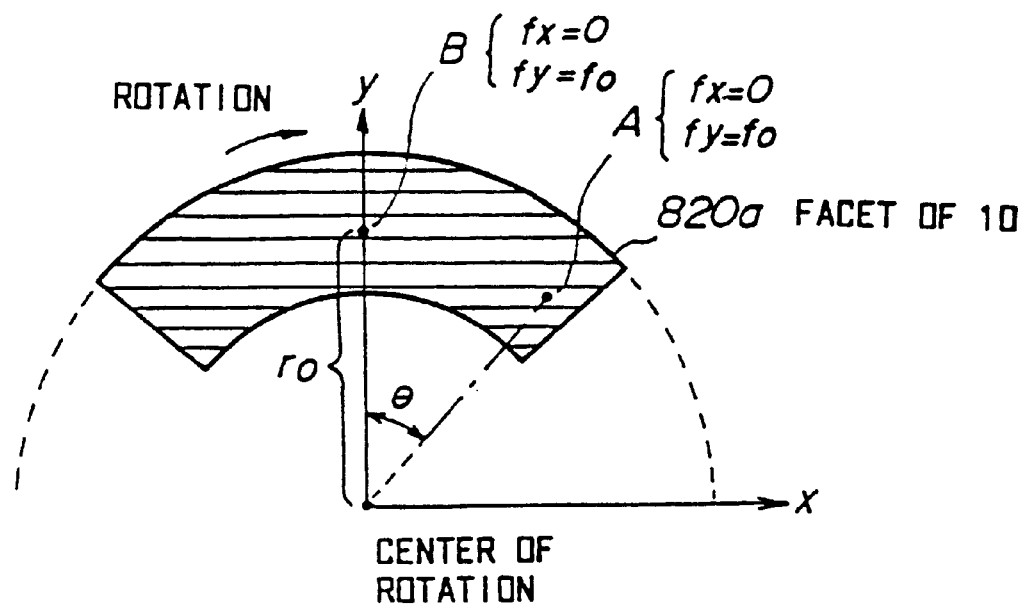
FIGS. 72(A)–72(B) show diagrams depicting a facet hologram of the rotatable hologram used in the first embodiment.
Figure 72B:
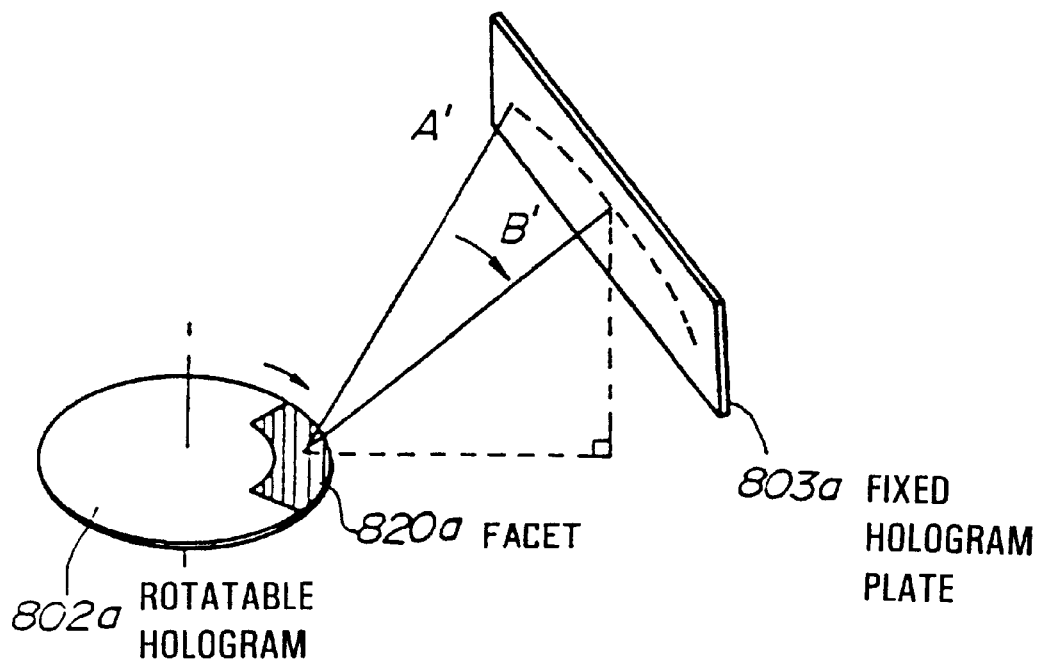

FIGS. 72(A)–72(B) illustrate a facet hologram of the rotatable hologram used in the aforementioned first invention. As shown in the figures, a plane grating hologram, in which hologram the interference fringe distribution is uniform as far as the positions of the fringes are concerned, is used in a facet hologram 820a of a rotatable hologram 802a used in the first embodiment of the present application.

In the figure, it is assumed that a laser-light incident on the points A and B on the rotatable hologram 802a of FIG. 72(A) passes through the points A' and B' on a fixed hologram plate 803a. The spatial frequency measured from the rotational center of the rotatable hologram 802a toward the scanning center thereof is the same at the points A and B on the rotatable hologram 802a, and the spatial frequency is zero in the direction X, which is at right angles to that direction.

Accordingly, the spatial frequency measured at the position on which a laser light is incident does not exhibit a change even when the rotatable hologram 802a rotates. When a laser light incidence angle into the rotatable hologram 802a, the angle being measured at the scanning center, and the outgoing angle thereof are determined, the laser light scanning track on the fixed hologram plate 803a is determined.

However, recent demand for a downscaled laser printer, for example, requires that a light-beam scanning apparatus be made smaller. To achieve this, the optical path length from the rotatable hologram 802a to the image formation surface needs to be small. It should be noted that shortening the optical path from the rotatable hologram 802a to the fixed hologram plate 803a causes the scanning width to be small.

On the other hand, shortening the optical path from the fixed hologram plate 803a to the image formation surface causes the fixed hologram plate 803a not to perform the optical functions desired of it, for example, the functions including a linearity correction function, a straight-line scanning function, and a laser light image formation function.

Accordingly, the objects of this invention are to shorten the optical path from the rotatable hologram to the image formation surface while maintaining the optical characteristics of the fixed hologram plate, so that the downscaling of an apparatus may be achieved.

Figure 73B:
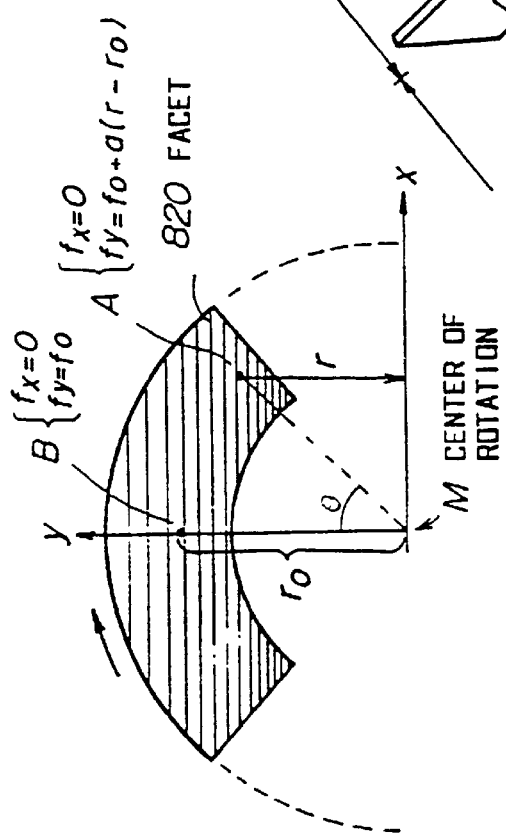
FIGS. 73(A)–73(B) show diagrams depicting a configuration of an embodiment of a tenth embodiment.
Figure 73A:
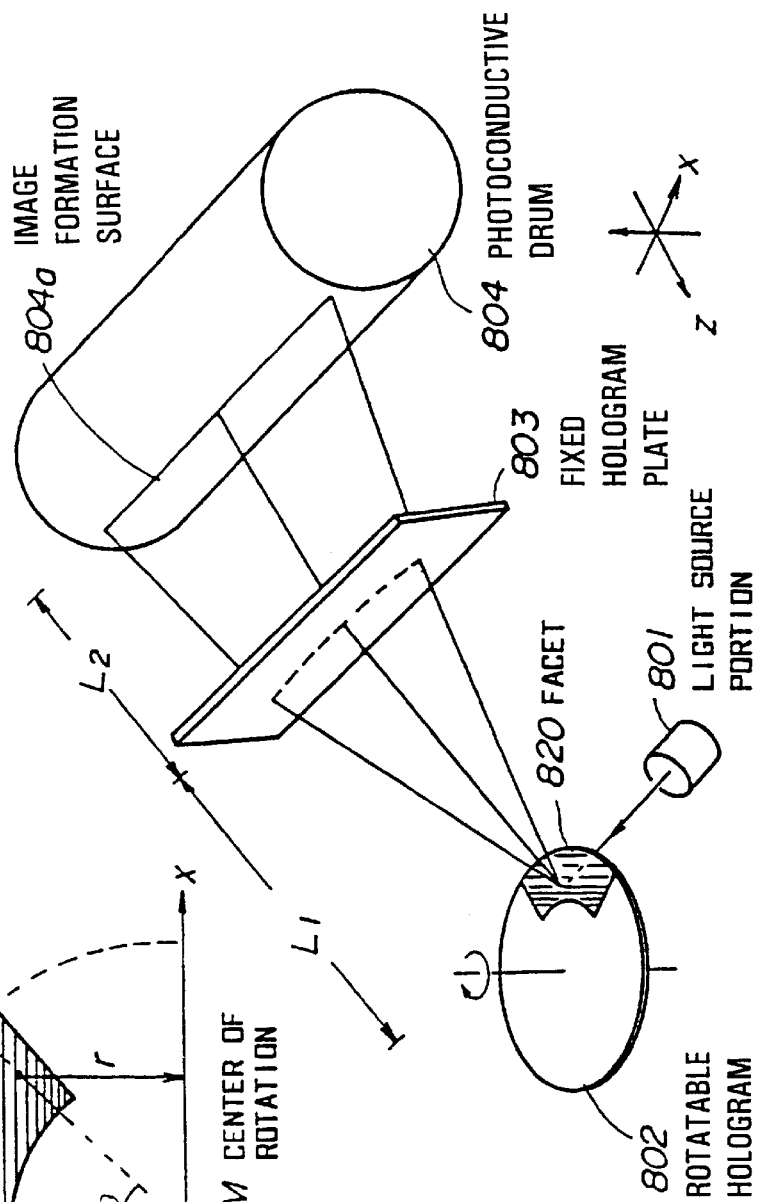

FIGS. 73(A)–73(B) are diagrams showing a configuration of an embodiment of this invention.

As shown in FIG. 73(B), a facet 820 of a rotatable hologram 802 enables the changing of the spatial frequency, at the position on which a laser light is incident, when a hologram is used where a change in distribution is seen only in the spatial frequency measured from the rotation center M of the rotatable hologram 802, in the direction Y, toward the scanning center position on the rotatable hologram 802.

That is, calling the position on the rotatable hologram 802, on which position the laser light is incident, $r_0$, calling the spatial frequency at the position r (the distance thereto being measured from the rotation center M of the rotatable hologram 802, in the direction Y, toward the scanning center position on the rotatable hologram 802) on the rotatable hologram 802, f, and calling the spatial frequency (the spatial frequency at the position $r_0$) determined from the incident and outgoing angle of the laser light incident on the rotational center M of the rotatable hologram 802, $f_0$, the spatial frequency distribution measured from the rotational center of the rotatable hologram 802 in the direction of the scanning center position on the rotatable hologram 802 is set to be of a value as determined from the equation (121) below.

$$f = f_0 + a \times (r - r_0) \quad (121)$$

where a, the rate of variation of the spatial frequency, is a constant.

Assuming that a is negative, the spatial frequency f at the position r becomes higher than the spatial frequency $f_0$ at the position $r_0$. The spatial frequency will then be of a distribution where the frequency is higher toward the center of the rotatable hologram 802, with the result that the diffraction angle in the scanning direction can be large and the scanning width can be large.

With this arrangement, it is possible to shorten the optical path from the rotatable hologram 802 to the fixed hologram plate 803 without changing the scanning width on the image formation surface.

If the optical path from the fixed hologram 803 to the image formation surface 804 is maintained constant, the convergence characteristics and the deviation from a straight line of the scanning on the image formation surface 804 deteriorate to the extent that the optical path from the rotatable hologram 802 to the fixed hologram plate 803 is shortened. Therefore, the optical path from the fixed hologram plate 803 to the image formation surface 804 is controlled to be slightly longer.

As for the fixed hologram plate 803, the direction cosine 1 in the direction X and the direction cosine m in the direction Y are given by the equations (122) and (123), below, where the scanning direction is represented by X, the cross scanning direction by Y, and the direction at right angles to these, by Z. The wavefront expressed by these equations is realized by the fixed hologram plate 803;

$$1 = \frac{aX}{\sqrt{Z_0^2 + X^2}} - \frac{bX}{\sqrt{Z_0^2 + X^2 + (Y - y_0)^2}} + eX \quad (122)$$

$$m = C_0 - \frac{d(y - y_0)}{\sqrt{Z_0^2 + X^2 + (Y - y_0)^2}} + f_y \quad (123)$$

where a, b, $c_0$, d, e, $y_0$, and $z_0$ are constants.

Figure 74A:
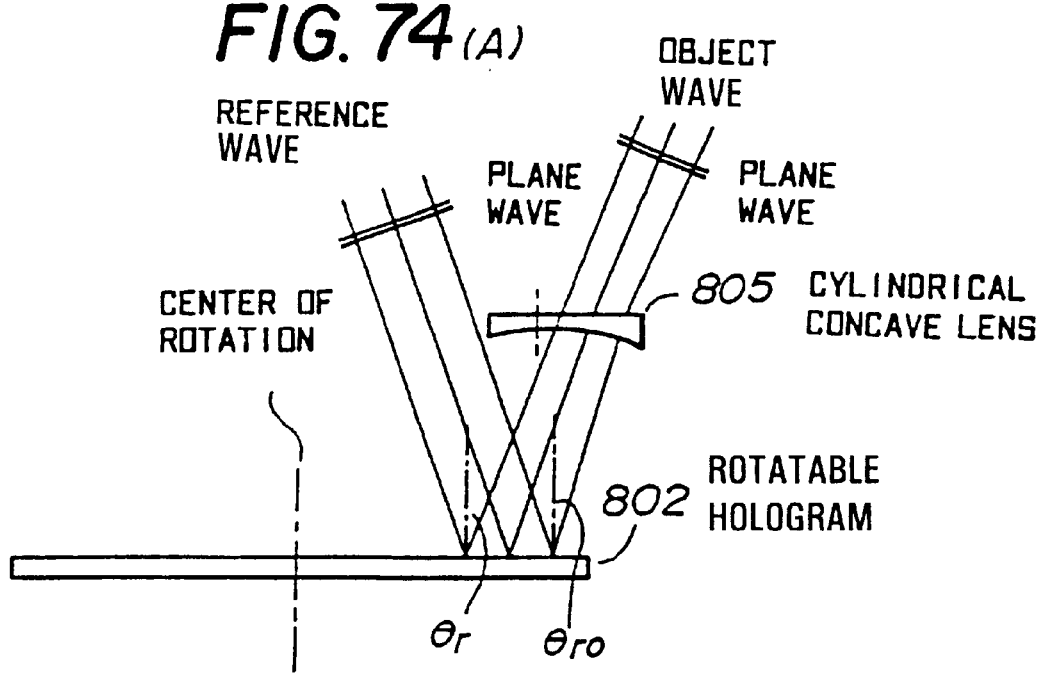
FIGS. 74(A)θ(C) show describing a manufacture of a hologram disk of an embodiment of the present invention.
Figure 74B:
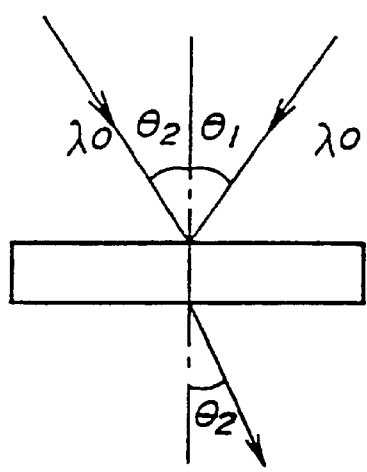
Figure 74C:
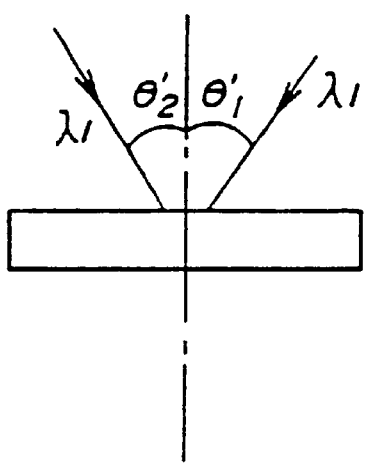

FIGS. 74(A)–74(C) show the manufacture of a rotatable hologram of an embodiment of this invention. As shown in FIGS. 74(A)–74(C), the rotatable hologram 802 is manufactured using the interference of the object wave and the reference wave.

For a manufacture of a plain grating disk, the object wave and the reference wave should be plane waves. In order to provide spatial frequency variation toward the rotational center, the intervals of the plane wave constituting the object wave should be varied toward the rotational center.

To achieve the above in producing an object wave, a plane wave is provided with a divergence property by means of a cylindrical concave-lens 805, and is allowed to be incident on the rotatable hologram 802.

In this way, the angle formed by the wave emitted from the cylindrical concave lens 805 and the plane reference wave is greater toward the rotational center, i.e., $\theta r > \theta r_0$, thus ensuring a greater density and a greater spatial frequency where appropriate.

In practical terms, since the light power of the semiconductor laser, which is the light source of the apparatus, is not sufficient for the manufacture of a hologram, a light source whose light power is greater, such as an argon laser, is utilized.

The wavelength $\lambda_0$ of the semiconductor laser is 780 nm, while the wavelength $\lambda_1$ of the argon laser is 488 nm, meaning that different wavelengths are used at the construction time and at the reconstruction time.

Therefore, as shown in FIG. 74(B), it is required that an irradiation angle $\theta_2$ of the object wave and an irradiation angle $\theta_1$ of the reference wave be set, at the wavelength $\lambda_0$ of the semiconductor laser, in accordance with the equation (124) below, so that the spatial frequency f is obtained.

$$f = (\sin \theta_1 + \sin \theta_2)/\lambda_0 \quad (124)$$

Thereafter, as shown in FIG. 74(C), the irradiation angle $\theta_2$, of the object wave and the irradiation angle $\theta_1$, of the reference wave are obtained from the equation (125) below, which angles are determined in order to produce the spatial frequency f on the basis of the argon laser wavelength of $\lambda_1$.

$$f = (\sin \theta_1' + \sin \theta_2')/1 \quad (125)$$

If, as shown in FIG. 74(A), the plane object wave and the wave irradiated from the convex lens 805 are irradiated on the rotatable hologram 802 at the wavelength $\lambda_1$ using the irradiation angle $\theta_2$, of the object wave and the irradiation angle $\theta_1$, of the reference wave, a hologram having a predetermined spatial frequency can be manufactured by means of a semiconductor laser having a wavelength of $\lambda_0$.

Figure 75:
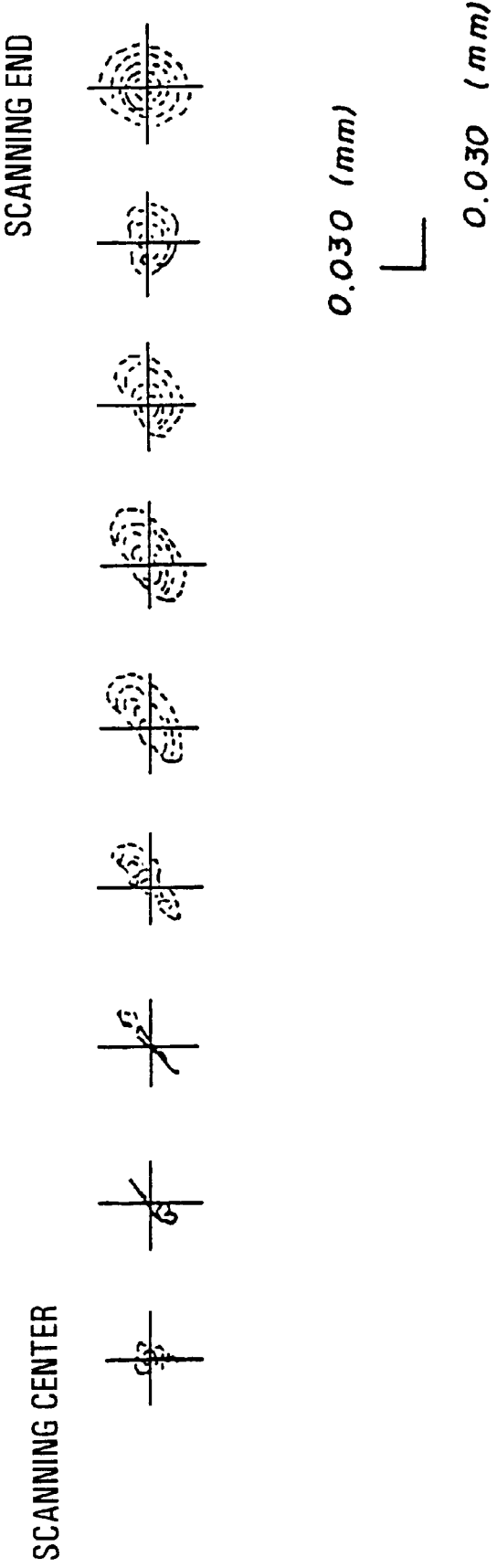
FIG. 75 shows spot diagrams of an embodiment of the present invention.

FIG. 75 is a spot diagram taken in an embodiment of this invention.

While in a conventional plane grating disk, the distance L1 between the rotatable hologram 802 and the fixed hologram plate 803 is 295 mm and the distance L2 between the fixed hologram plate 803 and the image formation surface 804a is 255 mm, the use of the rotatable hologram 2 having the spatial frequency distribution as described in FIG. 73 serves to shorten the overall optical path by enabling: L1=225 mm and L2=265 mm.

The convergence characteristics and deviation from a straight line on the image formation surface 804 is maintained by slightly increasing the distance L2 between the fixed hologram plate 803 and the image formation surface 804a.

The beam diameters in this arrangement measured in the range from the scanning center to the scanning end are shown in FIG. 75, where the maximum diameter is 60 microns at the scanning end. A 400 dpi resolution is thus guaranteed.

A linearity of below a 0.5% level and a deviation from a straight line, on the drum 804, of below 100 microns are obtained. It is found that the scanning position variation due to a wavelength variation of the semiconductor laser is extremely small, thus making the embodiment fully practicable.

Thus, it is possible with this embodiment to enlarge the scanning width of the rotatable hologram 802 so that the distance between the rotatable hologram 802 and the fixed hologram plate 803 can be made small, and so that a downscaling of the apparatus can be achieved, while at the same time it is possible to prevent variation of the scanning beam position due to a wavelength variation (variation of the center frequency, or a shift in multi-mode distribution) accompanying a temperature variation of the semiconductor laser, and to prevent a decrease in linearity, deviation from a straight line, and beam radius.

As has been explained in the description of this invention, the optical path from the rotatable hologram 802 to the fixed hologram plate 803 can be shortened by a configuration such that the spatial frequency is gradually higher toward the edge of the beam irradiation position than at the central beam irradiation position on the hologram 820 of the facet of the rotatable hologram 802, so that the diffraction angle in the scanning direction is enlarged and the scanning width is enlarged. A downscaling is achieved in this configuration because the scanning width is maintained constant.

While it was assumed in the above-mentioned embodiment that the beam scanning apparatus is applied to an electrophotographic printing apparatus, it can also be applied to a laser drawing apparatus or to a laser inspection apparatus. While the hologram interference fringes in the above-mentioned embodiment were assumed to be of a parallel line pattern, it could be of other shapes. This invention is not limited to the above embodiments but variations and modifications are possible without departing from the scope of this invention.

Figure 76:
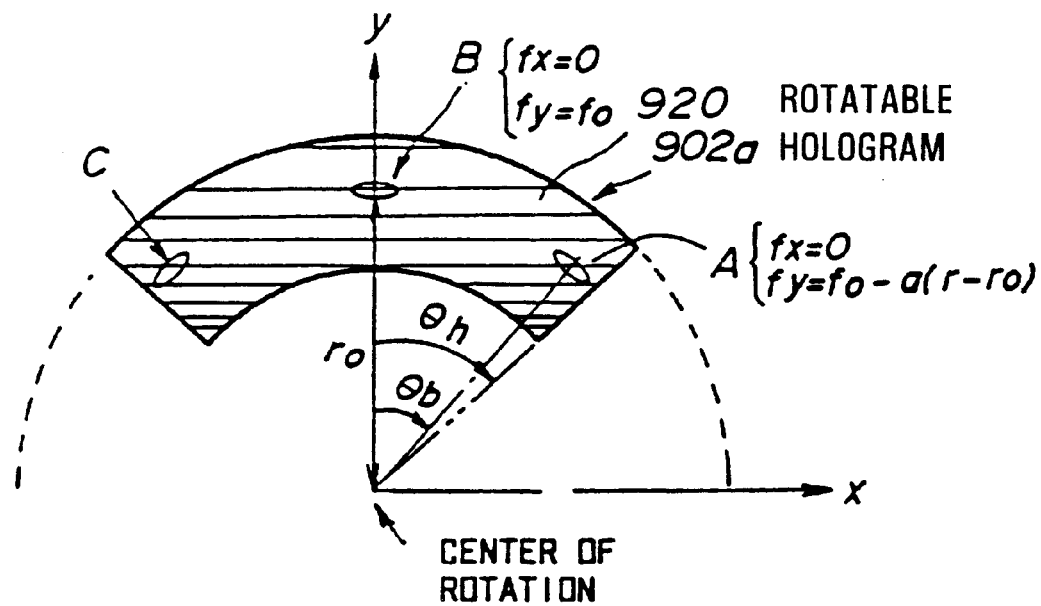
FIG. 76 is a diagram showing a frequency distribution of the rotatable hologram and an incident beam.

This invention relates to possible shapes of a laser-light spot from a laser light incident on a rotatable hologram. FIG. 76 is an enlarged diagram illustrating a facet of a rotatable hologram 902a. Also, the figure schematically shows that the beam incidence position changes as the rotatable hologram 902a rotates (the change being in the direction A→B→C).

As shown in the figure, the laser light beam incident on the rotatable hologram 902a is of an elliptical shape in cross section. The elliptical shape in the light beam scanning apparatuses described so far is such that the minor axis of the ellipsis is along the radius of the rotatable hologram 902a.

Assuming that the angle formed by the positions A and B, which positions are both hit by a beam, the central line passing through the rotational center is $\theta_b$, and that the range in which a hologram is formed by the movement of the laser light beam from the position A to the position B is $\theta_h$, the ratio of the angles $\theta_b$ and $\theta_h$ is defined as the valid hologram ratio H ($H=\theta_b/\theta_h$).

In order to utilize a rotatable hologram 902a effectively, it is desirable that this valid hologram ratio is as close to 1 as possible.

However, in the light beam scanning method shown in FIG. 76, since the major axis of the incident beam section (the beam having an elliptical shape) and the rotation direction of the rotatable hologram 902a are aligned, there is a certain inherent limit to the approximation of the valid hologram ratio H to 1. That is, the rotatable hologram 902a could fail to function efficiently because of the unused portion $\theta_D$ ($=\theta_h-\theta_b$) in a facet of the rotatable hologram 902a, which unused portion is inevitably created due to the fact that the beam shape is an ellipse whose major axis lies in the rotational direction. This failure gives rise to a problem in that the scanning efficiency is lowered.

One approach to solving this problem is to turn the beam shape of the laser light into a circle. However, the above-mentioned major axis should be of a length large enough for the fixed hologram plate to converge the scanning beam in the scanning direction and cannot be smaller than a predetermined size (that is, it cannot be circular in shape).

The object of this invention is to enable an effective use of a rotatable hologram by enabling an approximation of the valid hologram ratio H to 1 even when the beam shape of the laser light is elliptical.

Figure 77:
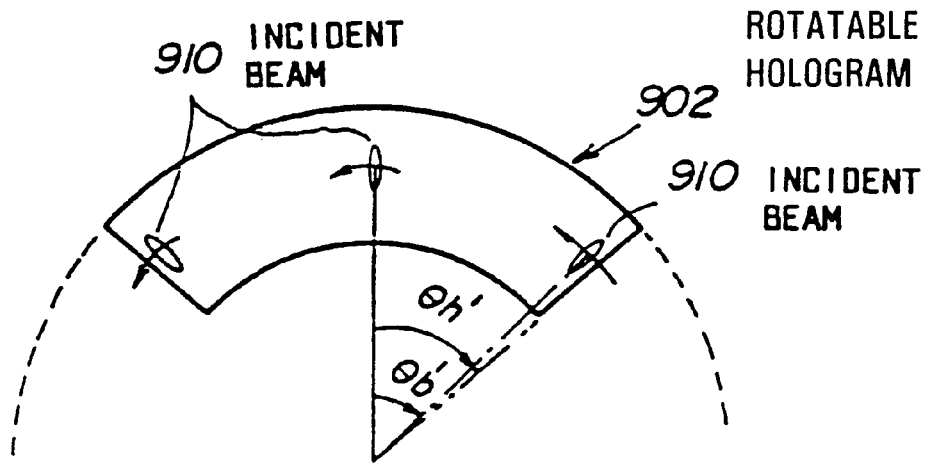
FIG. 77 is a diagram describing the principle of an eleventh embodiment.

FIG. 77 illustrates the principle of this invention. This invention is characterized in that the rotational direction of the rotatable hologram 902 (shown by the arrow in the figure) and the minor axis of an elliptically-shaped beam 910 of the laser light irradiated by the light source (a semiconductor laser, for example, but not shown in the figure) are aligned.

With this configuration, it is possible to control the unused portion $\theta_{D'}$ ($=\theta_h-\theta_{b'}$) inevitably created in a facet 920 of the rotatable hologram 902 to be small, as shown in the figure, and to approximate the valid hologram ratio, H, to 1.

Figure 78:
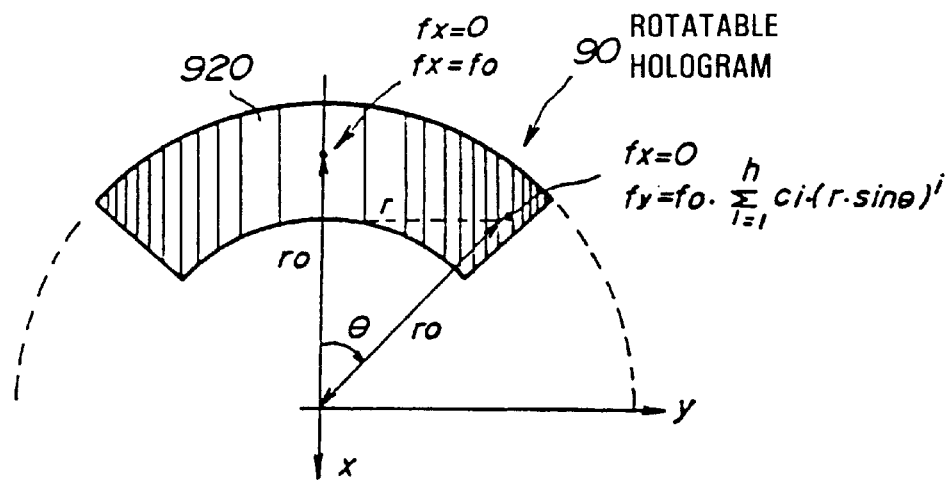
FIG. 78 is a diagram describing the rotatable hologram of the present invention.
Figure 79:
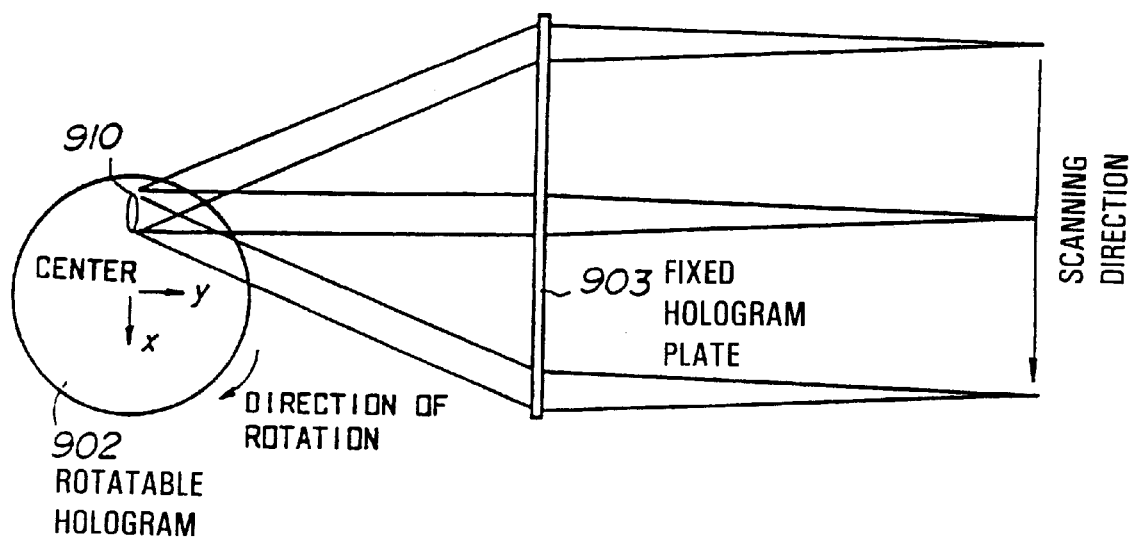
FIG. 79 is a diagram describing a configuration of the light beam scanning apparatus of the present invention.

FIGS. 78 through 80 illustrate the embodiments of this invention.

FIG. 78 is a diagram illustrating, in magnification, a facet 920 of the rotatable hologram 902 used in this invention. As described above, since this invention is configured such that the rotational direction of the rotatable hologram 902 and the minor axis of the elliptically-shaped laser light beam 910 are aligned, a hologram needs to be designed so that an appropriate light beam scanning can be achieved with this configuration. Accordingly, the spatial frequency distribution in this invention is set according to the equations below.

$$f_x=0$$

$$f_y=f_0+\Sigma C_i*(r*\sin \theta)^i$$

where $\theta$ is the rotation angle of the rotatable hologram 902, r is the incident radius of the beam, $C_i$ is the rate of variation of the spatial frequency (non-spherical coefficient), and $f_0$ is the spatial frequency when the rotation angle $\theta$ is zero. A light beam scanning apparatus described below can be realized by using the rotatable hologram 902 having the above spatial frequency distribution.

FIG. 79 shows that the angle formed by the segment connecting the incidence position of the beam from the light source to the rotational center of the rotatable hologram 902, with the segment connecting the rotational center of the rotatable hologram and the fixed hologram plate 903 is set to be 90°.

With this configuration, the rotational direction of the rotatable hologram 902 and the minor axis of the elliptically-shaped laser light beam 910 section can be aligned, so that the valid hologram ratio H is approximated to zero.

FIG. 80 illustrates an example for which the valid hologram ratio H is actually computed. That an effective usage of the rotatable hologram 902 becomes possible with this configuration is evident in that while in the configuration shown in FIG. 76 (shown in FIG. 80(A)), the valid hologram ratio H is 0.844, the valid hologram ratio H is improved to become 0.933 in the method of this invention shown in FIG. 80(B).

FIG. 81 shows first to tenth (i=1–10) order terms of the above-mentioned spatial frequency. As shown in the figure, it is found, on the basis of a simulation, that the rotational direction of the rotatable hologram 902 and the minor axis of the irradiated beam cross-section can be aligned by providing a spatial frequency distribution consisting of even functions.

As has been demonstrated, the valid hologram ratio H can be increased by aligning the rotational direction of the rotatable hologram and the minor axis of the incident beam cross-section. The valid hologram ratio H can be increased and the light beam scanning apparatus that enables the effective utilization of the rotatable hologram 902 can be realized by a configuration such that the beam position and the center of the fixed hologram plate 903 are points that lie on lines forming a 90° angle.

As has been described, the light beam scanning apparatus according to the present invention can provide a simple and inexpensive optical system by using two holograms and can realize a highly reliable apparatus free from scanning beam displacement caused by a wavelength variation of the semiconductor laser. Therefore, the scanning apparatus of the present invention is useful as a laser scanning optical system to be incorporated in office automation equipment such as a laser printer and a laser facsimile, or in a laser drawing apparatus, and a laser inspection apparatus, for example.

We claim:

1. A light-beam scanning apparatus for conducting a light scanning on a scanning surface by diffracting a light incident from a light source portion by a rotatable hologram, and by diffracting, by a fixed hologram plate, the resulting diffracted light, for use in a scanning conducted by a rotation of said rotatable hologram, wherein said fixed hologram plate has a phase distribution $\Phi_H$ represented as a difference obtained when subtracting a reference wave phase $\Phi_a$ defined below from an object wave phase $\Phi_O$ defined below, where X is a scanning direction and Y is a cross scanning direction, $C_1$, $C_2$, $Y_0$, and $Z_0$ are constants, where $\Phi_O(X, Y) = k_2(C_1X^2 + C_2Y^2)$, $k_2 = 2\pi/\lambda_2$ where $\lambda_2$ is a wavelength of said incident light; and $$\Phi_R(X, Y) = k_1 \left( \sqrt{X^2 + (Y - Y_0)^2 + Z_0^2} - \sqrt{X^2 - Z_0^2} \right),$$

$$k_1 = 2\pi/\lambda, \text{ where } \lambda_1,$$

where $\lambda_1$ is a wavelength of a constructing wave used for forming said fixed hologram plate.

2. A light-beam scanning apparatus for conducting a light scanning on a scanning surface by diffracting an incident light from a light source portion by a rotatable hologram, and by diffracting, by a fixed hologram plate, the resulting diffracted light for use in a scanning conducted by a rotation of said rotatable hologram, wherein said fixed hologram plate has a phase distribution $\Phi_H$ represented as a difference obtained when subtracting a reference wave phase $\Phi_R$ defined below from an object wave phase $\Phi_O$ defined below, where X is a scanning direction and Y is a cross scanning direction, $C_0$, $C_1$, $C_2$, $Y_0$, and $Z_0$ are constants, where $\Phi_O(X, Y) = k_2(C_1X^2 + C_2Y^2 + C_0Y)$, $k_2 = 2\pi/\lambda_2$ where $\lambda_2$ is a wavelength of said incident light; and $$\Phi_R(X, Y) = k_1 \left( \sqrt{X^2 + (Y - Y_0)^2 + Z_0^2} - \sqrt{X^2 - Z_0^2} \right),$$

where $k_1 = 2\pi/\lambda_1$ and where $\lambda_1$ is a wavelength of a constructing wave used for forming said fixed hologram plate.

3. A light-beam scanning apparatus as claimed in claim 2, wherein said fixed hologram plate has an interference fringe distribution prepared by two waves: a wave having a spherical aberration, the aberration amount being detected in the Y direction, an astigmatism, and a coma; and a wave having a spherical aberration and astigmatism of a wavelength different from a wavelength of a reconstructing wave.

4. A light-beam scanning apparatus as claimed in claim 3, wherein said fixed hologram plate has said interference fringe distribution prepared by said wave whose spherical aberration is produced by allowing a light from a point-light source to pass through a plano-convex lens and whose elliptical phase and coma are produced by means of a plano-concave cylindrical lens, and by said other wave whose elliptical phase and a line-light-source wavefront are produced by allowing a light from a point-light source to pass through a plano-convex cylindrical lens.

5. A light-beam scanning apparatus as claimed in claim 2, wherein said fixed hologram plate has an interference fringe distribution prepared by two waves: a wave which provides a spherical aberration from a point-light source, a Y-component of an elliptical phase wave, and a coma; and a wave having a line-light-source wavefront and an X-component of a wave having an elliptical phase.

6. A light-beam scanning apparatus as claimed in claim 5, wherein said fixed hologram plate has said interference fringe distribution prepared by said wave whose spherical aberration is produced by allowing a light from a point-light source to pass through a plano-convex lens and whose elliptical phase and coma are produced by a plano-concave cylindrical lens, and by said other wave whose elliptical phase and a line-light-source wavefront are produced by allowing a light from a point-light source to pass through a plano-convex cylindrical lens.

* * * * *

UNITED STATES PATENT AND TRADEMARK OFFICE
CERTIFICATE OF CORRECTION

PATENT NO.:    6,040,929
DATED      :   March 21, 2000
INVENTOR(S):   Shinya HASEGAWA et al.

It is certified that error appears in the above-identified patent and that said Letters Patent is hereby corrected as shown below:

Col. 57,    line 35, change "$\Phi_a$" to --$\Phi_O$--;
            line 36, change "$\Phi_O$" to --$\Phi_R$--;
            line 46, delete "where $\lambda$,.

Col. 58,    line 3, change "$\Phi_R$" to --$\Phi_O$--; and
            line 4, change "$\Phi_O$" to --$\Phi_R$--.

Signed and Sealed this

Twenty-fourth Day of April, 2001

Attest:

NICHOLAS P. GODICI

Attesting Officer        Acting Director of the United States Patent and Trademark Office